US010432600B2

(12) United States Patent
Gandhi et al.

(10) Patent No.: US 10,432,600 B2
(45) Date of Patent: Oct. 1, 2019

(54) NETWORK-BASED KEY DISTRIBUTION SYSTEM, METHOD, AND APPARATUS

(71) Applicant: Uniken, Inc., Chatham Township, NJ (US)

(72) Inventors: Bimal I. Gandhi, Chatham, NJ (US); Nishant Kaushik, Jersey City, NJ (US); Robert Alan Levine, San Diego, CA (US); James Anthony Villarrubia, Jersey City, NJ (US); Tejas Digambar Limaye, Pune (IN)

(73) Assignee: Uniken, Inc., Chatham Township, NJ (US)

( * ) Notice: Subject to any disclaimer, the term of this patent is extended or adjusted under 35 U.S.C. 154(b) by 0 days.

(21) Appl. No.: 16/156,836

(22) Filed: Oct. 10, 2018

(65) Prior Publication Data

US 2019/0068566 A1 Feb. 28, 2019

Related U.S. Application Data

(63) Continuation-in-part of application No. 16/018,775, filed on Jun. 26, 2018, and a continuation-in-part of application No. 16/018,885, filed on Jun. 26, 2018, now Pat. No. 10,200,195.

(60) Provisional application No. 62/525,348, filed on Jun. 27, 2017, provisional application No. 62/525,351, filed on Jun. 27, 2017.

(51) Int. Cl.
*H04L 29/06* (2006.01)
*H04L 9/08* (2006.01)

(52) U.S. Cl.
CPC .......... *H04L 63/062* (2013.01); *H04L 9/0894* (2013.01); *H04L 63/0876* (2013.01); *H04L 63/102* (2013.01); *H04L 63/18* (2013.01); *H04L 2463/062* (2013.01)

(58) Field of Classification Search
CPC . H04L 63/062; H04L 63/0876; H04L 9/0894; H04L 63/18; H04L 63/102; H04L 2463/062
See application file for complete search history.

(56) References Cited

U.S. PATENT DOCUMENTS

| | | | |
|---|---|---|---|
| 6,292,896 B1 * | 9/2001 | Guski | H04L 9/0625 713/169 |
| 7,254,237 B1 | 8/2007 | Jacobson et al. | |
| 8,477,941 B1 | 7/2013 | Dhanoa et al. | |
| 9,276,740 B2 | 3/2016 | Nix | |
| 9,374,707 B2 | 6/2016 | Kruglick | |
| 10,069,811 B2 * | 9/2018 | Curtis | H04L 63/0428 |

(Continued)

*Primary Examiner* — John B King

(57) ABSTRACT

An apparatus includes a computing system that is configured to receive, from an electronic device, a verification message indicating that the electronic device is not corrupt. The computing system is also configured to receive, from the electronic device, a unique universal identifier (UUID) that is associated with an application stored in a memory of the electronic device. The computing system is further configured to receive, from a management server of the one or more management servers, a server key stored in a credential store and that is associated with the UUID received from the electronic device. In addition, the computing system is configured to establish one or more secure channels for electronic data communication with the electronic device based on the received UUID and the server key.

20 Claims, 21 Drawing Sheets

(56) References Cited

U.S. PATENT DOCUMENTS

| | | | |
|---|---|---|---|
| 2005/0037774 A1* | 2/2005 | Scott | G06Q 30/0601 |
| | | | 455/456.1 |
| 2005/0138384 A1* | 6/2005 | Brickell | G06F 21/57 |
| | | | 713/182 |
| 2011/0058675 A1* | 3/2011 | Brueck | H04N 21/2541 |
| | | | 380/277 |
| 2013/0014225 A1* | 1/2013 | Kageyama | H04L 67/16 |
| | | | 726/4 |
| 2013/0232335 A1* | 9/2013 | King | H04L 63/062 |
| | | | 713/155 |
| 2014/0344578 A1* | 11/2014 | Kim | H04L 63/0428 |
| | | | 713/168 |
| 2016/0234213 A1* | 8/2016 | Kim | H04W 4/70 |
| 2016/0295546 A1* | 10/2016 | Yumura | H04W 64/00 |
| 2017/0325089 A1* | 11/2017 | Sharma | G06F 21/53 |
| 2018/0139612 A1* | 5/2018 | Rhelimi | H04W 8/20 |
| 2018/0173884 A1 | 6/2018 | Hande | |
| 2018/0335990 A1* | 11/2018 | Nishikawa | G06F 3/1288 |
| 2018/0359220 A1* | 12/2018 | Trivelpiece | H04L 63/0281 |
| 2019/0020631 A1* | 1/2019 | Leavy | H04L 63/0442 |

\* cited by examiner

NETWORK-BASED KEY DISTRIBUTION SYSTEM, METHOD, AND APPARATUS

CROSS-REFERENCE TO RELATED APPLICATIONS

This application is a continuation-in-part of application Ser. No. 16/018,775, filed Jun. 26, 2018, which claims the benefit of Provisional Application No. 62/525,351, filed Jun. 27, 2017 and Provisional Application No. 62/525,348, filed Jun. 27, 2017, and this application is also continuation-in-part of application Ser. No. 16/018,885 filed Jun. 26, 2018, which claims the benefit of Provisional Application No. 62/525,351, filed Jun. 27, 2017 and Provisional Application No. 62/525,348, filed Jun. 27, 2017, the disclosures of which are hereby incorporated by reference in their respective entireties.

TECHNICAL FIELD

The present disclosure relates to distributing network-based keys among entities in an electronic communication system.

BACKGROUND

Customers and service providers often must make transactions across secure telecommunication connections (e.g., a web browsing session or a telephone call). A connection between the customer and the service provider relies on authentication processes to validate the identity of the customer and the identity of the service provider before beginning an interaction between the customer and the service provider. Presently, each of such telecommunications connections between the customer and the service provider is initiated as if it were a first contact between the customer and the service provider. For example, when a customer uses the web browser to navigate to the service provider's website, the customer relies on the web browser to verify that the service provider's website is genuine before establishing an encrypted connection between the web browser and the service provider's website. After the web browser has validated the service provider's website, the web browser establishes an encrypted connection with the service provider's website. After the encrypted connection has been established, the customer sends personal identifying information, such as a username and a password, over the encrypted connection to confirm the customer's identity to the service provider's web site.

The process of bowser-run authentication described above is complicated and requires many intermediate, often third-party, validation steps using certificates. The certificates are easy to falsify and therefore a risk that the validation process will be compromised is inherent in each step of the validation process. If the validation process is compromised, the encryption key, and therefore any information sent across the encrypted connection, may therefore be accessed by a hacker. Another drawback of the web browser-run verification process is that the service provider's website often uses the same encryption key to establish every encrypted connection with every web browser requesting a secure connection with the website of the service provider. Accordingly, if even a single communication between the service provider's website and the customer's browser is intercepted by a hacker, all subsequent communication for all customers occurring over telecommunication connections encrypted using the encryption key are compromised.

The customer may also make transactions with the service provider using a telephone call into a call center of the service provider. When the customer calls the call center of the service provider, the customer is required to validate his or her identity by providing personal identifying information, such as a birthdate, a social security number, an address, or historical family information to a call center employee. While the call center may thus verify an identity of the customer based on the personal identifying information provided, the customer has no way to verify that the call center employee is a genuine call center employee associated with the service provider. Furthermore, the customer has no way to prevent the call center employee from stealing the customer's personal identifying information.

In the examples described above, the customer and the service provider have a pre-existing relationship (e.g., the customer has already signed up for the service provided by the service provider), yet this pre-existing relationship is not leveraged to authenticate the customer during transactions that occur after the initial encounter between the customer and the service provider. Instead, the customer is required to provide many pieces of personal identifying information for every interaction between the customer and the service provider, as is described above for the customer calling the call center. Alternatively, the service provider may require the customer to make an account that is accessible by a username and a password with the service provider. The account includes the personal identifying information of the customer. However, since the validation process completed by the browser before establishing the encrypted connection has many points of weakness, meaning that information such as the username or the password sent by the user over the encrypted connection may be intercepted.

SUMMARY

This disclosure provides systems and methods for performing network-based key distribution operations in an electronic communication system.

The disclosure provides various methods for leveraging a pre-existing relationship between a first agent and a second agent to establish a secure communication channel between the first agent and the second agent. This secure communication channel is then leveraged to authenticate subsequent interactions between a user associated with the first agent and a user associated with the second agent without the exchange of personal identifying information of either of the users or either of the agents over a potentially vulnerable connection.

In one embodiment, the disclosure provides a method for leveraging a secure communication channel between a first agent and a second agent to authenticate an activity outside of the secure communication channel. The method includes establishing the secure communication channel by a method comprising: a first computing device generating a first absolute key for the first agent; generating a first partial relative key for the first agent; wherein the first absolute key and the first partial relative key define a relative identity of the first agent, wherein the relative identity is unique for a relationship between the first agent and the second agent; generating an intermediate key by taking a mathematical function, hash, or algorithm of the first absolute key, the first partial relative key, and a second partial relative key for the second agent; generating an encryption key by using a mathematical function, hash, or algorithm of the intermediate key and a second absolute key for the second agent; wherein the relative identity relationship is characterized by the encryption key, and the encryption key is used to encrypt subsequent communications between the first agent and second agent. Responsive to one of the first agent and the second agent receiving a request from the other of the first agent and the second agent to authenticate the activity outside of the secure communication channel, the method further includes authenticating the activity outside of the secure communication channel using the secure communication channel.

In another embodiment, the disclosure provides a method for leveraging a secure communication channel between a first agent and a second agent to authenticate an activity outside of the secure communication channel. The method includes receiving with the first agent a communication request through an insecure channel from the second agent. The method further includes receiving with the first agent an indicator of a relative identity relationship from the second agent. The method further includes sending with the first agent a request to authenticate the activity outside of the secure communication channel to the second agent. The method further includes authenticating the activity outside of the secure communication channel using the secure communication channel.

In another embodiment, the disclosure provides a system including a first computing device having at least a first processor and a first memory including a first key corresponding to a first agent. The system further includes a second computing device having at least a second processor and a second memory including a second key corresponding to a second agent. The first key and the second key form an encryption key establishing a relationship between the first agent and the second agent. The system further includes a third computing device having at least a third processor and a third memory including identifying data of a third agent. The first computing device, the second computing device, and the third computing device are in communication over a network. The first memory includes program instructions executable by the at least one processor of the first computing system to: retrieve, from the third computing device, the identifying data of the third agent; establish a secure connection with the second computing device by forming the encryption key; send at least a portion of the identifying data of the third agent to the second agent using the secure connection; request the second agent to authenticate the third agent; and responsive to receiving authentication of the third agent from the second agent: establish a second encryption key using identifying data of the first agent and the identifying data of the third agent; decompose the second absolute key into a third key and a fourth key using a mathematical algorithm; store the third key in the first memory; and send activation instructions for storing the fourth key into the memory of the third computing device instructions to the second computing device over the secure connection.

In another embodiment, the disclosure provides a method for establishing a relative identity relationship between a first agent and second agent, the method including a first computing device operable by a user and including a software application stored in a memory, the first computing device generating a first absolute key for the first agent. The method further includes generating a first partial relative key for the first agent. The first absolute key and the first partial relative key define a relative identity of the first agent based on an identity of the first computing device, an identity of the software application, and an identity of the user. The relative identity is unique for a relationship between the first agent and the second agent. The method further includes generating an intermediate key by taking a mathematical function, hash, or algorithm of the first absolute key, the first partial relative key, and a second partial relative key for the second agent. The method further includes generating an encryption key by using a mathematical function, hash, or algorithm of the intermediate key and a second absolute key for the second agent. The relative identity relationship is characterized by the encryption key, and the encryption key is used to encrypt subsequent communications between the first agent and second agent.

In another embodiment, the disclosure provides a method for leveraging a first secure channel of communication between a first agent and a second agent to create a second secure channel of communication between the first agent and a third agent. The method includes creating the first secure channel of communication between the first agent and the second agent using a configurable data-driven initial process on a first computing device. Responsive to the first agent receiving a request from the third agent to establish the second secure channel of communication, the method further includes retrieving identifying information from the third agent. The method further includes sending the identifying information from the third agent to the second agent over the first secure channel of communication. Responsive to receiving approval of the third agent's request from the second agent, the method further includes establishing the second secure channel of communication.

In another embodiment, an apparatus is provided. The apparatus includes a first electronic data port configured to transmit electronic data to one or more electronic devices and receive electronic data from the one or more electronic devices. The apparatus also includes a second electronic data port configured to transmit electronic data to one or more electronic devices and receive electronic data from the one or more electronic devices. The apparatus further includes a computing system. The computing system, when executing one or more network-based key distribution operations, is configured to receive, from an electronic device of the one or more electronic devices, a verification message indicating that the electronic device is not corrupt. The computing system, when executing one or more network-based key distribution operations, is also configured to receive, from the electronic device, a unique universal identifier (UUID) that is associated with an application stored in a memory of the electronic device. The computing system, when executing one or more network-based key distribution operations, is further configured to receive, from a management server of the one or more management servers, a server key stored in a credential store and that is associated with the UUID received from the electronic device. In addition, the computing system, when executing one or more network-based key distribution operations, is configured to establish one or more secure channels for electronic data communication with the electronic device based on the received UUID and the server key.

In another embodiment, a method implemented by a computing system of an electronic gateway is provided. The method includes receiving, by the computing system, a verification message from an electronic device, wherein the verification message indicates that the electronic device is not corrupt. The method also includes receiving, by the computing system, a unique universal identifier (UUID) from the electronic device, wherein the UUID is associated with an application stored in a memory of the electronic device. The method further includes receiving, by the computing system, a server key from a management server, wherein the server key is stored in a credential store and is associated with the UUID received from the electronic device. In addition, the method includes establishing, by the computing system, one or more secure channels for electronic data communication with the electronic device based on the received UUID and the server key.

In another embodiment, a non-transitory, computer-readable storage medium of an electronic gateway is provided. The non-transitory, computer-readable storage medium of the electronic gateway stores one or more executable instructions that, when executed by one or more processors, cause the one or more processors to receive a verification message from an electronic device. The verification message indicates that the electronic device is not corrupt. The non-transitory, computer-readable storage medium of the electronic gateway stores one or more executable instructions that, when executed by one or more processors, also cause the one or more processors to receive a unique universal identifier (UUID) from the electronic device. The UUID is associated with an application stored in a memory of the electronic device. The non-transitory, computer-readable storage medium of the electronic gateway stores one or more executable instructions that, when executed by one or more processors, further cause the one or more processors to receive a server key from a management server. The server key is stored in a credential store and is associated with the UUID received from the electronic device. In addition, the non-transitory, computer-readable storage medium of the electronic gateway stores one or more executable instructions that, when executed by one or more processors, cause the one or more processors to establish one or more secure channels for electronic data communication with the electronic device based on the received UUID and the server key.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
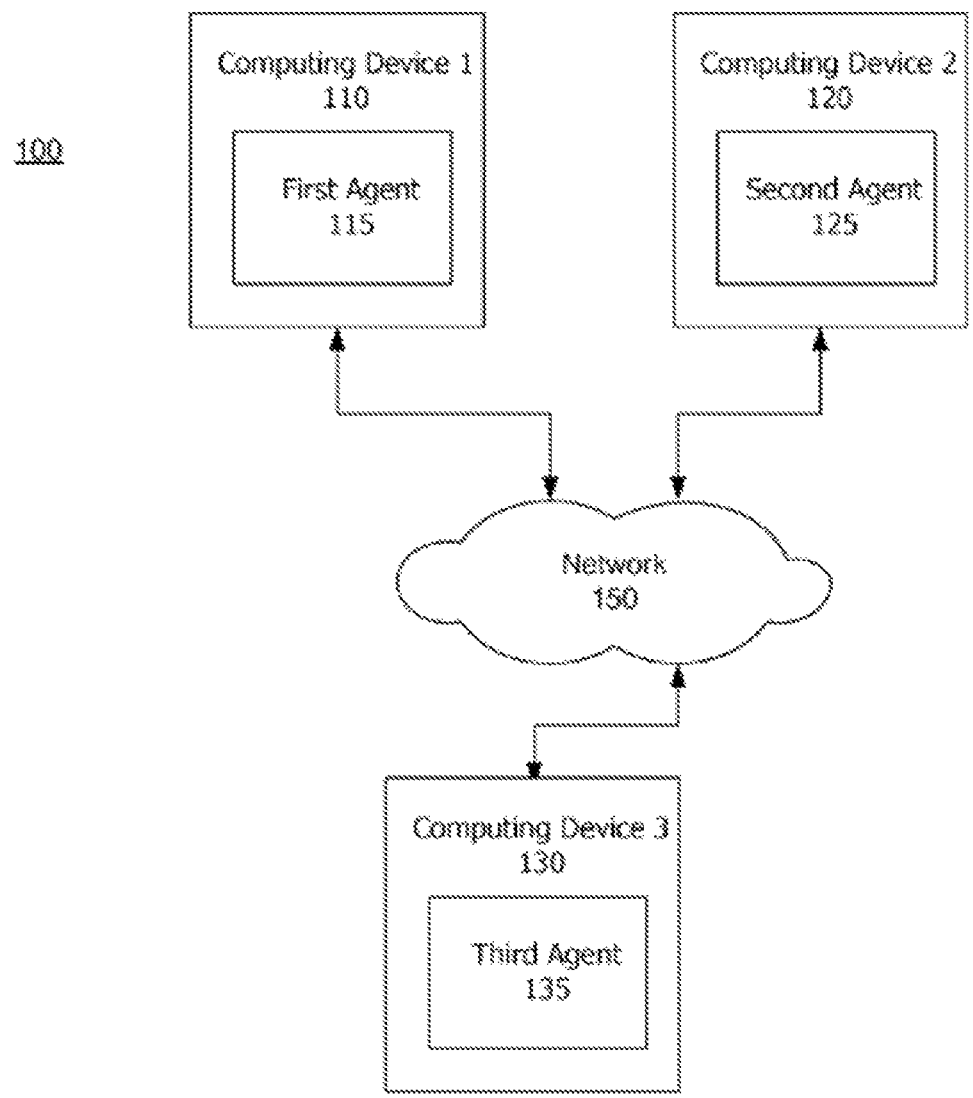
FIG. 1 is a block diagram of a system in which secure trustworthy two-way communication channels may be established and used according to some embodiments.

FIGS. 1 through 21, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. As used herein, the word "may" is used in a permissive sense (e.g. meaning having the potential to) rather than the mandatory sense (e.g. meaning must).

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has been proven convenient at times, principally for reasons of common usage, to refer to signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, the terms "processing", "computing", "calculating", "determining" or the like refer to actions or processes of a specific apparatus, such as a special purpose computer or a similar special purpose electronic computing device. In the context of this specification, therefore, a special purpose computer or similar special purpose electronic computing device is capable of manipulating or transforming signals, typically represented as physical electronic or magnetic quantities within memories, registries, or other information storage devices, transmission devices, or display devices of the special purpose computer or similar special purpose electronic computing device. The use of the variable "n" is intended to indicate that a variable number of local computing devices may be in communication with the network.

Some embodiments include method for leveraging a secure communication channel between a first agent and a second agent to authenticate an activity outside of the secure communication channel. In some embodiments, the method includes establishing the secure communication channel a first computing device generating a first absolute key for the first agent. In some embodiments, the method further includes generating a first partial relative key for the first agent, wherein the first absolute key and the first partial relative key define a relative identity of the first agent. In some embodiments, the relative identity is unique for a relationship between the first agent and the second agent. In some embodiments, the method includes generating an intermediate key by taking a mathematical function, hash, or algorithm of the first absolute key, the first partial relative key, and a second partial relative key for the second agent.

In some embodiments, the method includes generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent. In some embodiments, the method includes, responsive to one of the first agent and the second agent receiving a request from the other of the first agent and the second agent to authenticate the activity outside of the secure communication channel, authenticating the activity outside of the secure communication channel using the secure communication channel.

In some embodiments, the activity outside of the secure communication channel occurs on a browser. In some embodiments, the activity outside of the secure communication channel occurs on a telephone. In some embodiments, the activity outside of the secure communication channel is an in-person transaction. In some embodiments, the activity outside of the secure communication channel is authorized without sending an identity of either the first agent or the second agent outside of the secure communication channel. In some embodiments, the activity outside of the secure communication channel is authorized in real time. In some embodiments, the activity outside of the secure communication channel is requested at a first time and the activity outside of the secure communication channel is authorized using the secure communication channel at a second time different than the first time. In some embodiments, the step of storing a record of the authentication of the activity occurring outside of the secured communication channel on a memory in communication with one of the first agent and the second agent.

Some embodiments include a method for leveraging a secure communication channel between a first agent and a second agent to authenticate an activity outside of the secure communication channel. In some embodiments, the method includes receiving with the first agent a communication request through an insecure channel from the second agent, receiving with the first agent an indicator of a relative identity relationship from the second agent, sending with the first agent a request to authenticate the activity outside of the secure communication channel to the second agent, and authenticating the activity outside of the secure communication channel using the secure communication channel.

In some embodiments, the activity outside of the secure communication channel occurs on a browser. In some embodiments, the activity outside of the secure communication channel occurs on a telephone. In some embodiments, the activity outside of the secure communication channel is an in-person transaction. In some embodiments, the activity outside of the secure communication channel is authorized without sending an identity of either the first agent or the second agent outside of the secure communication channel. In some embodiments, the activity outside of the secure communication channel is authorized in real time. In some embodiments, the activity outside of the secure communication channel is requested at a first time and the activity outside of the secure communication channel is authorized using the secure communication channel at a second time different than the first time. In some embodiments, the method includes the step of storing a record of the authentication of the activity occurring outside of the secured communication channel on a memory in communication with one of the first agent and the second agent.

In some embodiments, the secure communication channel is established by a first computing device generating a first absolute key for the first agent and generating a first partial relative key for the first agent. In some embodiments, the first absolute key and the first partial relative key define a relative identity of the first agent, wherein the relative identity is unique for a relationship between the first agent and the second agent. In some embodiments, the method includes generating an intermediate key by taking a mathematical function, hash, or algorithm of the first absolute key, the first partial relative key, and a second partial relative key for the second agent, and generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent.

Some embodiments include computer-readable program product including program code, which when executed by a processor, causes an apparatus to establish a secure communication channel by a method including a first computing device generating a first absolute key for the first agent, and generating a first partial relative key for the first agent. In some embodiments, the first absolute key and the first partial relative key define a relative identity of the first agent, wherein the relative identity is unique for a relationship between the first agent and the second agent. In some embodiments, the method includes generating an intermediate key by taking a mathematical function, hash, or algorithm of the first absolute key, the first partial relative key, and a second partial relative key for the second agent. In some embodiments, the method includes generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent. In some embodiments, the method further includes responsive to one of the first agent and the second agent receiving a request from the other of the first agent and the second agent to authenticate the activity outside of the secure communication channel, and authenticating the activity outside of the secure communication channel using the secure communication channel.

In some embodiments, the activity outside of the secure communication channel occurs on a browser. In some embodiments, the activity outside of the secure communication channel occurs on a telephone.

Some embodiments include a method for establishing relative identity relationship between a first agent and second agent. In some embodiments, the method includes a first computing device operable by a user and including a software application stored in a memory, the first computing device generating a first absolute key for the first agent. In some embodiments, the method includes generating a first partial relative key for the first agent. In some embodiments, the first absolute key and the first partial relative key define a relative identity of the first agent based on an identity of the first computing device, an identity of the software application, and an identity of the user. In some embodiments, the relative identity is unique for a relationship between the first agent and the second agent. In some embodiments, the method includes generating an intermediate key by taking a mathematical function, hash, or algorithm of the first absolute key, the first partial relative key, and a second partial relative key for the second agent. In some embodiments, the method includes generating an encryption key by using a mathematical function, hash, or algorithm of the intermediate key and a second absolute key for the second agent.

In some embodiments, the relative identity relationship is characterized by the encryption key, and the encryption key is used to encrypt subsequent communications between the first agent and second agent. In some embodiments, the first absolute key for the first agent is generated within the first agent. In some embodiments, the first absolute key is not transmitted over a network. In some embodiments, the first absolute key is not known to the second agent. In some embodiments, the first partial relative key is transmitted over a network to the second agent.

In some embodiments, the method further includes, responsive to the first agent sending a communication request to the second agent, the second agent verifies the identity of the first computing device, the identity of the software application, and the identity of the user before sending the second partial relative key to the first agent. In some embodiments, first agent sends a name of the encryption key to the second agent when sending the communication request to the second agent. In some embodiments, the name of the encryption key is not included in the first partial key, the second partial key, the first absolute key, or the second absolute key. Some embodiments include a method for leveraging a first secure channel of communication between a first agent and a second agent to create a second secure channel of communication between the first agent and a third agent.

In some embodiments, the method includes creating the first secure channel of communication between the first agent and the second agent using a configurable data-driven initial process on a first computing device, responsive to the first agent receiving a request from the third agent to establish the second secure channel of communication, retrieving identifying information from the third agent, sending the identifying information from the third agent to the second agent over the first secure channel of communication, and responsive to receiving approval of the third agent's request from the second agent, establishing the second secure channel of communication. In some embodiments, the step of establishing the first secure channel of communication includes, a first computing device generating a first absolute key for the first agent, and generating a first partial relative key for the first agent. In some embodiments, the first absolute key and the first partial relative key define a relative identity of the first agent, wherein the relative identity is unique for a relationship between the first agent and the second agent.

In some embodiments, the method further includes generating an intermediate key by taking a mathematical function, hash, or algorithm of the first absolute key, the first partial relative key, and a second partial relative key for the second agent, and generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent.

In some embodiments, the relative identity relationship includes at least one of personal identifying information, computing device identifying information, or software app identifying information of at least one of the first agent or the second agent. In some embodiments, the second secure channel of communication is established without the configurable data-driven process. In some embodiments, the identifying information of the third agent includes at least one of personal identifying information, computing device identifying information, or software app identifying information of the third agent. In some embodiments, the method further includes the steps of responsive to the first agent receiving a request from a fourth agent to establish the second secure channel of communication, retrieving identifying information from the fourth agent, sending the identifying information from the fourth agent to one of the second agent over the first secure channel of communication or the third agent over the second secure channel of communication, and responsive to receiving approval of the third agent's request from the second agent or the third agent, establishing the third secure channel of communication.

In some embodiments, the identifying information of the fourth agent includes at least one of personal identifying information, computing device identifying information, or software app identifying information of the fourth agent. In some embodiments, an amount of data used in the configurable data-driven initial process is established by the first agent. In some embodiments, a type of the data used in the configurable data-driven initial process is established by the first agent. In some embodiments, the type of data includes a device identification number of a second computing device associated with the second agent. In some embodiments, the second computing device includes a software application, and the type of data includes a software application identification number. In some embodiments, the type of data includes the software application identification number, a device identification number of the second computing device, and personal identifying information about the second agent. In some embodiments, the type of data includes personal identifying information about the second agent.

In some embodiments, a system includes a first computing device having at least a first processor and a first memory including a first key corresponding to a first agent. In some embodiments, the system further includes a second computing device having at least a second processor and a second memory including a second key corresponding to a second agent, the first key and the second key forming an encryption key establishing a relationship between the first agent and the second agent. In some embodiments, the system further includes a third computing device having at least a third processor and a third memory including identifying data of a third agent, the first computing device, the second computing device, and the third computing device in communication over a network.

In some embodiments the first memory includes program instructions executable by the at least one processor of the first computing system to retrieve, from the third computing device, the identifying data of the third agent, establish a secure connection with the second computing device by forming the encryption key, send at least a portion of the identifying data of the third agent to the second agent using the secure connection, request the second agent to authenticate the third agent, and responsive to receiving authentication of the third agent from the second agent, establish a second encryption key using identifying data of the first agent and the identifying data of the third agent, decompose the second absolute key into a third key and a fourth key using a mathematical algorithm, store the third key in the first memory, and send activation instructions for storing the fourth key into the memory of the third computing device instructions to the second computing device over the secure connection.

In some embodiments, the type of identifying data of the third agent is configured by the first agent. In some embodiments, the type of data includes a device identification number of the third computing device. In some embodiments, the third computer device includes a software application, and wherein the type of data includes a software application identification number. In some embodiments, the type of data includes the software application identification number, a device identification number of the third computing device, and personal identifying information about the third agent. In some embodiments, the type of data includes personal identifying information about the third agent. In some embodiments, the activation instructions are a single-use access code, and wherein the second absolute key is established after the single-use access code has been input into the third computing device. In some embodiments, the first absolute key is formed from the identifying data of the first agent and identifying data of the second agent.

In some embodiments the first device generates the third key by generating a third absolute key and generating a third partial relative key. In some embodiments, the third absolute key and the third partial relative key define a relative identity of the first agent. In some embodiments, the relative identity is unique for a relationship between the first agent and the third agent.

Some embodiments include generating an intermediate key by taking a mathematical function, hash, or algorithm of the third absolute key, the third partial relative key, and a fourth partial relative key and generating an encryption key by using a mathematical function, hash, or algorithm of the intermediate key and a fourth absolute key. In some embodiments the relative identity relationship is characterized by the encryption key, and the encryption key is used to encrypt subsequent communications between the first agent and third agent.

Some embodiments include a computer-readable program product including program code, which when executed by a processor, causes an apparatus to generate on a first computing device operable by a user and including a software application stored in a memory a first absolute key for a first agent, and generate a first partial relative key for the first agent. In some embodiments, the first absolute key and the first partial relative key define a relative identity of the first agent based on an identity of the first computing device, an identity of the software application, and an identity of the user, wherein the relative identity is unique for a relationship between the first agent and the second agent.

In some embodiments, computer-readable program product includes program code, which when executed by a processor, causes an apparatus to generate an intermediate key by taking a mathematical function, hash, or algorithm of the first absolute key, the first partial relative key, and a second partial relative key for the second agent, and generate an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent.

In some embodiments, the first absolute key for the first agent is generated within the first agent. In some embodiments, the first absolute key is not transmitted over a network. In some embodiments, the first absolute key is not known to the second agent. In some embodiments, the first partial relative key is transmitted over a network to the second agent. Some embodiments include a computer-readable program product including program code, which when executed by a processor, causes an apparatus to create the first secure channel of communication between a first agent and a second agent using a configurable data-driven initial process on a first computing device, responsive to the first agent receiving a request from the third agent to establish the second secure channel of communication, retrieve identifying information from the third agent, send the identifying information from the third agent to the second agent over the first secure channel of communication, and responsive to receiving approval of the third agent's request from the second agent, establish the second secure channel of communication.

In some embodiments, the program code for establishing the first secure channel of communication includes program code for a first computing device generating a first absolute key for the first agent, and generating a first partial relative key for the first agent. In some embodiments, the first absolute key and the first partial relative key define a relative identity of the first agent, wherein the relative identity is unique for a relationship between the first agent and the second agent. In some embodiments, the program code for establishing the first secure channel of communication includes generating an intermediate key by taking a mathematical function, hash, or algorithm of the first absolute key, the first partial relative key, and a second partial relative key for the second agent and generating an encryption key by using a mathematical function, hash, or algorithm of the intermediate key and a second absolute key for the second agent. In some embodiments, the relative identity relationship is characterized by the encryption key, and the encryption key is used to encrypt subsequent communications between the first agent and second agent.

In some embodiments, the relative identity relationship includes at least one of personal identifying information, computing device identifying information, or software app identifying information of at least one of the first agent or the second agent. In some embodiments, the second secure channel of communication is established without the configurable data-driven process. In some embodiments, the identifying information of the third agent includes at least one of personal identifying information, computing device identifying information, or software app identifying information of the third agent.

In some embodiments, the program code further includes program code for, responsive to the first agent receiving a request from a fourth agent to establish the second secure channel of communication, retrieving identifying information from the fourth agent, sending the identifying information from the fourth agent to one of the second agent over the first secure channel of communication or the third agent over the second secure channel of communication, and responsive to receiving approval of the third agent's request from the second agent or the third agent, establishing the third secure channel of communication. In some embodiments, the identifying information of the fourth agent includes at least one of personal identifying information, computing device identifying information, or software app identifying information of the fourth agent. In some embodiments, an amount of data used in the configurable data-driven initial process is established by the first agent. In some embodiments, a type of the data used in the configurable data-driven initial processes established by the first agent. In some embodiments, the type of data includes a device identification number of a second computing device associated with the second agent.

In some embodiments, the second computing device includes a software application, and the type of data includes a software application identification number. In some embodiments, the type of data includes the software application identification number, a device identification number of the second computing device, and personal identifying information about the second agent. In some embodiments, the type of data includes personal identifying information about the second agent.

Referring now to FIG. 1, there is shown a block diagram of a system 100 in which trusted two-way authenticated communication channels may be established and used. The system 100 includes three computing devices 110, 120, 130 connected to a network 150. Although the system 100 has been shown with three computing devices, a scalable solution is described herein that can comprise additional computing devices.

The computing devices 110, 120, 130 are representative of a class of computing devices which may be any device with a processing unit and memory that may execute instructions. Computing devices may be personal computers, server computers, computing tablets, set top boxes, video game systems, personal video recorders, telephones, personal digital assistants (PDAs), portable computers, laptop computers, fax machines, cell phones and special purpose devices. Computing devices have processor and memory. These computing devices may run an operating system, including, for example, variations of the Linux, Unix, MS-DOS, Microsoft Windows, Palm OS, and Apple Mac OS X operating systems.

The network 150 provides a platform for communications between the computing devices 110, 120, 130. The network 150 may be or include local-area networks (LANs), wide-area networks (WANs), metropolitan-area networks (MANs), distributed networks and other similar networks in which computing devices may be linked together. The network 150 may provide lower layer network support for computing devices to interact with one another. The network 150 may be packet-switched and may comprise a common or private bi-directional network, and may be, for example the Internet. The network 150 may be wired or wireless. In addition, the network 150 may be configured based on client-server architecture, a peer-to-peer architecture, or any other distributed computing system architecture. Further, the network 150 may be configured to comprise additional components so as to ensure a scalable solution.

The computing devices 110, 120, 130 may include respective agents 115, 125, 135. The agents 115, 125, 135 may be securely bound to their respective computing devices 110, 120, 130. Alternatively, the agents 115, 125, 135 may be portable and installable on different computing devices at a user's discretion. For example, an agent or critical components thereof may be stored on a device such as a smart card or portable flash memory device, and a user may carry the smart card or portable flash memory device for use with various computing devices.

The agents of FIG. 1 are a first agent 115, a second agent 125, and a third agent 135. Although respectively shown with a single agent 115, 125, 135, the computing devices 110, 120, and 130 may each have more than one agent. As explained below, the agents 115, 125, 135 may have identities relative one another. The agents 115, 125, 135 may authenticate communication channels between the communications devices, and may provide security for communications on the authenticated channels.

As used herein, an agent may be or include a software module or application which may be loaded and run on a computing device. An agent may communicate with other functional units within the corresponding computing device. An agent may also communicate with agent's remote to the communications device. One function of an agent is to store certain encrypted data so as to prevent the encrypted data from being accessible (e.g., viewed) by other functional units within the computing device (e.g., applications in user space). Access may be considered restricted if the agent has exclusive access or substantially exclusive access to the tools needed to decrypt the packets, such as decryption keys and software. Access may also be considered restricted if the agent has exclusive access or substantially exclusive access to the encrypted data itself.

Encrypted data is data which has been obscured to make it unreadable and unidentifiable at some level of confidence. Data which has been encrypted can be decrypted using a corresponding method or algorithm which may correspond to the method or algorithm used to encrypt the data. This data may be or may be representative of, for example, numbers, characters, audio, images, voice and video.

The relative identity of one agent to another agent may be based on information which is unique for the relationship between the two agents. The relative identity also may be based on information which is only known to the two agents in the particular relationship. With multiple computing devices 110, 120, 130 and multiple agents 115, 125, 135, there may be multiple separate relative identities in the system 100. Thus, the first user agent has an identity relative to the second user agent and a different identity relative to the third agent. Likewise, the second user agent has an identity relative to the first user agent and a different identity relative to the third agent. Finally, the third user agent has an identity relative to the first user agent and a different identity relative to the second agent. All six of these relative identities may be distinct. In short, a relative identity uniquely identifies one particular agent's relationship to another particular agent.

Even between two agents, there may be multiple unique relative identities arising from multiple relationships between the two agents. For example, an individual may have a checking account and a savings account with the same bank. Those two accounts will have a separate account numbers. Likewise, the multiple relative identities created for two particular agents could identify the separate relationships the two agents have with each other.

Additional and fewer units, modules or other arrangement of software, hardware and data structures may be used to achieve the processes and apparatuses described herein.

Figure 2:
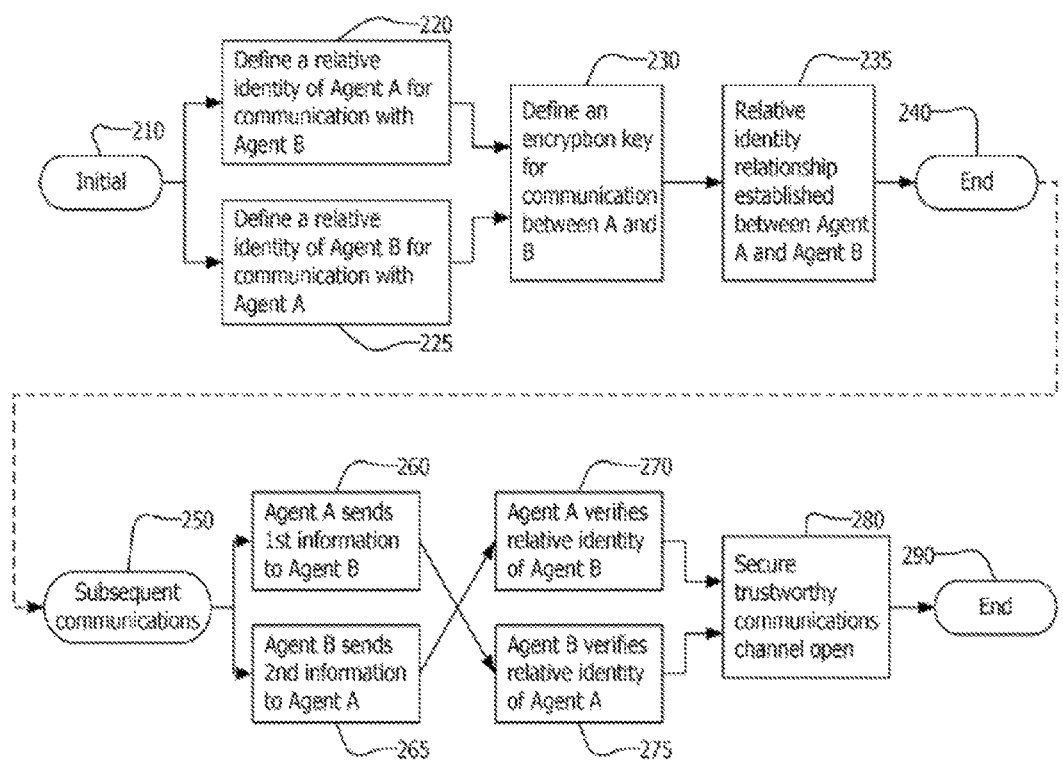
FIG. 2 is a flow chart of a process of establishing a secure trustworthy two-way communication channel between two agents according to some embodiments.

Referring now to FIG. 2, there is shown a flow chart of an exemplary process of establishing a communication channel between two computing devices. The description of the process is made with respect to a first agent, termed agent A, hosted by a first computing device and a second agent, termed agent B, hosted by a second computing device. These agents may be, for example, the agents 115, 125, 135 in the system 100 of FIG. 1.

The process for establishing a communication channel between agent A and agent B is compose of two parts. The first part, from 210 to 240, establishes a relative identity relationship between agent A and agent B. A relative identity relationship means that agent A has a relative identity with respect to agent B and agent B has a relative identity with respect to agent A. Both agent A and agent B are aware of the existence of the relative identity relationship, but neither knows the relative identity of the other. In the second part of the process, from 250 to 290, each agent verifies the identity of the other before opening a secure trustworthy communication channel between agent A and agent B.

Either agent A or agent B may initiate the process to establish a relative identity relationship at 210. At 220, agent A defines its relative identity with respect to agent B. The relative identity of agent A may be obtained from a third party (not shown in FIG. 2), may be derived from information about the relationship between agent A and agent B, or may simply be randomly selected by agent A. Similarly, at 225, agent B defines its relative identity with respect to agent A. The relative identity of agent B may be also obtained from a third party, may be derived from information about the relationship between agent A and agent B, or may simply be randomly selected by agent B. Agent A and agent B may not disclose their relative identities to each other.

Either agent A or agent B may initiate subsequent communication at 250. At 260, agent A may send first information to agent B. The first information may be derived from the relative identity of agent A in a manner that allows agent B to verify the identity of agent A without disclosing the relative identity of agent A. The first information may be derived from the relative identity of agent A and other data known to both agent A and agent B.

Similarly, at 265, agent B sends second information to agent A. The second information may be derived from the relative identity of agent B in a manner that allows agent A to verify the identity of agent B without disclosing the relative identity of agent B. The second information may be derived from the relative identity of agent B and other data known to both agent A and agent B. The first and second information may be derived in numerous ways including using various algorithms well-known in the art of cryptography. For example, the first and second information can be generated by using one-way hash functions, modulus functions, cyclic arithmetic operations, and various other algorithms.

It should be recognized that the first and second information of this example may be distinct from each other. Additionally, both the first and second information are derived, in part, from the relative identities of agents A and B and are thus unique to the relationship between these two agents. While both the first and second information are derived, in part, from the relative identities of the agents A and B, respectively, the relative identities cannot be determined from the first and second information.

At 270, agent A uses the second information received from agent B to verify the identity of agent B. Similarly, at 275, agent B uses the first information received from agent A to verify the identity of agent A. A secure trustworthy communications channel is opened between agents A and B at 280 only if both agent A and agent B successfully verify the identity of the other agent. The process from 250 to 290 may be repeated for every communication session between agent A and agent B, or may be repeated only if secure trustworthy communications are desired between agents A and B. Communications between agents A and B, including communications required to verify their relative identities, may be encrypted using an encryption key. The encryption key may optionally be a unique key which may be defined at 230.

The communication channel that is established at 280 may be described as a secure communication channel because the identity information of either agent cannot be stolen. The identity information of an agent cannot be stolen because the identity information is not transmitted, provided or released from the agent over the network. As such, the identity of the agent is protected and is not compromised. As a result, fraudulent transactions based on using an agent's identity information are prevented since an agent's identity information cannot be obtained by an unauthorized entity.

The communication channel that is established at 280 may also be trustworthy. A trustworthy communication channel is a channel which is established between authorized entities. The communication channel of 280 is trustworthy since each agent has verified the identity of the other agent. The trust that is established and verified between the agents is based on the first and second information exchanged between the agents who, in turn, are derived from the relative identity of each agent.

Figure 3:
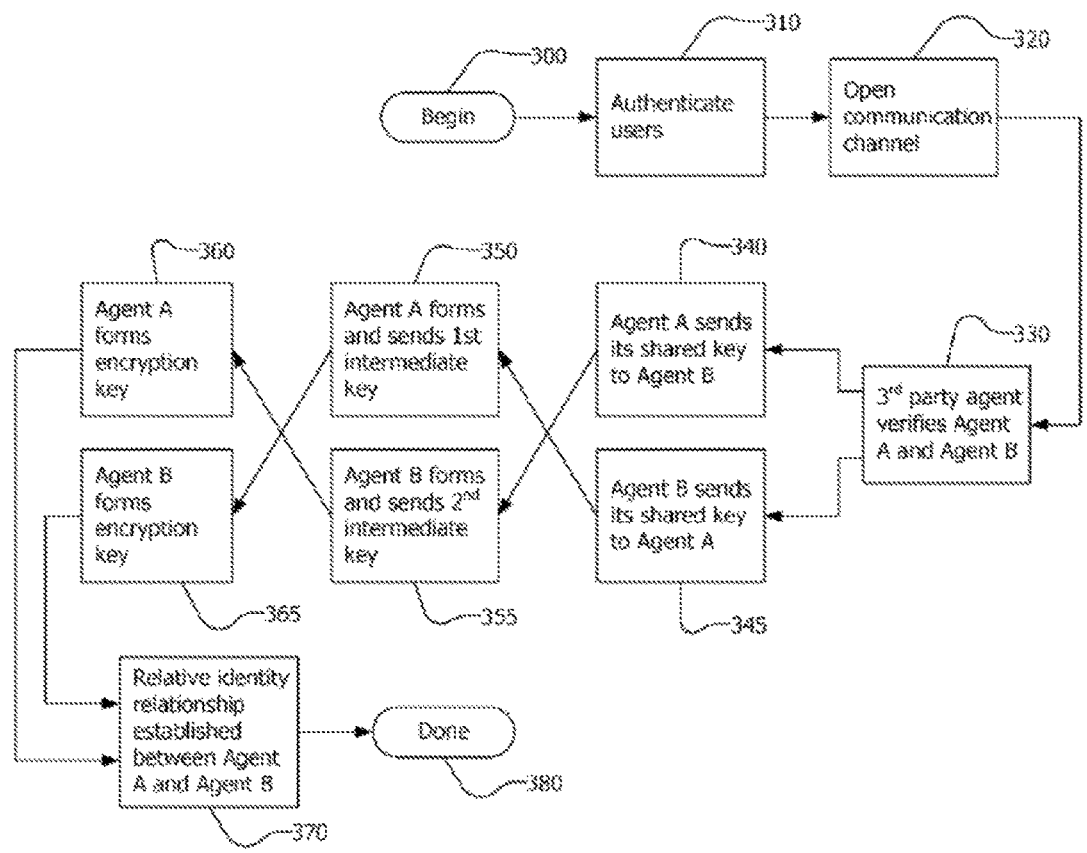
FIG. 3 is a flow chart of a process of establishing a relative identity relationship between two agents according to some embodiments.

FIG. 3 is a block diagram of another embodiment of a process to establish a relative identity relationship between two agents. The agents are again referred to as agent A and agent B. The process starts at 300 and ends at 380.

At 310, the agent A and agent B may be first authenticated to their respective computing devices. The agents may be authenticated to their respective computing devices in a number of ways, which may be the same or different for agent A and agent B. For example, when the local agent is under a user's control, the local agent may be authenticated using absolute identity information of the user. This could be, for example, a login ID and a password, and/or biometrics.

An agent may be authenticated to the computing device through relative identity. One technique for authenticating a user-controlled agent is to provide the computing device with an embedded master agent whose sole role is to interact with other agents installed in the computing device. Thus, for example, a user-controlled agent may authenticate itself to the embedded master agent based upon a relative identity between the user-controlled agent and the embedded master agent.

Either agent A or agent B may open a communication channel to the other agent at 320. At 330, a third party agent may optionally verify the identity of agent A and agent B and provide assurances to each agent of the identity of the other. The third party agent may be a specialized agent dedicated to verifying the identities of other agents on the network, or may be any agent that has established relative identity relationships with both agent A and agent B. The supervision of the third party agent is optional, and agent A and agent B may proceed to establish a relative identity relationship without third-party participation.

The process of FIG. 3 requires each agent to know or possess an absolute key and a partial relative key. Each agent's absolute key and the partial relative key may be obtained from an outside source (e.g., assigned to the agent) or may be generated within the agent. Keys may be generated using numerous techniques and algorithms. Agent A may acquire or generate a unique absolute key for each relationship between itself and other agents, including agent B. Agent A may have a single partial relative key used for all relationships, or may acquire or generate a unique partial relative key for each relationship with other agents. Similarly, agent B may have a unique absolute key for each relationship, and either a single partial relative key used for all relationships or a unique partial relative key for each relationship.

An agent's absolute key may not be transmitted or revealed to any other agent on the network. Not transmitting or revealing an agent's absolute key ensures that an agent's identity information cannot be stolen from transmission through the network since the identity information is not transmitted or revealed on the network. Since an agent has a unique absolute key for each relationship and the absolute keys are never transmitted or disclosed to other agents, each absolute key along with the partial relative key is equivalent to the relative identity of the agent for a specific relationship.

At 340 and 345, agents A and B exchange their respective partial relative keys. At 350, agent A forms a first intermediate key derived from agent A's absolute key and a function of the partial relative keys of both agent A and agent B. As previously described, the first intermediate key may be derived in numerous ways including using any of various algorithms or functions such as one-way hash functions, modulus functions, cyclic arithmetic operations, and various other algorithms. Similarly, at step 355, agent B forms a second intermediate key derived from its absolute key and a function of the partial relative keys of both agents. The first and second intermediate keys can be defined as follows:

$$Kn = f(a, q(c,d)) = \text{first immediate key, and}$$

$$K12 = f(b, q(c,d)) = \text{second immediate key}$$

where:
a=absolute key of agent A;
b=absolute key of agent B;
c=partial relative key of agent A;
d=partial relative key of agent B; and
f and q are suitable functions or algorithms.

It should be recognized that the first and second intermediate keys of this example are distinct from each other. Additionally, both the first and second intermediate keys are derived, in part, from the partial relative keys of the local and remote agents and are thus unique to the relationship between these two agents. While both the first and second intermediate keys are derived, in part, from the absolute key of the agent that calculated the intermediate key, the absolute keys cannot be determined from the intermediate keys.

At step 360, agent A may form an encryption key KAB by combining agent A's absolute key with the second intermediate key received from agent B. The combination of agent A's absolute key with the second intermediate key may be done using the same function or algorithm used to form the intermediate keys. Similarly, at step 365, agent B may form an encryption key KBA by combining agent B's absolute key with the first intermediate key received from agent A. The combination of agent B's absolute key with the first intermediate key may be done using the same function or algorithm used to form the intermediate keys.

The function used to form the intermediate keys and the encryption keys may be an associative function, in which case the following relationship will hold:

$$KAB=f[a,f(b,q(c,d))]=f[b,f(a,q(c,d))]=KBA.$$

Thus both agent A and agent B may be in possession of an encryption key that may be used to encrypt subsequent communications between the agents. Moreover, since the encryption key can only be created through the use of the secret keys of both agents, the key cannot be recreated by either agent alone, or by any other party, even if the other party intercepts the partial relative keys and the intermediate keys during transmission between agent A and agent B. After the encryption key is formed, agents A and B may each discard the partial relative key and the intermediate key received from the other agent.

Figure 4:
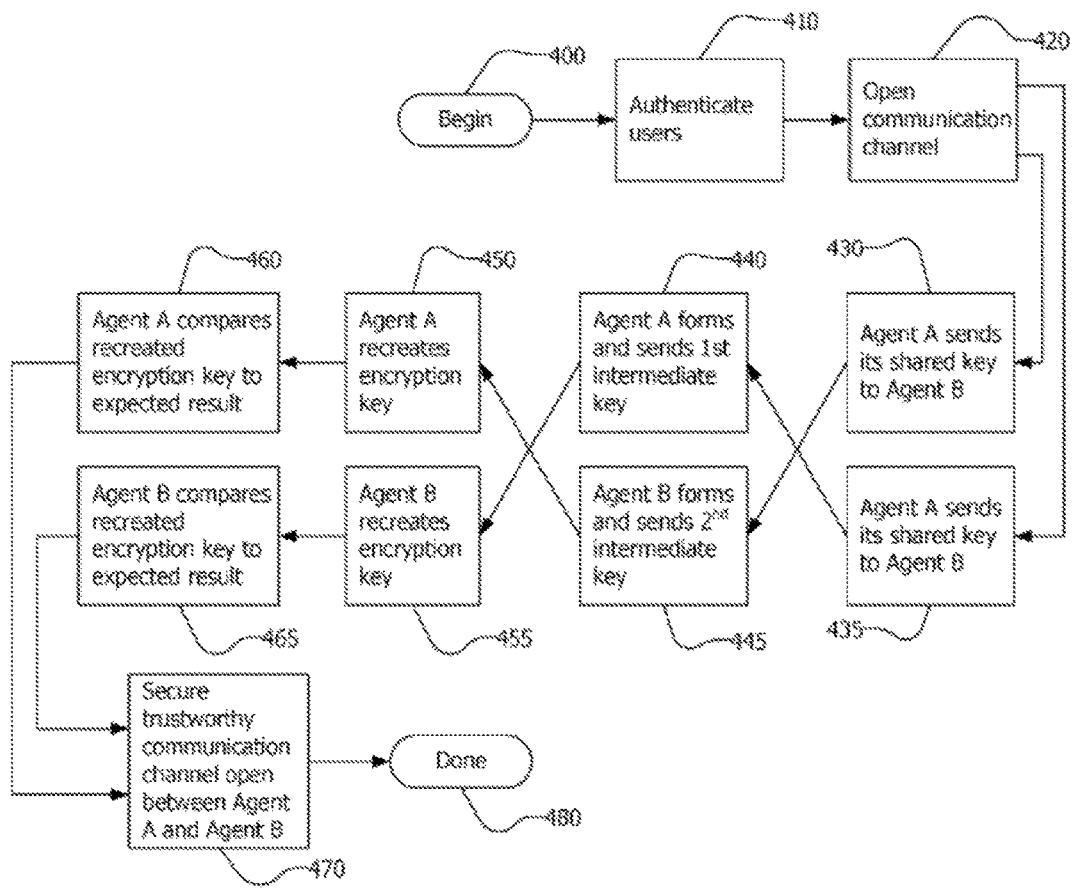
FIG. 4 is a flow chart of a process of establishing a secure trustworthy two-way communication channel between two agents having a relative identity relationship according to some embodiments.

Agent A and agent B may then use the encryption key and their respective absolute and partial relative keys to authenticate one another at the start of subsequent communications. As shown in FIG. 4, an embodiment of a process for opening a secure trustworthy communication channel between agent A and agent B involves recreating the encryption key using information received from the other agent. The process for establishing a secure trustworthy communication channel starts at 400 and ends at 480. Optionally, the agents and users may be authenticated at 410 using the methods previously described in conjunction with step 310 in FIG. 3.

Either agent A or agent B may open a communication channel at 420. At 430 and 435, agent A and agent B exchange their respective partial relative keys. At 440 and 445, agent A forms and sends the first intermediate key, and agent B forms and sends the second intermediate key. The function or algorithm used to form the first and second intermediate keys may be the same as those employed when establishing the relative identity relationship between agent A and agent B (at 350 and 355 of FIG. 3). At 450 and 455, agent A and agent B recreate the encryption key. Recreating the encryption key may be performed using the function or process previously used when establishing the relative identity relationship between agent A and agent B (at 360 and 365 of FIG. 3).

At 460, agent A may compare the recreated encryption key from 450 with the known value of the encryption key. An exact match between the recreated and known encryption keys validates the identity of agent B to agent A. Similarly agent B may validate the identity of agent A at 465. A secure trustworthy communication channel may be opened between agent A and agent B at 470 only if both agents have successfully validated the identity of the other agent.

It must be noted that an impostor (e.g. Phisher) attempting to act as agent B must possess agent B's absolute and partial relative keys, as well as have knowledge of the functions or algorithms used to form the intermediate key and encryption key. In the optional situation where the communications between agent A and agent B are encrypted using the encryption key, the imposter would have to know the encryption key as well. Since the encryption key and the absolute key are never disclosed outside of the agent or transmitted over the network, the use of relative identity provides substantial protection against phishers and other impostors.

Figure 5:
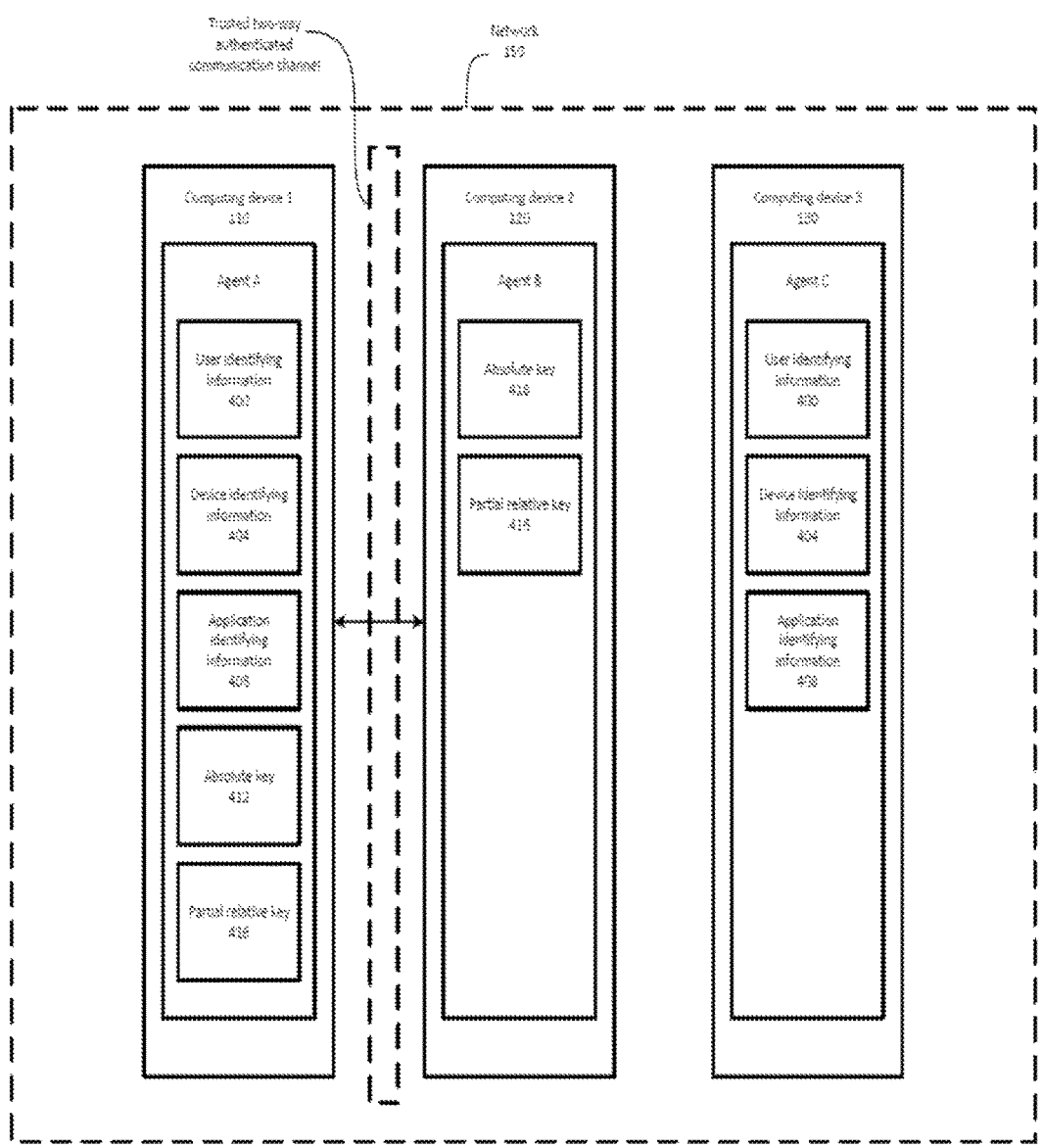
FIG. 5 is a block diagram of a system in which secure trustworthy two-way communication channels may be established and used according to some embodiments.

In the example illustrated in FIG. 5, either agent A or agent B is associated with a specific user having user identifying information 400, a specific computing device having device identifying information 404, and a specific software application having application identifying information 408. The term "user identifying information" is generally used to refer to personal identifying information associated with the user. Exemplary user identification may include a name, an address, a birthdate, a social security number, a user name, a password, or factual data about the user's life or family history. The term "device identifying information" is generally used to refer to identifying information associated with a specific computing device. Exemplary device identification information may include a serial number of the device, a type of the device (e.g. mobile phone, tablet, laptop computer), or an IP address of the computing device. The term "application identifying information" is generally used to refer to identifying information associated with a specific instance of the instance of the software application. Exemplary application identifying information may include a serial number of the software application, a version of the software application, and a type of device on which the application is programmed to run (e.g. a specific brand of computing device or a specific operating system of the computing device). Either agent A, agent B, or both agent A and agent B are associated with specific user identifying information 400, device identifying information, 404 or application identification information 408.

For example, in the embodiment illustrated in FIG. 5, agent A is associated with the user identifying information 400, the device identifying information 404, and the software application identifying information 408. A relative identity is then formed between agent A and agent B according to the method described in FIGS. 2 and 4. In either method, a portion of the user identifying information 400, a portion of the device identifying information 404, and a portion of the application identifying information is shared with agent B in the process of forming the relative identity, and a portion of the user identifying information 400, a portion of the device identifying information 404, and a portion of the application identifying information is not shared with agent B. For example, for processes requiring agent A to know or possess the absolute key 412 and the partial relative key 416 and requiring agent B to know or possesses the absolute key 420 and the partial relative key 424, the absolute key 412, the partial relative key 416, and the partial relative key 424 may all include the portion of the user identifying information, the portion of the device identifying information, and the portion of the application identifying information. Accordingly, after the relative identity relationship has been established between agent A and agent B, in order to establish the trusted two-way authenticated communication channel between agent A and agent B, the user, the computing device, and the instance of the software application attempting to open the trusted two-way authenticated communication channel between agent A and agent B must be the same as the user, the computing device, and the instance of the application used to establish the relative identity relationship between agent A and agent B.

Since the relative identity established by agent A and agent B is specific to the user, the computing device, and the instance of the software application used to establish the relative identity relationship, the encryption key created in terms of the relative identity relationship is unique to the specific relationship between agent A and agent B. Accordingly, agent A and agent B have a 1:1 authentication relationship. When agent A or agent B opens the trusted two-way authenticated communication channel, agent A or agent B refers to the relative identity relationship, for example by using a relationship identifier that is distinct from the encryption key. Agent A and agent B then recreate the encryption key using the relative identity relationship. Since the relative identity is specific to the software application used to initiate the relative identity relationship, after the initial configuration of the relative identity relationship, the trusted two-way authenticated communication channel may not be opened by a generic interaction between agent A and agent B, agent A and a third party, or agent B and the third party.

Either agent A or agent B may specify an amount of user identifying information 400, device identifying information 404, or software application identifying information 408 that must be used to establish the relative identity relationship. Relative identity relationships made using a relatively large amount of user identifying information 400, device identifying information 404, or software application identifying information 408 are more secure than relative identity relationships made using a relatively small amount of user identifying information 400, device identifying information 404, or software application identifying information 408.

Figure 6:
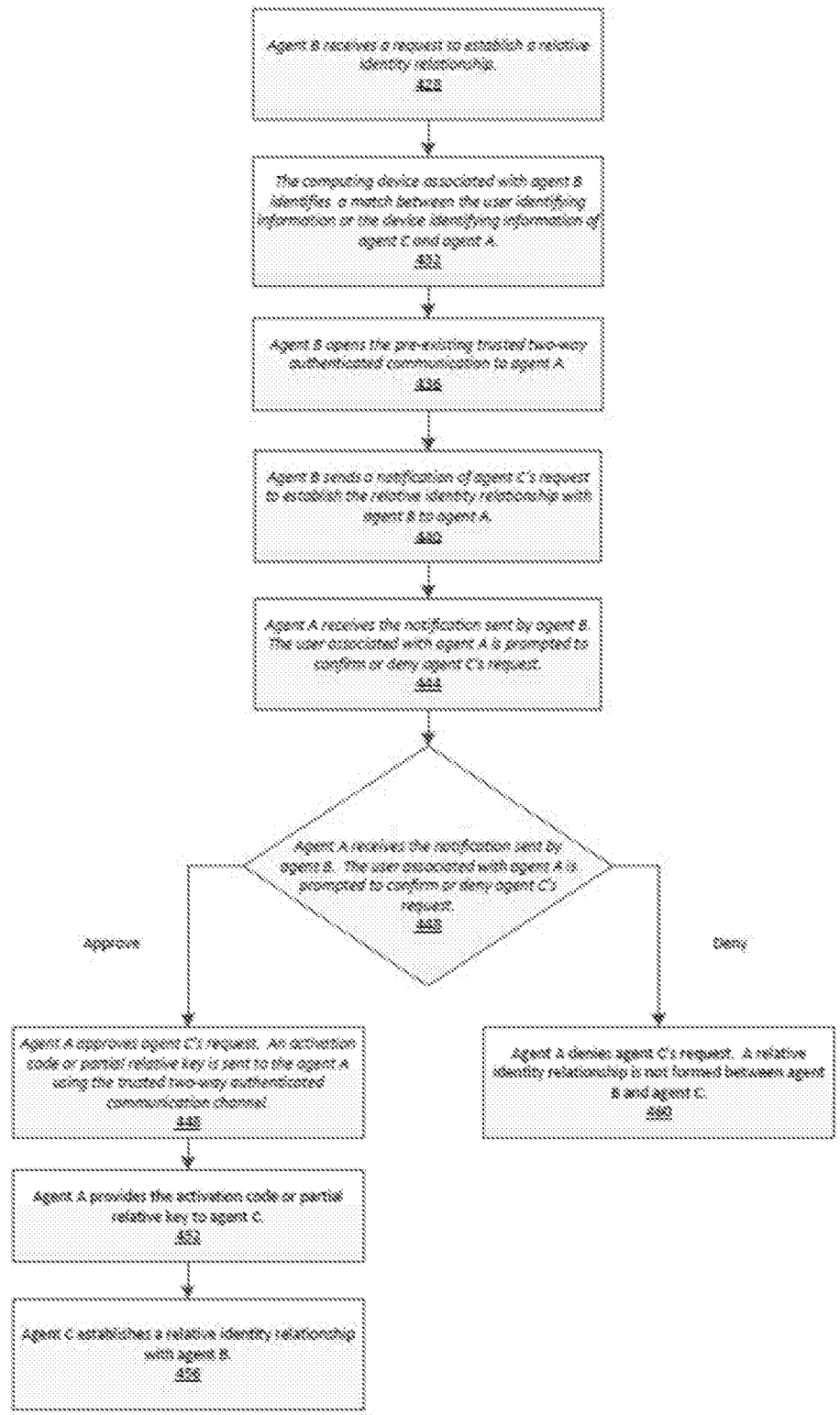
FIG. 6 is a method of leveraging an existing secure trustworthy two-way communication channel to establish a second secure trustworthy two-way communication channel according to some embodiments.

In some embodiments, the relative identity relationship established between agent A and agent B as described above with respect to FIG. 5 may be used to authenticate an attempt by a third agent, agent C, to establish a relative identity with agent B or with agent A. In the embodiment of FIG. 6, agent A and agent C are associated with at least one of the same user or the same device. In such a method, agent B receives a request to establish the relative identity relationship from Agent C that includes the user identifying information 400, the device identifying information 408, and the application identifying information 412 corresponding to agent C (block 428). After receiving the request from agent C, the computing device associated with agent B identifies a match between at least one of the user identity information and the device identity information of agent A (block 432). Agent B then opens the trusted two-way authenticated communication channel using the previously-established relative identity relationship between agent A and agent B (block 436). After opening the trusted two-way authenticated communication channel, agent B sends a notification of agent C's request to establish the relative identity relationship to agent A and prompts agent A to confirm or deny agent C's request to establish the relative identity relationship (block 440). The notification sent by agent B to agent A over the trusted two-way authenticated communication channel includes the user identifying information 400, the device identifying information 404, and the application identifying information 408 sent with agent C's request. After receiving the notification sent by agent B, a user controlling agent A may confirm or deny agent C's request (block 444). If agent A approves agent C's request, agent B sends agent A a notification that includes information for use in establishing the relative identity between agent B and agent C, such as an activation code or the partial relative key 424, to agent A using the trusted two-way authenticated communication channel (block 448). Agent A then provides the information for use in establishing the relative identity between agent B and agent C to agent C (block 452). Agent B and agent C then establish the relative identity relationship using the process described above in FIGS. 2 and 4 (block 456). If agent A denies agent C's request, the relative identity relationship is not formed between agent A and agent B (block 460). Accordingly, the trusted two-way authenticated communication channel between agent B and agent C may be authenticated without the use of a third-party authentication service or a third-party verification or certification service.

In some embodiments, the relative identity relationship established between agent A and agent B or agent C and agent B may be used to authenticate an attempt by a fourth agent, agent D, to establish a relative identity with agent B. As described above with respect to the authentication of agent C's attempt to establish a relative identity relationship with agent B, the previously-established relative identity relationship between agent A and agent B or agent C and agent B may be opened in response to a request from agent D to form a relative identity relationship with agent B. Accordingly, the trusted two-way authenticated communication channel between agent B and agent C may be authenticated without the use of a third-party authentication service or a third-party verification or certification service.

In some constructions, any of the instances of the software application may be operable to manage the relative identity relationships. For example, if a user is associated with several agents, for example agents A, C, and D that have relative identity relationships with another agent, such as agent B, the instance of the software application associated with one of agent A, agent C, or agent D may be used to remove relative identity relationships between agent B and the others of agent A, agent C, or agent D. In some constructions, the most recently established of the agents associated with a user such as, for example, agents A, C, or D associated with a user cannot be used to remove the agent that was used to confirm the most recently established agent's request to form a relative identity relationship with another agent, such as agent B.

In an exemplary embodiment involving the system of FIG. 5 and the method of FIG. 6, agent A may be a customer and agent B may be a bank. The customer downloads a first copy of the software application provided by the bank onto a first computing device having first device identity information. Each instance (e.g. copy) of the software application includes unique application identity information. When the customer opens the first copy of the software application for a first time, the first copy of the software application prompts the customer to enter the personal identifying information or the absolute identity information of the user. The customer then uses the first copy of the software application to request to establish the relative identity relationship with the bank. A portion of the user identifying information 400, the device identifying information 404, and the application identifying information 408 of the customer is sent to the bank. The bank sends information to the customer for use in establishing the relative identity relationship with the customer as described above with respect to FIGS. 2 and 4. For example, the customer's account number for a specific account in the bank may be used to generate the relative identity relationship. After the relative identity relationship between the customer and the bank is formed, the customer and the bank may use the software application to communicate using the trusted two-way authenticated communication channel. In some constructions, the user identifying information or the absolute identity information used to establish the relative identity between the customer and the bank is stored in a memory of the computing device associated with the customer and accessed by the first copy of the software application when the customer opens the secure communication channel. In other constructions, the user identifying information or absolute identity information used to establish the relative identity relationship between the customer and the bank is not stored on the first copy of the software application and must be entered the customer each time the trusted two-way communication channel is opened.

Since the relative identity relationship established between the customer and the bank is created using a portion of the user identifying information 400, a portion of the device identifying information 404, and a portion of the application identifying information 408, the trusted two-way authenticated communication channel can only be open if the user, the device, and the copy of the application used to initiate the attempt to open the trusted two-way authenticated communication channel are all the same as the user, the device, and the copy of the application are the same as were used to establish the relative identity relationship between the customer and the bank. For example, if the customer deletes the first copy of the software application from the first computing device and installs a second copy of the software application onto the first computing device, the customer cannot use the second copy of the software application to access the trusted two-way authenticated communication channel established using the first copy of the software application. Instead, the customer will be prompted to establish a new relative identity relationship with the bank when the user tries to use the second copy of the software application to open the trusted two-way authenticated communication channel. Similarly, a person other than the customer who established the trusted two-way authenticated communication channel attempts to the customer cannot use the first copy of the software application to access the trusted two-way authenticated communication channel established by the customer. Instead, the person other than the customer will be prompted to establish a new relative identity relationship with the bank when the person other than the customer tries to use open the trusted two-way authenticated communication channel.

Continuing with the present example, the customer may download a third copy of the software application onto a second computing device. When the customer opens the third copy of the software application for a first time, the third copy of the software application prompts the customer to enter personal identifying information or absolute identify information to the third copy of the software application. The customer then uses the third copy of the software application to request to establish a relative identity relationship with the bank. A portion of the user identifying information 400, a portion of the device identifying information 404, and a portion of the application identifying information 408 of the customer is sent to the bank and the bank sends information to the customer for use in establishing the relative identity relationship with the customer as described above with respect to FIGS. 2 and 4. Since the customer has a pre-existing relative identity relationship with the bank using the first copy of the software application and the first computing device, a portion of the user identifying information 400 sent in the third software application's request to establish a relative identity relationship will match a portion of the user identifying information 400 associated with the customer's existing relative identity relationship with the bank. After identifying the match between the request sent by the third copy of the software app and the customer, the bank opens the trusted communication channel between the customer, the first device, and the first copy of the software application (e.g. a pre-existing trusted two-way authenticated communication channel) and sends a notification of the third copy of the application's request to the customer over the pre-existing trusted two-way authenticated communication channel. The notification includes at least a portion of the user identifying information 400, a portion of the device identifying information 404, and a portion of the application identifying information 408 that the third copy of the software application included in the request to the bank. After receiving the notification sent over the pre-existing trusted two-way authenticated communication channel, the customer may approve or deny the request sent by the third copy of the software application. Since in this example, the request is a genuine request made by the customer, the customer approves the request included in the notification using the pre-existing trusted two-way communication channel. After receiving the customer's approval of the request, the bank sends the activation code or the partial key to the customer using the pre-existing trusted two-way communication channel. After receiving the activation code or the partial key from the bank, the customer may enter the activation code or the partial key into the third copy of the software application. After the customer has approved the request, the third copy of the software application and the bank establishes the relative identity relationship. When the request is not a genuine request made by the customer, the customer may deny the request included using the pre-existing trusted two-way communication channel, and a relative identity relationship is not established. In some constructions, the user identifying information 400, the device identifying information 404, and the application identifying information 408 may be retained by the bank.

Figure 7:
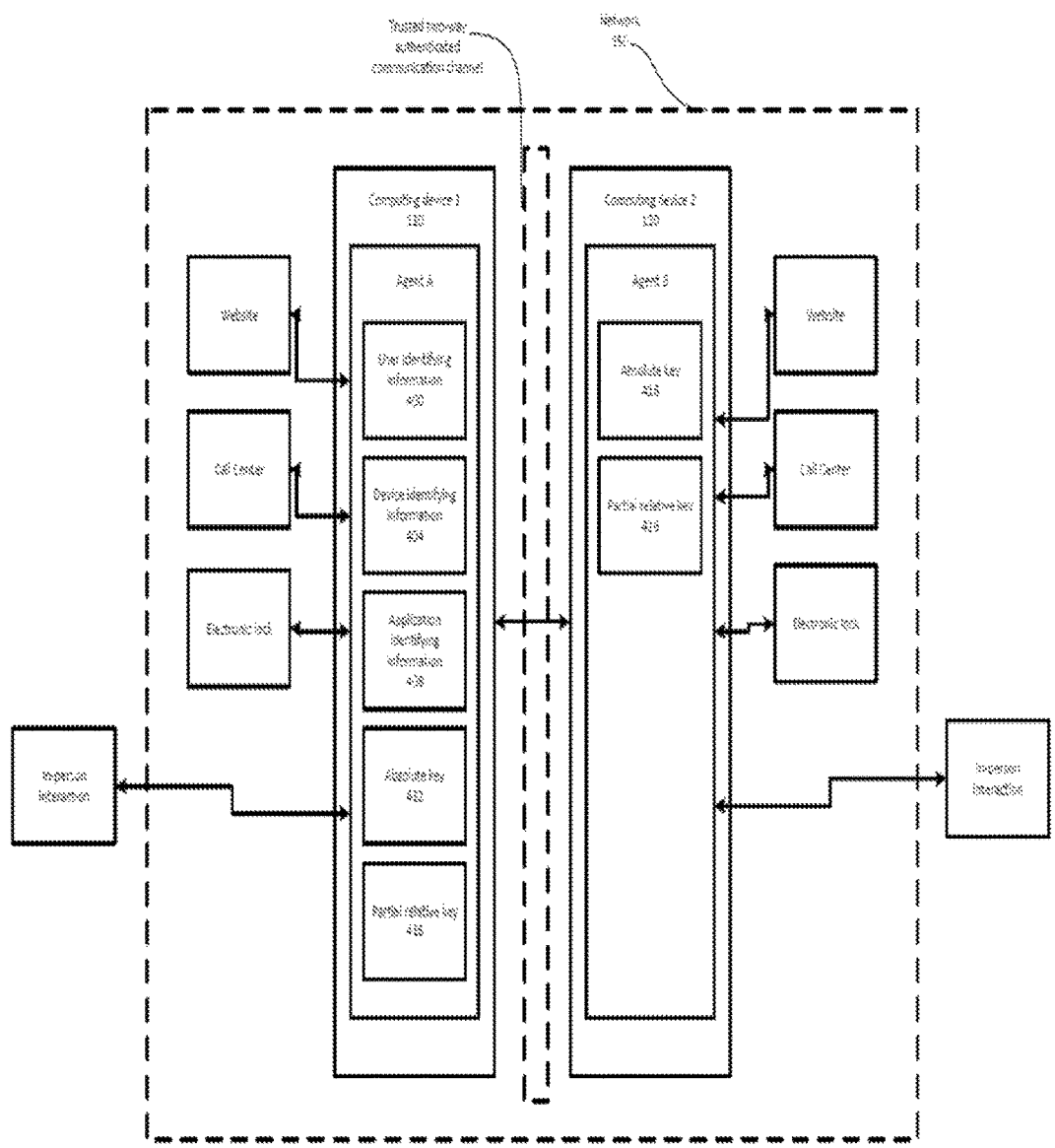
FIG. 7 is a block diagram of a system in which an existing secure trustworthy two-way communication channel may be used to authenticate interactions made over an unsecured connection according to some embodiments.

In some embodiments, the pre-existing trusted two-way authenticated communication channel may be leveraged to authenticate requests made between agent A and agent B over an unsecured connection. Exemplary unsecured connections may include a web browser, a telephone to a call center, or an in-person interaction (e.g. between a customer and an employee of a service provider). As shown in FIG. 7, agent A and agent B may have the relative identity relationship that allows agent A and agent B to communicate using the trusted two-way authenticated communication channel. Agent A and agent B may also communicate using the unsecured connection. When agent A and agent B communicate using the unsecured connection, either agent A or agent B may use the pre-existing trusted two-way authenticated communication channel to request confirmation of instructions or a request made by agent A or agent B using the unsecured communication channel prior to following the instructions or responding to the request. In this manner, the pre-existing authenticated trusted two-way communication channel may be leveraged to validate the relative identity relationship between agent A and agent B without relying on third-party validation services or requiring personal identifying information or absolute identity information to be shared over the unsecured connection.

Figure 8:
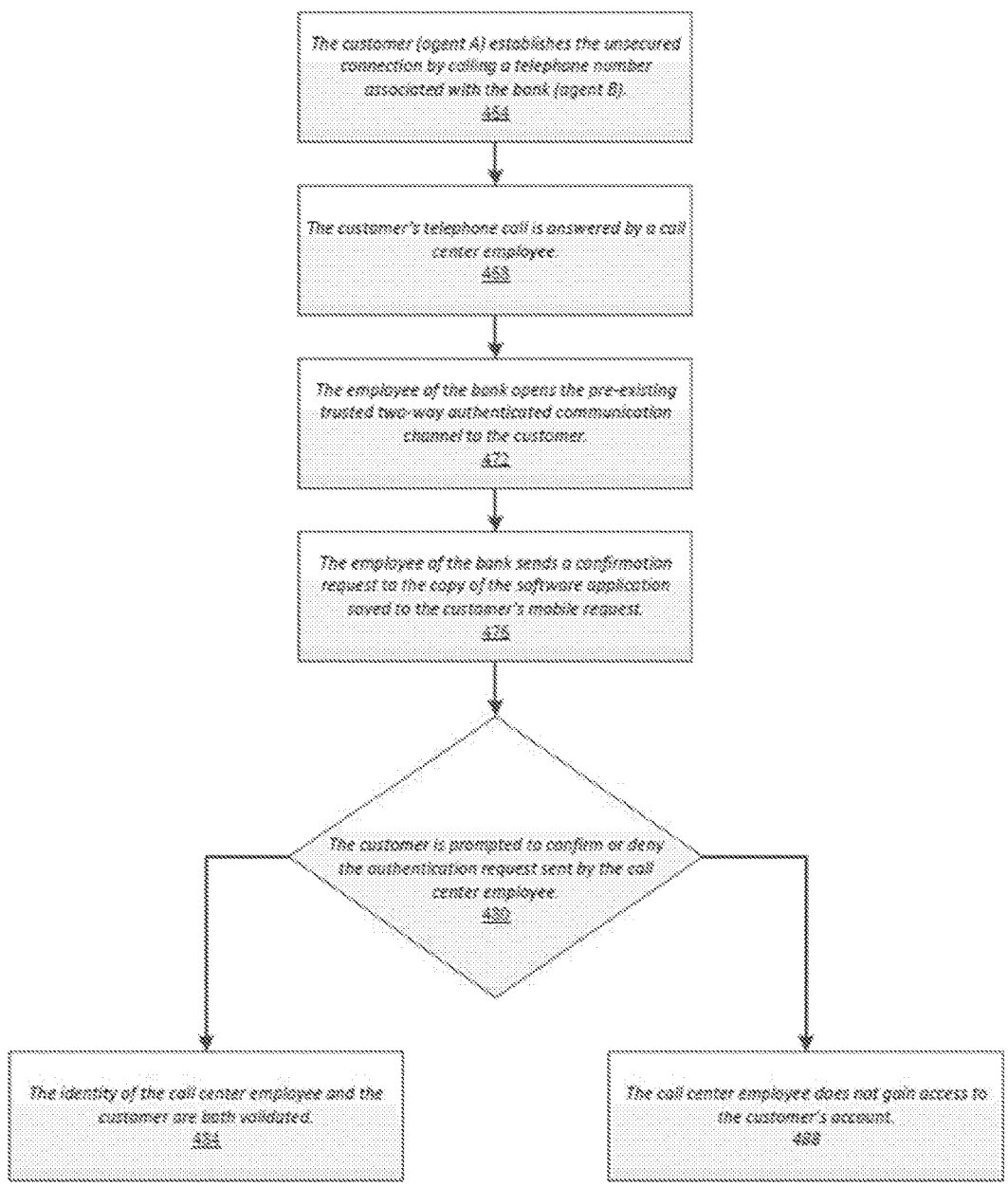
FIG. 8 is a method of leveraging an existing secure trustworthy two-way communication channel to authenticate interactions made over an unsecured connection according to some embodiments.

FIG. 8 illustrates a flowchart of an exemplary embodiment in which agent A may be a customer and agent B may be a bank. The customer has downloaded the software application provided by the bank onto the computing device. The customer has used the software application to establish the relative identity relationship with the bank. The relative identity has been established using a portion of the customer's user identifying information 400, a portion of the device identifying information 404, and a portion of the application identifying information 408 and the partial relative key 424 associated with the bank. Since the customer and the bank have established the relative identity relationship, the customer and the bank may use the software application to communicate using the trusted two-way authenticated communication channel.

In addition to communicating using the trusted two-way authenticated communication channel, the customer and the bank may communicate over an unsecured communication channel. For example, in the embodiment of FIG. 8, the unsecured communication channel is a phone call to a call center associated with the bank. As shown in FIG. 8, the customer establishes the unsecured connection by calling a telephone number associated with the bank (block 464). The customer's telephone call is answered by a call center employee (block 468). At the time that the customer's telephone call is answered, the customer has no verification that the person that answered the telephone call is an employee of the bank and the employee of the bank has no verification that the caller is actually the customer. Accordingly, after answering the telephone call, the employee of the bank may open the trusted two-way authenticated communication channel to for mutual verification between the customer and the bank (block 472). For example, the employee of the bank may send a confirmation request to the copy of the software application saved to the customer's mobile device requesting the customer authenticate that the call is genuine (block 476). The customer is prompted to accept or deny the authentication request (block 480). If the customer accepts the authentication request, the identity of both the customer and the bank are validated without the exchange of personal identifying information between the customer and the employee at the call center (block 484). If the customer denies the confirmation request, the call center employee is denied access to the customer's account information (block 488). In some embodiments, the notification sent to the customer is customizable. For example, in some embodiments, the employee of the bank introduces him or herself on the phone before sending the request. The notification sent to the customer would then include a name of the employee at the call center, so that the customer could have confirmation through the trusted two-way authenticated communication channel that the person on the phone call is actually an employee of the bank. For example, the notification may indicate the name and the location of the employee of the bank that was previously communicated to the customer during the phone call.

In some embodiments, the trusted two-way authenticated communication channel may be used to approve specific transaction made by the customer using the customer's account at the bank. For example, whenever a transaction using a credit card or a debit card is made by the customer, the bank may open the trusted two-way authenticated communication channel with the customer and send the customer a notification of the transaction. The notification requires the customer to approve or deny the transaction before the bank releases the funds for the transaction. In some embodiments, the customer may customize the transactions that require approval. For example, the customer may only require approval for transactions exceeding a predetermined amount of money. In some embodiments, the bank may customize the transactions that require verified approval. For example, the bank may require authenticated verification for any requests to transfer funds, add a new person to an account, change an address associated with the account, or change a beneficiary of the account. In such an embodiment, after receiving a request to transfer funds from the customer, the bank sends a notification to the copy of the software application saved on the customer's device using the trusted two-way authenticated communication channel. In some embodiments, the bank may customize the text of the notification for each transaction. For example, the confirmation request may include an account number from which the money will be withdrawn, an account number to which the money will be transferred, and an amount of money that will be transferred. In such an embodiment, the bank may save the customer's approval of the request to have an auditable trail of the transaction. Since the notification is sent to the customer before the transaction occurs, the customer has an additional opportunity to confirm that transaction request is correct. If the transaction request is incorrect, the customer may deny the confirmation request included in the notification before the money is transferred incorrectly. Furthermore, if the transaction included in the confirmation request is fraudulent, the customer may deny the transaction request before the money has been transferred to the thief.

In other embodiments, the trusted two-way authenticated communication channel may be used to confirm requests made between agent A and agent B using other types of unsecured communication channels. For example, in some embodiments, the unsecured communication channel may be a web browser, agent A may be a customer, and agent B may be a service provider that has a website accessible by a browser. In such an embodiment, agent A and agent B have established the relative identification as described above. Accordingly, before the user makes a transaction request from the service provider, the customer may leverage the trusted two-way authentication channel to confirm that the webpage is genuinely associated with the service provider before making a transaction. The customer or the service provider may also leverage the trusted two-way authenticated communication channel to confirm or deny service requests or transaction requests made using the browser without relying on third-party verification services.

In other embodiments, the unsecured communication channel may be an in-person interaction. In such an embodiment, agent A is a customer, and agent B is a service provider. The customer interacts in-person with the service provider through an employee of the service provider. In such an embodiment, the customer and the service provider have established a relative identity relationship as described above. Accordingly, when beginning an in-person interaction between the customer or the employee, the customer may leverage the trusted two-way authenticated communication channel to require the employee to confirm a relationship to the service provider. The employee may leverage the trusted two-way authenticated communication channel to confirm that the customer does have a relationship with the service provider without requiring the customer to provide any personal identifying information in a public setting.

In other embodiments, the unsecured communication channel may be a physical lock, such as a lockbox or a locked door. In such an embodiment, agent A is a user, and agent B the owner of the lock. In such an embodiment, agent A and agent B have established the relative identification as described above. Accordingly, when agent A requests access to the locked box or the locked door, agent A may leverage the existing two-way authenticated communication channel to send an access request to agent B to unlock the door. After agent B has approved the access request sent by agent A, the door may unlock. Agent B may also deny permission for agent A to unlock the door. In some constructions, the access request sent by agent A may be customized by agent B. For example, the access request sent by agent A may include an identity of the requester, a time and a data of the access request, and a location of the access request. Agent B may store the access requests from agent A and confirmation responses sent from agent B to agent A to have an auditable trail of agents that have requested access and agents that have been granted access.

Figure 9:
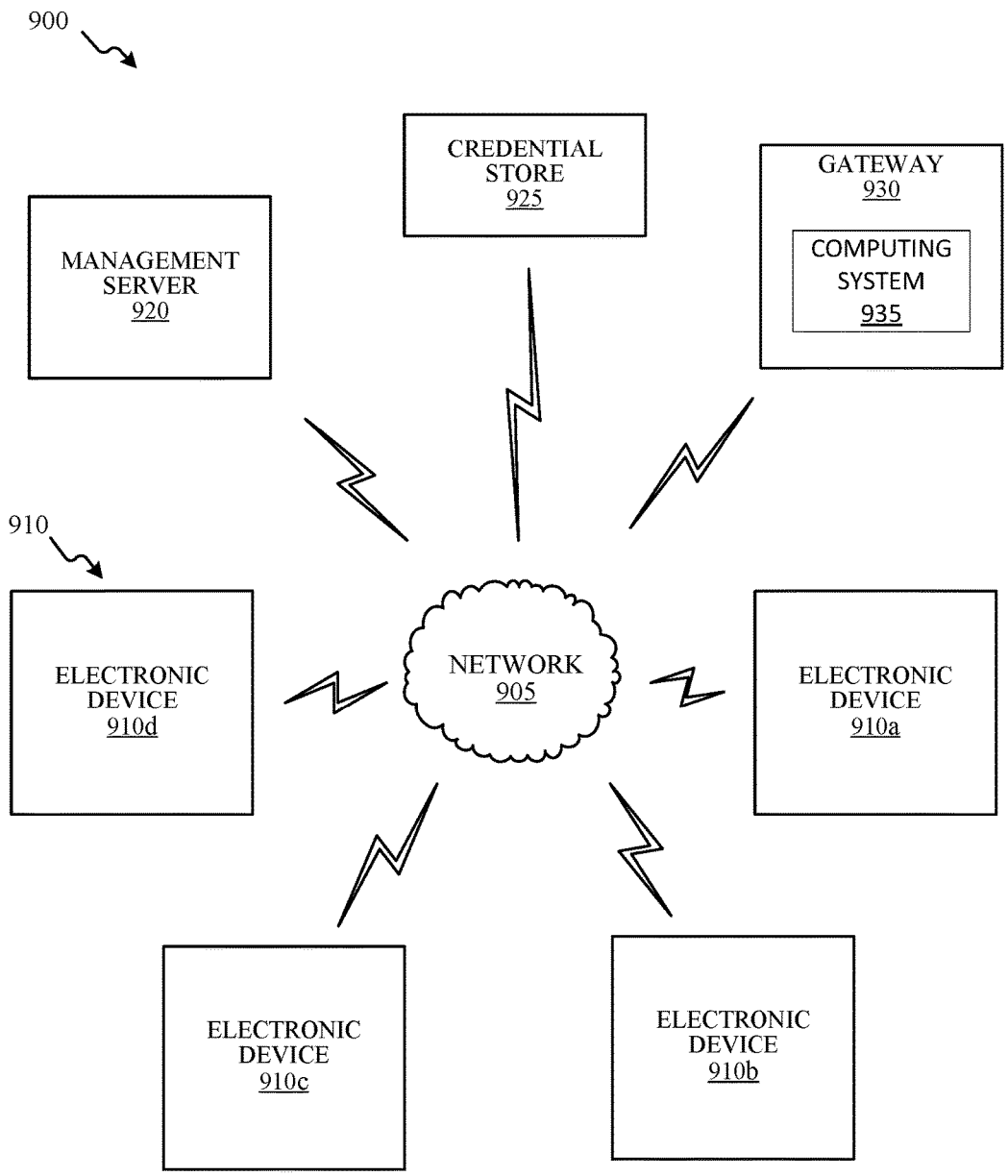
FIG. 9 illustrates a non-limiting, example network context for performing one or more network-based key distribution operations according to certain embodiments of this disclosure.

FIG. 9 illustrates a non-limiting, example network context 900 for performing one or more network-based key distribution operations according to certain embodiments of this disclosure. One or more components of the network context 900 may operate as separate components linked by one or more constituent networks of the network 905. In some embodiments, one or more constituent networks of the network 905 may include the internet, which can be accessed over both wired connections (e.g., an Ethernet connection) or over a wireless connection (e.g., a wireless local area network "WLAN" connection, a cellular network connection). Additionally, or alternatively, one or more constituent networks of the network 905 may include a combination of private networks (e.g., a local wireless mesh network) and public networks (e.g., a telephone (POTS) network). In certain embodiments, one or more constituent networks of the network 905 may support multiple communication protocols, including both wireless protocols (e.g., BLUETOOTH™, circuit-switched cellular, 3G, LTE, WiBro) and internet protocols (e.g., HTTP).

The network context 900 may also include one or more electronic devices 910, one or more management servers 920, one or more credential stores 925, and one or more gateways 930. In certain embodiments, each of the one or more electronic devices 910, each of the one or more management servers 920, and each of the one or more credential stores 925 may be agents as described herein. The one or more constituent networks of the network 905 provide two-way electronic connectivity and electronic communication between each of the electronic devices 910, the management server 920, the credential store 925, and the gateway 930. In certain embodiments, the one or more constituent networks of the network 905 provide two-way electronic connectivity and electronic communication between each of the electronic devices 910, the management server 920, the credential store 925, and the gateway 930 using one or more same or different channels, protocols, or networks of network 905. For example, a circuit-switched cellular protocol wireless network of the network 905 provides electronic connectivity and electronic communication between an electronic device 910 and the gateway 930 while a POTS wireless network of the network 905 provides electronic connectivity and electronic communication between the gateway 930 and at least one of the management server 920 or the credential store 925.

In certain embodiments, the network context 900 includes one or more electronic devices 910. The one or more electronic devices 910 may include a first electronic device 910a, a second electronic device 910b, a third electronic device 910c, and a fourth electronic device 910d. In certain embodiments, each of the one or more electronic devices 910 is configured to communicate data with the management server 920, the credential store 925, and the gateway 930 through the network 905. In certain embodiments, each of the one or more electronic devices 910 includes an electronic device display screen, an electronic device memory, and one or more electronic device processors. In certain embodiments, the electronic device memory may store one or more executable instructions that, when executed by the one or more electronic device processors, cause the one or more electronic device processors to perform at least one of one or more identity authentication operations, one or more application key generation and division operations, one or more login operations, or the like. In certain embodiments, the credential store memory may store one or more executable instructions that, when executed by the one or more credential store processors, cause the one or more credential server processors to perform one or more network-based key distribution functions described herein.

In certain embodiments, each of the one or more electronic devices 910 may receive and store one or more electronic applications (e.g., one or more electronically executed instructions) in the electronic device memory. The electronic application may include a file containing an application universally unique identifier (UUID) and a client encrypted key (Enc-$AK_c$) that is one-half of an application key. The electronic devices 910 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, a storage device, a peripheral device such as a switch, modem, router, or in general any type of electronic computing device.

In certain embodiments, the network context 900 may include one or more management servers 920. Each of the one or more management servers 920 may include a management server memory and one or more management server processors. In certain embodiments, the management server memory may store one or more executable instructions that, when executed by the one or more management server processors, cause the one or more management server processors to perform at least one of one or more identity authentication operations, one or more application key generation and division operations, one or more login operations, or the like. In certain embodiments, the management server memory may store one or more executable instructions that, when executed by the one or more management server processors, cause the one or more management server processors to perform one or more network-based key distribution operations described herein.

In certain embodiments, at least one management server 920 of the one or more management servers 920 may be located in a secured zone (SZ), for example, protected by one or more firewalls or one or more gateways (e.g., the one or more gateways 930, one or more other gateways). The one or more management servers 920 may be clustered and load balanced. Additionally, or alternatively, the one or more management servers 920 may support high availability (HA) configurations including hot standby disaster recovery (DR) configurations and warm standby DR configurations. The one or more management servers 920 may operate on and communicate with public clouds such as the AMAZON WEB SERVICES™ (AWS) cloud. In certain embodiments, the one or more management servers 920 may be deployed in a physical configuration or in a virtual machine (VM) based configuration. The one or more management servers 920 may access and use a credential store (e.g., the credential store 925) that is a component of the management server 920.

Additionally, or alternatively, the one or more management servers 920 may access and use an external or existing credential store (e.g., the credential store 925) such as an active directory credential store or a lightweight directory access protocol (LDAP) credential store. In certain embodiments, the one or more management servers 920 may perform authentication functions (e.g., account authentication functions, user profile authentication functions, application authentication functions) in addition to or as an alternative to an external and existing authentication server. In certain embodiments, at least one management server 920 of the one or more management servers 920 may be a REL-ID™ management server provided by Uniken, Inc.

In certain embodiments, the one or more management servers 920 may generate one or more files each containing a unique application key and a UUID. The one or more management servers 920 may divide each unique application key into a server key ($AK_s$) and a client encrypted key (Enc-$AK_c$). The one or more management servers 920 may provide a client file containing the client encrypted key (Enc-$AK_c$) and the associated UUID for embedding in an electronic application to be stored in an electronic device memory of an electronic device 910. The one or more management servers 920 may also transmit a corresponding server file containing the server key ($AK_s$) and the same UUID contained in the client file to a credential store (e.g., the one or more credential stores 925) for subsequent authentication described herein. The one or more management servers 920 may perform one or more network-based key distribution operations as described at least with respect to the methods of FIGS. 13-20 provided herein.

In certain embodiments, the network context 900 may include one or more credential stores 925. Each of the one or more credential stores 925 may include a credential stores memory and one or more credential store processors. In certain embodiments, the credential store memory may store one or more executable instructions that, when executed by the one or more credential store processors, cause the one or more credential server processors to perform one or more identity authentication operations, one or more application key generation and division operations, one or more login operations, or the like. In certain embodiments, the credential store memory may store one or more executable instructions that, when executed by the one or more credential store processors, cause the one or more credential server processors to perform one or more network-based key distribution functions described herein.

At least one credential store 925 of the one or more credential stores 925 may be located in a secured zone (SZ), for example, protected by one or more firewalls or one or more gateways (e.g., the one or more gateways 930, one or more other gateways). The one or more credential stores 925 may be clustered and load balanced. Additionally, or alternatively, the one or more credential stores 925 may support high availability (HA) configurations including hot standby disaster recovery (DR) configurations and warm standby DR configurations. The one or more credential stores 925 may be deployed in a physical configuration or in a virtual machine (VM) based configuration. In certain embodiments, the one or more credential stores 925 may be a component of a management server 920 and may be accessed and used by at least one management server 920 of the one or more management servers 920. Additionally, or alternatively, the one or more credential stores 925 may be a separate component from the one or more management servers 920 and may be accessed and used by at least one management server 920 of the one or more management servers 920. In certain embodiments, at least one credential store 925 of the one or more credential stores 925 may be a REL-ID™ credential store provided by Uniken, Inc.

The one or more credential stores 925 may be configured to generate one or more files each containing a unique application key and a UUID. The one or more credential stores 925 may divide each unique application key into a server key ($AK_s$) and a client encrypted key (Enc-$AK_s$). The one or more credential stores 925 may provide a client file containing the client encrypted key (Enc-$AK_c$) and the associated UUID for embedding in an electronic application to be stored in an electronic device memory of an electronic device 910. The one or more credential stores 925 may also store a corresponding server file containing the server key ($AK_s$) and the same UUID contained in the client file for subsequent authentication described herein. The one or more credential stores 925 may perform one or more network-based key distribution operations as described at least with respect to the methods of FIGS. 13-20 provided herein.

In certain embodiments, the network context 900 may include one or more gateways 930. Each of the one or more gateways 930 may be configured to control electronic data transmission and communication between two agents through the network 905. For example, a gateway 930 may be configured to receive electronic data from an electronic device 910 (e.g., through the network 905) or control a reception of electronic data from an electronic device 910 (e.g., through the network 905) and transmit that electronic data or control a transmission of that electronic data to at least one of a management server 920 or a credential store 925 (e.g., through the network 905). As another example, a gateway 930 may be configured to receive electronic data or control a reception of electronic data from at least one of a management server 920 or a credential store 925 (e.g., through the network 905) and transmit that electronic data or control a transmission of that electronic data to at least one electronic device 910 (e.g., through the network 905).

Additionally, or alternatively, each of the one or more gateways 930 may be configured to perform one or more authentication and protocol functions. In certain embodiments, each of the one or more gateways 930 may be configured to perform one or more electronic data authentication functions. For example, each of the one or more gateways 930 may be configured to perform an authentication test on electronic data received from one or more electronic devices 910 (e.g., through the network 905) and determine whether or not to transmit that electronic data or permit the transmission of that electronic data to at least one of a management server 920 or a credential store 925 based on whether or not the electronic data has been authenticated as described herein. In certain embodiments, each of the one or more gateways 930 may be configured to perform one or more electronic device 910 authentication functions. For example, each of the one or more gateways 930 may be configured to perform an authentication test on electronic data received from one or more electronic devices 910 (e.g., through the network 905) and determine whether or not to transmit that electronic data or permit the transmission of that electronic data to at least one of a management server 920 or a credential store 925 based on whether or not the one or more electronic device 910 that transmitted the electronic data has been authenticated as described herein.

Each of the one or more gateways 930 may be configured to establish one or more secure trustworthy communication channels between two agents or between an electronic device 910 and at least one of the one or more management servers 920 or the one or more credential stores 925. For example, a gateway 930 may be configured to establish one or more secure trustworthy communication channels with an electronic device 910 (e.g., through the network 905) to securely receive electronic data or control a reception of electronic data from the electronic device 910 and transmit that electronic data or control the transmission of that electronic data to at least one of a management server 920 or a credential store 925.

At least one gateway 930 of the one or more gateways 930 may be located in a secured zone (SZ) or a de-militarized zone (DMZ), for example, protected by one or more firewalls. The one or more gateways 930 may be clustered and load balanced. Additionally, or alternatively, the one or more gateways 930 may support high availability (HA) configurations including hot standby disaster recovery (DR) configurations and warm standby DR configurations.

In certain embodiments, at least one gateway 930 of the one or more gateways 930 may be deployed in a physical configuration. For example, a gateway 930 may be a separate component from the one or more management servers 920 and may cooperatively and electronically communicate with at least one management server 920 of the one or more management servers 920. As another example, a gateway 930 may be a separate component from the one or more credential stores 925 and may cooperatively and electronically communicate with at least one credential store 925 of the one or more credential stores 925. As separate components, each of the one or more gateways 930 may include a memory and one or more processors where the memory stores one or more executable instructions that, when executed by the one or more processors, cause the one or more processors to perform one or more network-based key distribution operations described herein.

Additionally, or alternatively, at least one gateway of the one or more gateways 930 may be deployed in a virtual machine (VM) based configuration. For example, a gateway 930 may be a component of a management server 920 and utilize the management server memory and the one or more management server processors to perform one or more network-based key distribution operations described herein. As another example, a gateway 930 may be a component of a credential store 925 and utilize the credential store memory and the one or more credential store processors to perform one or more network-based key distribution operation described herein. As yet another example, a gateway 930 may utilize a remote memory and one or more remote processors to perform one or more network-based key distribution operations described herein.

Figure 10:
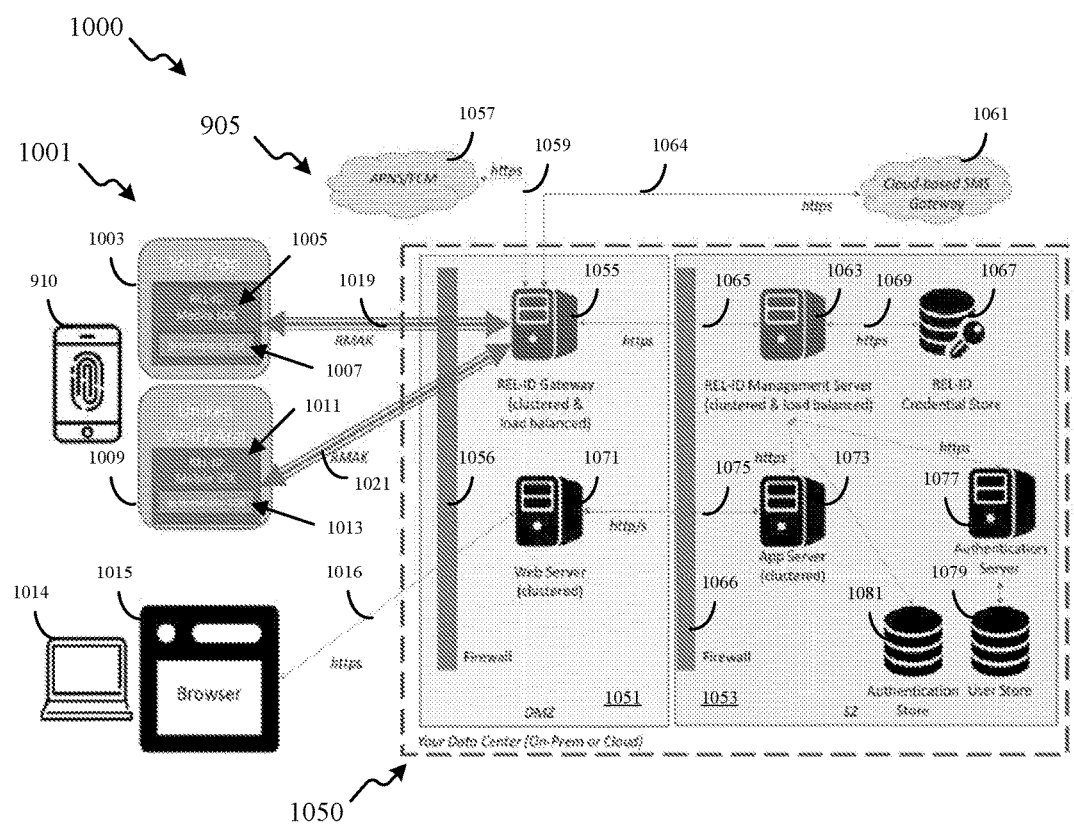
FIG. 10 illustrates another non-limiting, example network context for performing one or more network-based key distribution operations according to certain embodiments of this disclosure.

FIG. 10 illustrates a non-limiting, example network context 1000 for performing one or more network-based key distribution operations according to certain embodiments of this disclosure. The network context 1000 may include one or more same or similar features of the network context 900 illustrated in FIG. 9 or described with respect to FIG. 9. One or more features of the network context 900 illustrated in FIG. 9 may be incorporated into or replace one or more same or similar features of network context 1000 illustrated in FIG. 10 or described with respect to FIG. 10. Similarly, one or more features of the network context 1000 illustrated in FIG. 10 may be incorporated into or replace one or more similar features of the network context 900 illustrated in FIG. 9 or described with respect to FIG. 9.

As shown in FIG. 10, the network context 1000 includes one or more electronic devices 901. At least one electronic device 910 of the one or more electronic devices 901 may store in an electronic device memory one or more applications 1001. For example, as shown in FIG. 10, the electronic device 910 stores an application 1003 embedded with a REL-ID Mobile SDK protocol 1005 that includes a Mobile Threat Detection (MTD) SDK application protocol 1007 as well as a verification application 1009 (e.g., a Uniken Verify application) embedded with a REL-ID Mobile SDK protocol 1011 that includes a MTD SDK application protocol 1013. In certain embodiments, an electronic device 910 may support a browser. For example, an electronic device 910 may be a computer terminal 1014 supporting a browser 1015 as shown in FIG. 10.

The network context 1000 may also include one or more gateways 1055 (e.g., that are the same as or at least similar to the one or more gateways 930 illustrated in FIG. 9), one or more management servers 1063 (e.g., that are the same as or at least similar to the one or more management servers 920 illustrated in FIG. 9), and one or more credential stores 1067 (e.g., that are the same as or at least similar to the one or more credential stores 925 illustrated in FIG. 9). The network context 1000 may further include a web server 1071 (e.g., a clustered web server), an application server 1073, (e.g., a clustered application server), an authentication store 1081, an authentication server 1077, and a user store 1079. In certain embodiments, each of the one or more gateways 1055 may include a first electronic data port for transmitting electronic data to one or more electronic devices 901 and for receiving electronic data from the one or more electronic devices 901. Similarly, each of the one or more gateways 1055 may include a second electronic data port for transmitting electronic data to one or more management servers 1063 and for receiving electronic data from the one or more management servers 1063.

The network context 1000 may also include the network 905 providing one or more communication channels between one or more of the components of the network context 1000. For example, the network 905 may include one or more communication channels 1019 for electronic communication between the application 1003 stored in an electronic device memory of the electronic device 910 and the gateway 1055. Additionally, or alternatively, the network 905 may include one or more communication channels 1021 for electronic communication between the application 1011 stored in an electronic device memory of the electronic device 910 and the gateway 1055. In certain embodiments, the one or more communication channels 1019 and the one or more communication channels 1021 may initially be less secure communication channels and may subsequently be secure communication channels (e.g., application channels, user channels) as described herein. The network 905 may also include one or more communication channels 1065 for electronic communication between the gateway 1055 and the management server 1063. The network 905 may also include one or more communication channels 1069 for electronic communication between the management server 1063 and the credential store 1067.

The network 905 may also include one or more communication channels 1016 for electronic communication between the browser 1015 on the electronic device 1014 and the web server 1071. The network 905 may also include one or more communication channels 1075 for electronic communication between the web server 1071 and the application server 1073. In certain embodiments, the application server 1073, the authentication server 1077, the user store 1079, and the authentication store 1081 may be in communication with the management server 1063 through one or more communication channels, for example, as shown in FIG. 10.

In certain embodiments, the network context 1000 may also include a secured area 1050. The secured area 1050 may include a demilitarized zone (DMZ) 1051 and a secured zone (SZ) 1053. The secured area 1050 may be a data center (e.g., on-prem, a cloud). For example, the gateway 1055 and the web server 1071 may be located in the DMZ 1051 while the management server 1063, the credential store 1067, the application server 1073, the authentication server 1077, the user store 1079, and the authentication store 1081 may be located in the SZ 1053. In certain embodiments, electronic communication between the one or more electronic devices 1001 and components in the SZ 1053 may communicate through one or more communication channels that pass through at least a portion of the DMZ 1051. For example, the gateway 1055 located in the DMZ 1051 may facilitate or control electronic communication between the electronic device 910 and the management server 1063 located in the SZ 1053 via the one or more communication channels 1019 and the one or more communication channels 1065. In certain embodiments, the DMZ 1051 may include one or more firewalls 1056 located on the one or more communication channels 1019 and 1021 between the electronic device 910 and the gateway 1055 and on the one or communication channels 1016 between the electronic device 1014 and the web server 1071. As another example, the web server 1071 located in the DMZ 1051 may facilitate or control electronic communication between the electronic device 1014 and the application server 1073 located in the SZ 1053 via at least one of the one or more communication channels 1016 or the one or more communication channels 1071. In certain embodiments, the SZ 1053 may include one or more firewalls 1066 located on the one or more communication channels 1065 between the gateway 1055 and the management server 1063 and on the one or communication channels 1071 between the web server 1071 and the application server 1073.

In certain embodiments, the network context 1000 may include one or more communication channels 1059 for electronic communication with one or more other electronic devices 910 through an APPLE™ push notification service (APNS) or through Firebase Cloud Messaging (FCM) 1057. In certain embodiments, the network context 1000 may also include one or more communication channels 1064 for electronic communication with one or more other electronic devices 910 through a cloud-based SMS gateway 1061.

Figure 11:
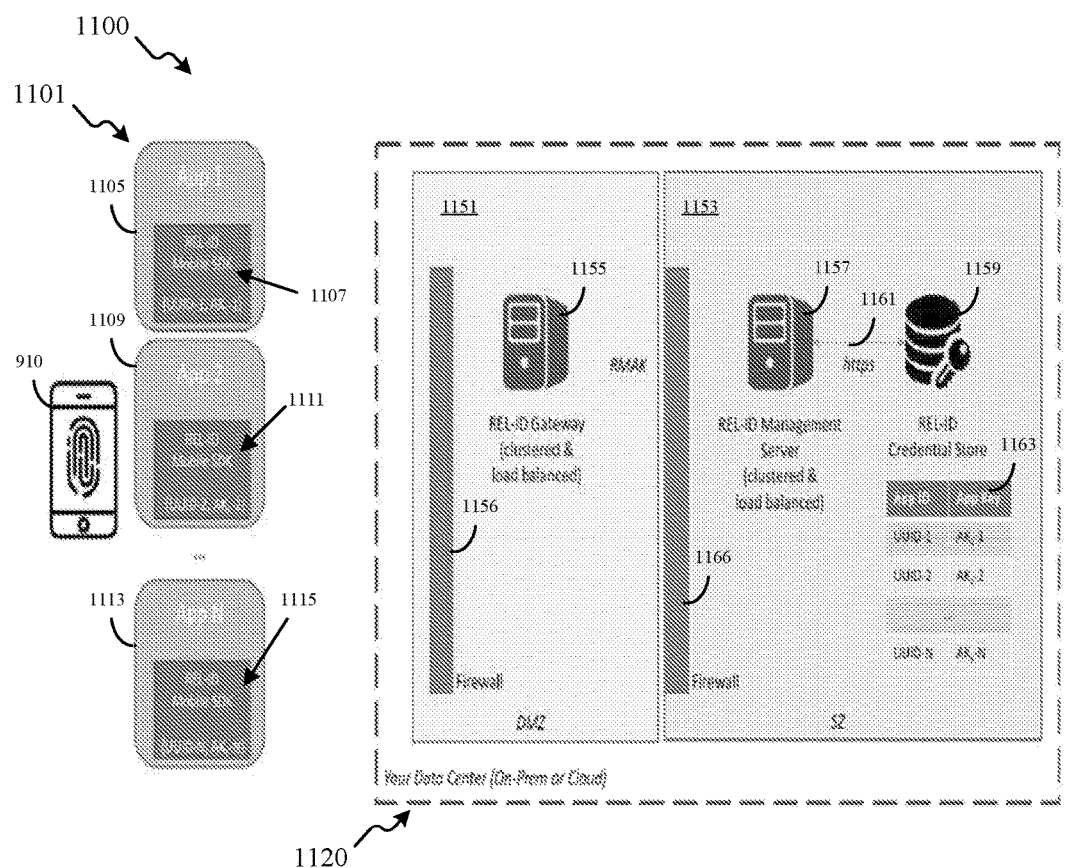
FIG. 11 illustrates yet another non-limiting, example network context for performing one or more network-based key distribution operations according to certain embodiments of this disclosure.

FIG. 11 illustrates a non-limiting, example network context 1100 for performing one or more network-based key distribution operations according to certain embodiments of this disclosure. The network context 1100 may include one or more same or similar features of the network context 900 illustrated in FIG. 9 or described with respect to FIG. 9 or one or more same or similar features of the network context 1000 illustrated in FIG. 10 or described with respect to FIG. 10. One or more features of the network context 900 illustrated in FIG. 9 may be incorporated into or replace one or more similar features of the network context 1100 illustrated in FIG. 11 or described with respect to FIG. 11. Similarly, one or more features of the network context 1100 illustrated in FIG. 11 may be incorporated into or replace one or more similar features of the network context 900 illustrated in FIG. 9 or described with respect to FIG. 9. One or more features of the network context 1000 illustrated in FIG. 10 may be incorporated into or replace one or more similar features of the network context 1100 illustrated in FIG. 11 or described with respect to FIG. 11. Similarly, one or more features of the network context 1100 illustrated in FIG. 11 may be incorporated into or replace one or more similar features of the network context 1000 illustrated in FIG. 10 or described with respect to FIG. 10.

As shown in FIG. 11, the network context 1100 includes one or more electronic devices 910. At least one electronic device 910 of the one or more electronic devices 910 may store in an electronic device memory one or more applications 1101. The one or more applications 1101 may be the same as or similar to the application 1003 or the application 1009 illustrated in FIG. 10. As shown in FIG. 11, the electronic device 910 may store a first application 1105 embedded with a REL-ID Mobile SDK protocol 1107 containing an encrypted client key uniquely associated with the first application 1105 and a UUID uniquely associated with the first application 1105. The electronic device 910 may also store a second application 1109 embedded with a REL-ID Mobile SDK protocol 1111 containing an encrypted client key uniquely associated with the second application 1109 and a UUID uniquely associated with the second application 1109. The electronic device 910 may further store an $N^{th}$ application 1113 embedded with a REL-ID Mobile SDK protocol 1115 containing an encrypted client key uniquely associated with the $N^{th}$ application 1113 and a UUID uniquely associated with the $N^{th}$ application 1113.

The network context 1100 may also include one or more gateways 1155 (e.g., that is the same as or at least similar to the one or more gateways 930 illustrated in FIG. 9 or that is the same as or at least similar to the one or more gateways 1055 illustrated in FIG. 10), one or more management servers 1157 (e.g., that is the same as or at least similar to the one or more management servers 920 illustrated in FIG. 9 or that is the same as or at least similar to the one or more management servers 1063 illustrated in FIG. 10), and one or more credential stores 1059 (e.g., that is the same as or at least similar to the one or more credential stores 925 illustrated in FIG. 9 or that is the same as or at least similar to the one or more credential stores 1067 illustrated in FIG. 10). The one or more credential stores 1159 may contain one or more tables 1163 storing UUIDs and associated server keys. For example, as shown in the table 1163, UUID-1 is the same UUID contained in the first application 1105, UUID-2 is the same UUID contained in the second application 1109, and the UUID-N is the same UUID contained in the $N^{th}$ application 1113. Matching a UUID contained within an application with a same UUID contained in the table 1163 may allow for matching an encrypted client key contained in the application with the correlating server key listed with a matched UUID in the table 1163. In certain embodiments, the management server 1157 may be in electronic communication with the credential store 1159 via one or more communication channels 1161.

In certain embodiments, the network context 1100 may also include a secured area 1120. The secured area 1120 may be the same as or at least similar to the secured area 1050 illustrated in FIG. 10 and described with respect to FIG. 10. The secured area 1120 may include a demilitarized zone (DMZ) 1151 and a secured zone (SZ) 1153. The secured area 1120 may be a data center (e.g., on-prem, a cloud). For example, the gateway 1155 may be located in the DMZ 1151 while the management server 1157 and the credential store 1159 may be located in the SZ 1153. In certain embodiments, electronic communication between the one or more electronic devices 901 and management server 1157 and the credential store 1159 in the SZ 1053 may communicate through one or more communication channels that pass through at least a portion of the DMZ 1151. For example, the gateway 1155 located in the DMZ 1151 may facilitate or control electronic communication between the one or more electronic devices 910 and the management server 1157 located in the SZ 1159. In certain embodiments, the DMZ 1151 may include one or more firewalls 1156 intercepting electronic communication between the electronic device 910 and the gateway 1155. In certain embodiments, the SZ 1153 may include one or more firewalls 1166 intercepting electronic communication between the gateway 1155 and the management server 1157.

Figure 12:
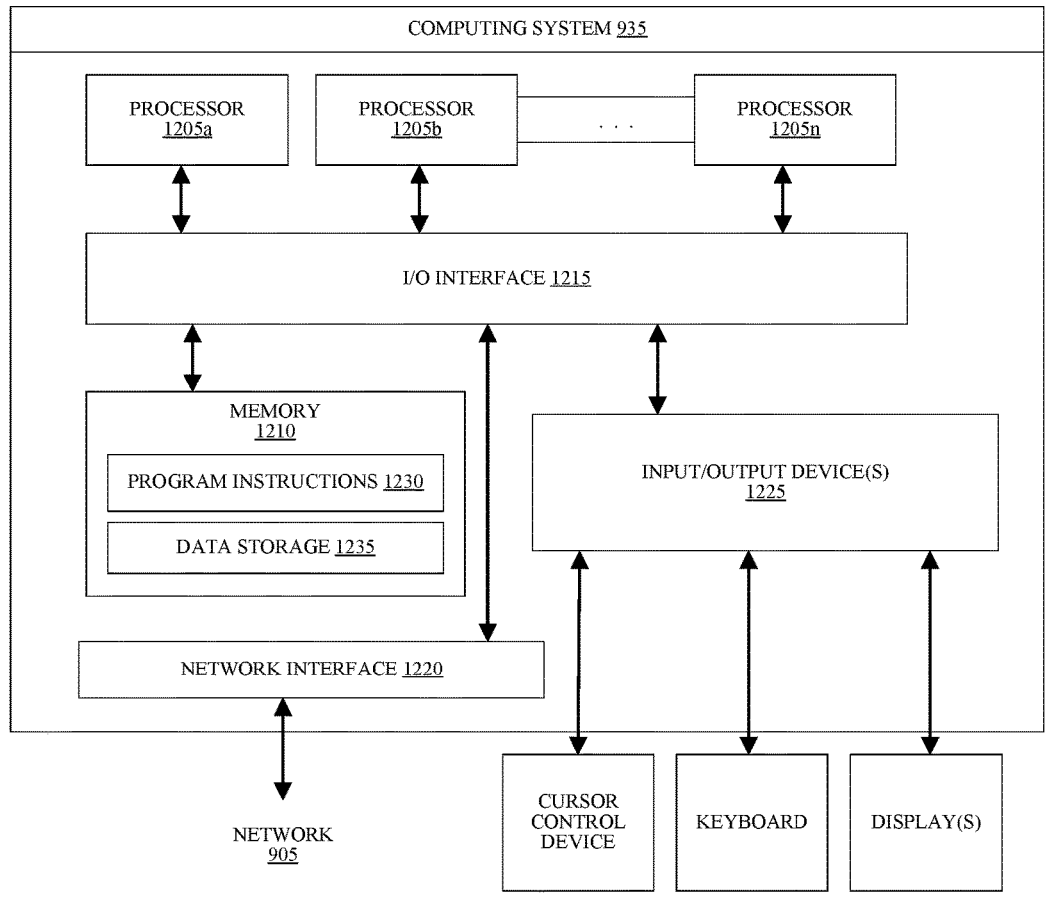
FIG. 12 illustrates a non-limiting, example computing system configured for network-based key distribution operations according to certain embodiments of this disclosure.

Turning back to FIG. 9, the gateway 930 may include a computing system 935. FIG. 12 illustrates a non-limiting, example of the computing system 935 illustrated in FIG. 9. The computing system 935 is configured to execute any or all of the embodiments and operations described herein including embodiments for performing one or more network-based key distribution operations. In certain embodiments, the computing system 935 may perform one or more network-based key distribution operations using the network 905 to authenticate and control electronic data transmission between one or more electronic devices 910 and at least one of one or more management servers 920 or one or more credential stores 925. In different embodiments, the computing system 935 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for network-based key distribution functions, as described herein, may be executed on one or more computing systems 935, which may interact with various other devices. In the illustrated embodiment, the computing system 935 may include one or more processors 1205*a*, 1205*b*, . . . , and 1205*n* (hereinafter "one or more processors 1205," "processors 1205," or "processor 1205") coupled to a memory 1210 via an input/output (I/O) interface 1215. The computing system 935 may further include a network interface 1220 coupled to I/O interface 1215, and one or more input/output devices 1225, such as a cursor control device of the gateway 930, a keyboard of the gateway 930, and one or more displays of the gateway 930. In some cases, it is contemplated that embodiments may be implemented using a single instance of the computing system 935, while in other embodiments multiple such systems, or multiple nodes making up the computing system 935, may be configured to host different portions or instances of embodiments. For example, in one embodiment some elements may be implemented via one or more nodes of the computing system 935 that are distinct from those nodes implementing one or more other elements.

In various embodiments, the computing system 935 may be a uniprocessor system including one processor 1205*a*, or a multiprocessor system including several processors 1205*a*-1205*n* (e.g., two, four, eight, or another suitable number). The processor 1205 may be any suitable processor capable of executing instructions including instructions or operations for performing network-based key distribution operations as described herein. For example, in various embodiments, the processor 1205 may be general-purpose or embedded processors implementing any of a variety of instruction set architectures (ISAs), such as the x86, PowerPC, SPARC, or MIPS ISAs, or any other suitable ISA. In multiprocessor systems, each of processors 1005 may commonly, but not necessarily, implement the same ISA.

The memory 1210 may be configured to store the executable instructions or program instructions 1230 in the data storage 1235 accessible by the processor 1205. In various embodiments, the memory 12110 may be implemented using any suitable memory technology, such as static random access memory (SRAM), synchronous dynamic RAM (SDRAM), nonvolatile/Flash-type memory, or any other type of memory. In the illustrated embodiment, the program instructions 1230 may be configured to implement a system for network-based key distribution incorporating any of the functionality, as described herein. In some embodiments, program instructions 1230 or data may be received, sent, or stored upon different types of computer-accessible media or on similar media separate from the memory 1210 or the computing system 935. The computing system 935 is described as implementing at least some of the functionality of functional blocks in the figures described herein.

In certain embodiments, the I/O interface 1215 may be configured to coordinate I/O traffic between the processor 1205, the memory 1210, and any peripheral devices in the computing system 935, including the network interface 1220 or other peripheral interfaces, such as the input/output devices 1225. In some embodiments, the I/O interface 1215 may perform any necessary protocol, timing or other data transformations to convert data signals from one component (e.g., the memory 1210) into a format suitable for use by another component (e.g., the processor 1205). In some embodiments, the I/O interface 1215 may include support for devices attached through various types of peripheral buses, such as a variant of the Peripheral Component Interconnect (PCI) bus standard or the Universal Serial Bus (USB) standard, for example. In some embodiments, the function of the I/O interface 1215 may be split into two or more separate components, such as a north bridge and a south bridge, for example. Also, in some embodiments some or all of the functionality of the I/O interface 1215, such as an interface to the memory 1210, may be incorporated directly into the processor 1205.

The network interface 1220 may be configured to allow data to be exchanged between the computing system 935 and other devices attached to the network 905 (e.g., one or more electronic devices 910, one or more management servers 920, one or more credential stores 925) or between nodes of the computing system 935. The network 905 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 1225 may, in some embodiments, include one or more display terminals, keyboards, keypads, touchpads, scanning devices, voice, or optical recognition devices, or any other devices suitable for entering or accessing data by one or more computing systems 935. Further, various other sensors may be included in the I/O devices 1225, such as imaging sensors, barometers, altimeters, LIDAR, or any suitable environmental sensor. Multiple input/output devices 1225 may be present in the computing system 935 or may be distributed on various nodes of the computing system 935. In some embodiments, similar input/output devices may be separate from the computing system 935 and may interact with one or more nodes of the computing system 935 through a wired or wireless connection, such as over the network interface 1220.

As shown in FIG. 12, the memory 1210 may include program instructions 1230, which may be processor-executable to implement any element, action, or operation including network-based key distribution operations, as described herein. In certain embodiment, the program instructions may implement at least a portion of methods described herein, such as the methods illustrated by FIGS. 13-20. In other embodiments, different elements and data may be included. Note that the data storage 1235 may include any data or information, as described herein.

Those skilled in the art will appreciate that the computing system 935 is merely illustrative and is not intended to limit the scope of various embodiments. In particular, the computing system 935 and devices may include any combination of hardware or software that can perform the indicated functions, including computers, network devices, Internet appliances, PDAs, wireless phones, pagers, GPUs, specialized computer systems, information handling apparatuses, or the like. The computing system 935 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in a memory or on a storage device while being used, these items or at least portions of them may be transferred between a memory and other storage devices for purposes of memory management and data integrity. Alternatively, in other embodiments, some or all of the software components may execute in a memory on another device and communicate with the computing system 935 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 935 may be transmitted to the computing system 935 through transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Generally, a computer-accessible medium may include a non-transitory, computer-readable storage medium or memory medium such as magnetic or optical media (e.g., disk or DVD/CD-ROM), a volatile or a non-volatile media such as RAM (e.g., SDRAM, DDR, RDRAM, SRAM), ROM, or the like. In some embodiments, a computer-accessible medium may include transmission media or signals such as electrical, electromagnetic, or digital signals, conveyed via a communication medium such as network or a wireless link.

As described herein, the computing system 935, utilizing the at least one processor 1205, is configured to execute one or more network-based key distribution operations. In certain embodiments, the computing system 935, utilizing one or more processors 1205, is configured to perform one or more network-based key distribution operations as described with reference to FIGS. 13-20 herein.

Figure 13:
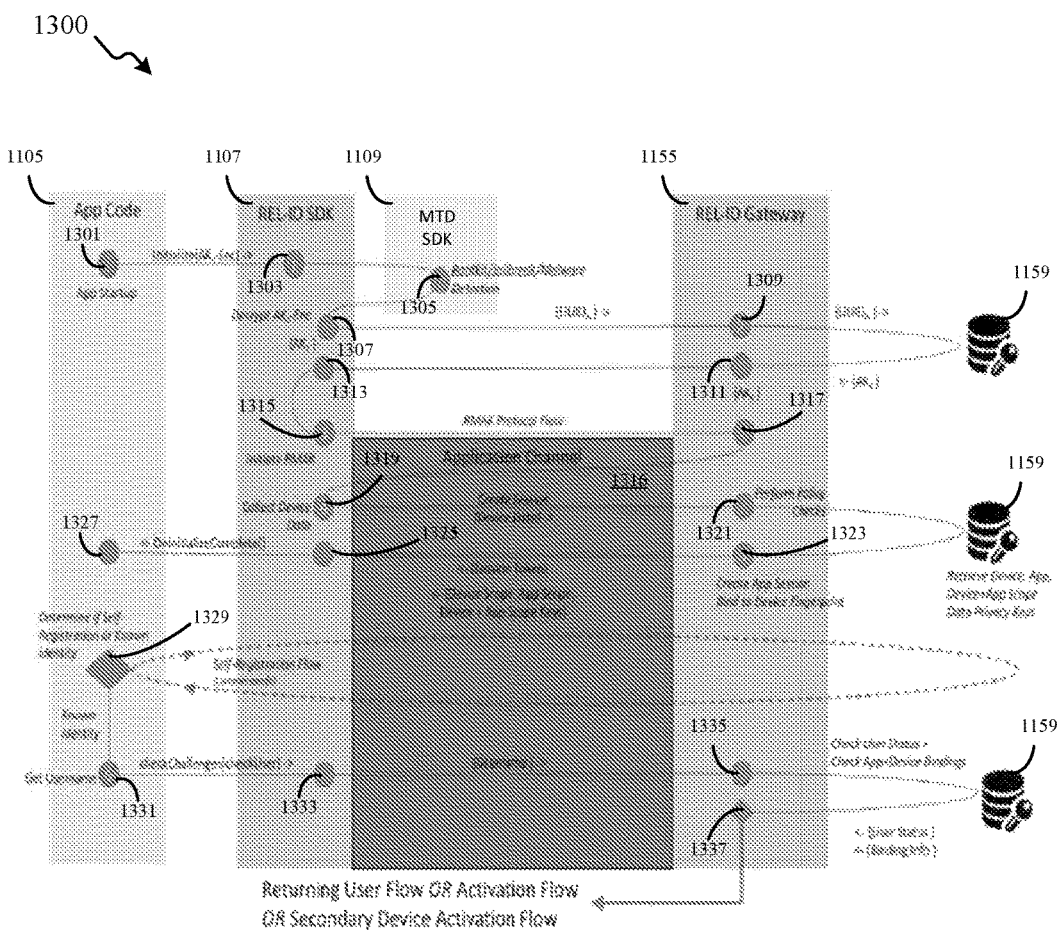
FIGS. 13-20 illustrate flow diagrams of methods for network-based key distribution operations according to certain embodiments of the disclosure.

FIG. 13 illustrates a flow diagram of a method 1300 for network-based key distribution operations according to certain embodiments of the disclosure. Although certain details will be provided with reference to the method 1300 of FIG. 13, it should be understood that other embodiments may include more, less, or different method steps. For example, one or more steps of method 1300 may be incorporated into one or more steps of method 1400 illustrated in FIG. 14, one or more steps of method 1500 illustrated in FIG. 15, one or more steps of method 1600 illustrated in FIG. 16, one or more steps of method 1700 illustrated in FIG. 17, one or more steps of method 1800 illustrated in FIG. 18, one or more steps of method 1900 illustrated in FIG. 19, or one or more steps of method 2000 illustrated in FIG. 20

As described herein, an application 1105 to be installed in an electronic device memory of an electronic device 910 may be generated for storage and subsequent installation in the electronic device memory of the electronic device 910. One or more management servers 920 may generate a unique application key for the generated application 1105 and a universally unique identifier (UUID). The one or more management servers 920 may divide the unique application key into a server key ($AK_s$) and an encrypted client key (Enc-$AK_s$). The one or more management servers 920 may generate a client file (e.g., a REL-ID software development kit (SDK) 1107) and include the client encrypted key (Enc-$AK_c$) and the associated UUID in the client file. The management server 920 may embedded the client file in the application 1105 that is to be stored in the electronic device memory of the electronic device 910.

The one or more management servers 920 may also generate a corresponding server file containing the server key ($AK_s$) and the same UUID contained in the client file and transmit the server file to a credential store 1159 of the one or more credential stores 1159 for subsequent authentication described herein. After the client file is embedded in the application 1105 and the server file is stored in the credential store 1159, the electronic device 910 may download, receive, or install the application 1105 with the embedded client file and REL-ID SDK 1107 and store the client file and the REL-ID SDK 1107 in the electronic device memory.

At step 1301, one or more processors of the electronic device 910 may initially be in an idle state at least with respect to performing one or more network-based key distribution operations and subsequently transition to a startup state at least with respect to performing one or more network-based key distribution operations using the application 1105. The one or more processors may transition to the startup state, using the application 1105, at least with respect to performing one or more network-based key distribution functions after the application 1105 with the embedded client file is received by the electronic device 910 and stored on the electronic device memory of the electronic device 910. At step 1303, the one or more processors of the electronic device 910 retrieves, using the REL-ID SDK 1107, the encrypted client key and the UUID contained in the client file, for example, after the one or more processors transition to the startup state.

At step 1305, the one or more processors of the electronic device 910 may determine whether the electronic device 910 has been corrupted. For example, using a MTD Application Program Interface (API) 1109 of the client file, the one or more processors of the electronic device 910 may perform electronic device corruption detection (e.g., at least one of root detection, jailbreak detection, malware detection, or the like) to determine whether the electronic device 910 has been corrupted. The one or more processors of the electronic device 910 may perform electronic device corruption detection to generate an initial communication message for electronic transmission to the gateway 1155. Determining whether an electronic device 910 has been corrupted may prevent decrypted data, such as a decrypted client key, from being nefariously obtained after the one or more processors of the electronic device 910 decrypt the data and may prevent decrypted data, such as a decrypted client key, from being nefariously intercepted during transmission from the electronic device 910 to a gateway 1155 after the one or more processors of the electronic device 910 decrypt the data.

At step 1307, the one or more processors of the electronic device 910 may generate an initial communication message for electronic transmission to the gateway 1155 using the REL-ID SDK based on whether the one or more processors of the electronic device 910 determine that the electronic device 910 has been corrupted. In certain embodiments, when the one or more processors of the electronic device 910 determine that the electronic device 910 has been corrupted, the one or more processors of the electronic device 910 may generate an initial communication message that includes an error message. The error message may provide an indication to the gateway 1155 that network-based key distribution operations have been terminated. In certain embodiments, terminating network-based key distribution operations includes abstaining from decrypting the encrypted client key. Additionally, or alternatively, when the one or more processors of the electronic device 910 determine that the electronic device 910 has been corrupted, the one or more processors of the electronic device 910 may transition from the startup state to the idle state at least with respect to performing one or more network-based key distribution operations. In response to generating the initial communication message, the one or more processors of the electronic device 910 may electronically transmit the initial communication message to the one or more gateways 1155 using the REL-ID SDK.

In certain embodiments, when the one or more processors of the electronic device 910 determine using the MTD SDK 1109 that the electronic device 910 has not been corrupted, the one or more processors of the electronic device 910 may decrypt the encrypted client key and generate an initial communication message that includes the UUID contained in the client file. For example, the one or more processors may use the client file to decrypt the encrypted client key. The client file may contain a REL-ID SDK initialize API of the REL-ID SDK 1109 and use the REL-ID SDK initialize API of the REL-ID SDK 1107 to decrypt the encrypted client key. After decrypting the encrypted client key, the one or more processors of the electronic device 910 may transition from the startup state to an active state with respect to performing one or more network-based key distribution operations and generate, for transmission to the gateway 1155, an initial communication message that includes the UUID contained in the client file. In certain embodiments, the one or more processors of the electronic device 910 may generate an initial communication message includes the decrypted client key and the UUID contained in the client file. In response to generating the initial communication message, the one or more processors of the electronic device 910 may electronically transmit the initial communication message to the one or more gateways 1155. In certain embodiments, the one or more processors of the electronic device 910 electronically may transmit the initial communication message to the one or more gateways 1155 over an electronic communication channel that contains less security than a secured communication channel.

At step 1309, the computing system 935 of the gateway 1155, performing one or more network-based key distribution operations, may receive an initial communication message from an electronic device 910. For example, the computing system 935 of the gateway 1155 may be in an idle state at least with respect to performing one or more network-based key distribution operations. In response to receiving an initial communication message, the computing system 935 of the gateway 1155 may transition from the idle state to a startup state. The initial communication message may be received by the computing system 935 of the gateway 1155 from an electronic device 910 storing, in an electronic device memory, an application having an embedded client file containing a UUID as described herein. After receiving the initial communication message, the computing system 935 of the gateway 1155, performing one or more network-based key distribution operations, may determine whether the initial communication message includes an error message or a decrypted client key. When the computing system 935 determines that the initial communication message includes the error message, the computing system 935 may abstain from performing one or more network-based key distribution operations. In certain embodiments, the computing system 935 may also prevent the reception of electronic data from the electronic device 910 that transmitted the initial communication message.

When the computing system 935 of the gateway 1155 determines that the initial communication message includes the UUID, the computing system 935 of the gateway 1155 may obtain the UUID contained in the initial communication message. After obtaining the UUID, the computing system 935 of the gateway 1155 may access the credential store 1159 to obtain the server key associated with the same UUID. In certain embodiments, the computing system 935 of the gateway 1155, performing one or more network-based key distribution operations, may determine that at least one of the electronic device 910 or the received UUID are not authentic or not valid. For example, the one or more credential stores 1159 may store a table correlating individual server keys with different UUID. Each electronic device 910 may transmit a UUID specific to the application and thus, specific to the electronic device 910 to the computing system 935 of the gateway 1155. Each valid electronic device 910 may transmit a UUID to the computing system 935 of the gateway 1155 that matches a UUID stored in the one or more credential stores 1159. When the computing system 935 of the gateway 1155 receives the UUID in the initial communication message, the computing system 935 of the gateway 1155 may access the one or more credential stores 1159 containing the table that correlates UUIDs with server keys. The computing system 935 of the gateway 1155, performing one or more network-based key distribution operations, may determine that the UUID transmitted from the electronic device 910 is not authentic or not valid for secured data transmission between the electronic device 910 and the gateway 1155 when the transmitted UUID does not match a UUID contained in the table of the one or more credential stores 1159. Accordingly, the computing system 935 of the gateway 1155 may determine that at least one of the electronic device 910 or the UUID are not authentic or not valid.

In certain embodiments, the computing system 935 of the gateway 1155, performing one or more network-based key distribution operations, may determine that the electronic device 910 and the received UUID are authentic or valid.

For example, the one or more credential stores 1159 may store a table correlating individual server keys with different UUID. When the management server 920 created the unique application key and the UUID and divided the unique application key into the encrypted client key and the server key, the management server 920 may have stored the server key in the one or more credential stores 1159 and indicated in the one or more credential stores 1159 that the UUID is associated with or correlated with the server key. Thus, when the computing system 935 of the gateway 1155 receives the UUID in the initial communication message, the computing system 935 of the gateway 1155 may access the one or more credential stores 1159 and identify the server key associated with the UUID received from the electronic device 910 in the initial communication message and a UUID stored in the table of the one or more credential stores 1159. Accordingly, the computing system 935 of the gateway 1155 may determine that the electronic device 910 and the UUID are authenticated or valid.

At step 1311, the computing system 935 of the gateway 1155, performing one or more network-based key distribution operations, may retrieve the server key from the one or more credential stores 1159 that is associated with the UUID from the initial communication message. After retrieving the server key from the one or more credential stores 1159 and that is associated with the received UUID, the computing system 935 of the gateway 1155, performing one or more network-based key distribution operations, may initiate one or more secure channel protocols (e.g., an RMAK protocol) using both the server key to establish one or more secure channels (e.g., one or more RMAK secure channels) for data communication between the electronic device 910 and the gateway 1155. In certain embodiments, the computing system 935 of the gateway 1155, performing one or more network-based key distribution operations, may generate and transmit a coordination message to the electronic device 910. The coordination message may include one or more secure channel protocols (e.g., an RMAK protocol) to be performed by the electronic device 910 for establishing the one or more secure channels (e.g., one or more RMAK secure channels) with the gateway 1155.

At step 1313, the one or more processors of the electronic device 910, performing one or more network-based key distribution operations, may receive the coordination message including the one or more secure channel protocols from the gateway 1155 using the REL-ID SDK 1107. At step 1315, the one or more processors of the electronic device 910, performing one or more network-based key distribution operations, may initiate using the REL-ID SDK 1107 one or more secure channel protocols (e.g., an RMAK protocol) and establish one or more secure channels 1316 (e.g., one or more RMAK secure channels, one or more Application channels, one or more primary channels) in coordination with the computing system 935 of the gateway 1155 for data communication between the electronic device 910 and the gateway 1155. In certain embodiments, the one or more processors of the electronic device 910, performing one or more network-based key distribution operations, may generate and transmit a confirmation message through the one or more established secure channels 1316 to the computing system 935 of the gateway 1155 confirming that the one or more secure channels have been established between the electronic device 910 and the gateway 1155 to securely transmit data.

At step 1317, the computing system 935 of the gateway 1155, performing one or more network-based key distribution operations, may receive the confirmation message from the electronic device 910 through the one or more secure channels 1316. After receiving the confirmation message from the electronic device 910 through the one or more secure channels 1316, at step 1319, the computing system 935 of the gateway 1155, performing one or more network-based key distribution operations, may generate and transmit an electronic device parameters request message through the one or more secure channels 1316. The electronic device parameters request message may include a request that the electronic device 910 identifies device parameters (e.g., variant device parameters, invariant device parameters) of the electronic device 910 and transmits the identified device parameters to the computing system 935 through the one or more secure channels 1316.

At step 1319, the one or more processors of the electronic device 910, performing one or more network-based key distribution operations, may receive using the REL-ID SDK 1107 the electronic device parameters request message and identify the requested device parameters of the electronic device 910. After identifying the requested device parameters of electronic device 910, the one or more processors of the electronic device 910, performing one or more network-based key distribution operations, may transmit the requested device parameters to the computing system 935 of the gateway 1155. In certain embodiments, the one or more processors of the electronic device 910, performing one or more network-based key distribution operations, may transmit the requested device parameters to the computing system 935 of the gateway 1155 through the one or more secure channels 1316.

At step 1321, the computing system 935 of the gateway 1155, performing one or more network-based key distribution operations, may receive the requested device parameters of the electronic device 910 and perform one or more policy checks using the requested device parameters. The computing system 935 of the gateway 1155, performing one or more network-based key distribution operations, may execute the one or more policy checks using the requested device parameters to generate a device fingerprint associated with the electronic device 910. For example, the computing system 935 of the gateway 1155 may analyze the requested device parameters from the electronic device and perform the one or more policy checks to determine whether the requested device parameters passed the one or more policy checks. When the requested device parameters pass the one or more policy checks, the computing system 935 of the gateway 1155 may generate a device fingerprint associated with the electronic device 910. In certain embodiments, the computing system 935 of the gateway 1155 may access the one or more credential stores 1159 and retrieve device scope data privacy key, application scope data privacy key, and device and application scope data privacy key stored in at least one credential store 1159 of the one or more credential stores 1159. The device scope data privacy key, the application scope data privacy key, and the device and application scope data privacy key may support a data privacy API for execution by at least one of the computing system 935 of the gateway 1155 or the one or more processors of the electronic device 910.

At step 1323, the computing system 935 of the gateway 1155, performing one or more network-based key distribution operations, may generate an application session using the retrieved device scope data privacy key, application scope data privacy key, and device and application scope data privacy key. The computing system 935 of the gateway 155 may bind the application session to the generated device fingerprint associated with the electronic device 910. The computing system 935 of the gateway 1155, performing one or more network-based key distribution operations, may generate a session token and transmit the session token as well as the retrieved device scope data privacy key, application scope data privacy key, and device and application scope data privacy key to the electronic device 910.

At step 1325, the one or more processors of electronic device 910, performing one or more network-based key distribution operations, may receive using the REL-ID SDK 1107 the session token as well as the device scope data privacy key, application scope data privacy key, and device and application scope data privacy key from the computing system 935 of the gateway 1155. In certain embodiments, the session token as well as the device scope data privacy key, application scope data privacy key, and device and application scope data privacy key may be received by the one or more processors of electronic device 910 through the one or more secure channels 1316. At step 1327, the one or more processors of electronic device 910, performing one or more network-based key distribution operations, may via the application 1105 complete initialization using the received session token as well as the device scope data privacy key, application scope data privacy key, and device and application scope data privacy key from the computing system 935 of the gateway 1155.

At step 1329, the one or more processors of the electronic device 910, using the application 1105 and performing one or more network-based key distribution operations, may determine whether the electronic device 910 is to execute a self-registration protocol to create an identity associated with a user of the electronic device 910 or whether the electronic device 910 is executing the application and performing one or more network-based key distribution operations using a known identity associated with a user of electronic device 910. At step 1329, the one or more processors of the electronic device 910 may, using the application 1105, execute the self-registration protocol to create an identity associated with the user of the electronic device 910 when no known identity associated with the user of the electronic device 910 is identified. At step 1331, the one or more processors of the electronic device 910 may request, using the application 1105, a username when an identity associated with the user of electronic device 910 is identified. For example, the one or more processors of the electronic device 910 may initiate, using the application 1105, user identification flow. The one or more processors of the electronic device 910 may receive a username in response to display a request for a username on a display screen when a user already has a user account. In certain embodiments, the one or more processors of the electronic device 910 may store the username so that the user does not have to repeatedly provide the username to the electronic device 910 at subsequent occurrences. At step 1333, the one or more processors of the electronic device 910 may transmit, using the REL-ID SDK 1107, the username to the gateway 1155 through the one or more secure channels 1316.

At step 1335, the computing system 935 of the gateway 1155, performing one or more network-based key distribution operations, may receive the username from the electronic device 910 and access the one or more credential stores 1159 to check the user status as well as the application and device bindings. The computing system 935 of the gateway 1155, performing one or more network-based key distribution operations, may utilize a check-challenge API stored in a memory of the gateway 1155 to determine whether a user account is associated with the received username. For example, if the username is not associated with a user account, registration data may be requested from the electronic device 910 and subsequently transmitted from the electronic device 110 to the computing system 935 of the gateway 1155 using the one or more secure channels 1316. After receiving the registration data from the electronic device 910, computing system 935 of the gateway 1155 may transmit the registration data to at least one of the one or more management servers 920 or a backend business service of the business associated with the application stored in the memory of electronic device 910. As a result, a username may be generated allowing data transmission to connect back to the check-challenge API.

At step 1337, the computing system 935 of the gateway 1155, performing one or more network-based key distribution operations, may, using the check-challenge API, receive a user status from the one or more credential stores 1159. After the computing system 935 of the gateway 1155 receives a user status from the one or more credential stores 1159, the computing system 935 of the gateway 1155, performing one or more network-based key distribution operations, may request application and device keys from the one or more credential stores 1159. The computing system 935 of the gateway 1155, performing one or more network-based key distribution operations, may search for a key associated with the username and the application for the electronic device 910 (e.g., a device fingerprint). If the computing system 935 of the gateway 1155 does not find a key associated with the username and the application for the electronic device 910, the computing system 935 of the gateway 1155 may search the one or more credential stores 1159 to identify another key associated with the username and the application but that may be associated with another electronic device 910. If the computing system 935 gateway 1155 does not find another key associate with the username and the application, then at least one of the one or more processors of the electronic device 910 or the computing system 935 of the gateway 1155 may initiate an activation flow protocol to establish the username with the application and the electronic device 910. If the computing system 935 gateway 1155 does find another key associate with the username and the application, then at least one of the one or more processors of the electronic device 910 or the computing system 935 of the gateway 1155 may initiate a secondary device activation flow protocol to establish a username for the same application but with the current electronic device 910. If the computing system 935 of the gateway 1155 does find a key associated with the username and the application for the electronic device 910, then at least one of the one or more processors of the electronic device 910 or the computing system 935 of the gateway 1155 may initiate a normal login flow protocol.

Figure 14:
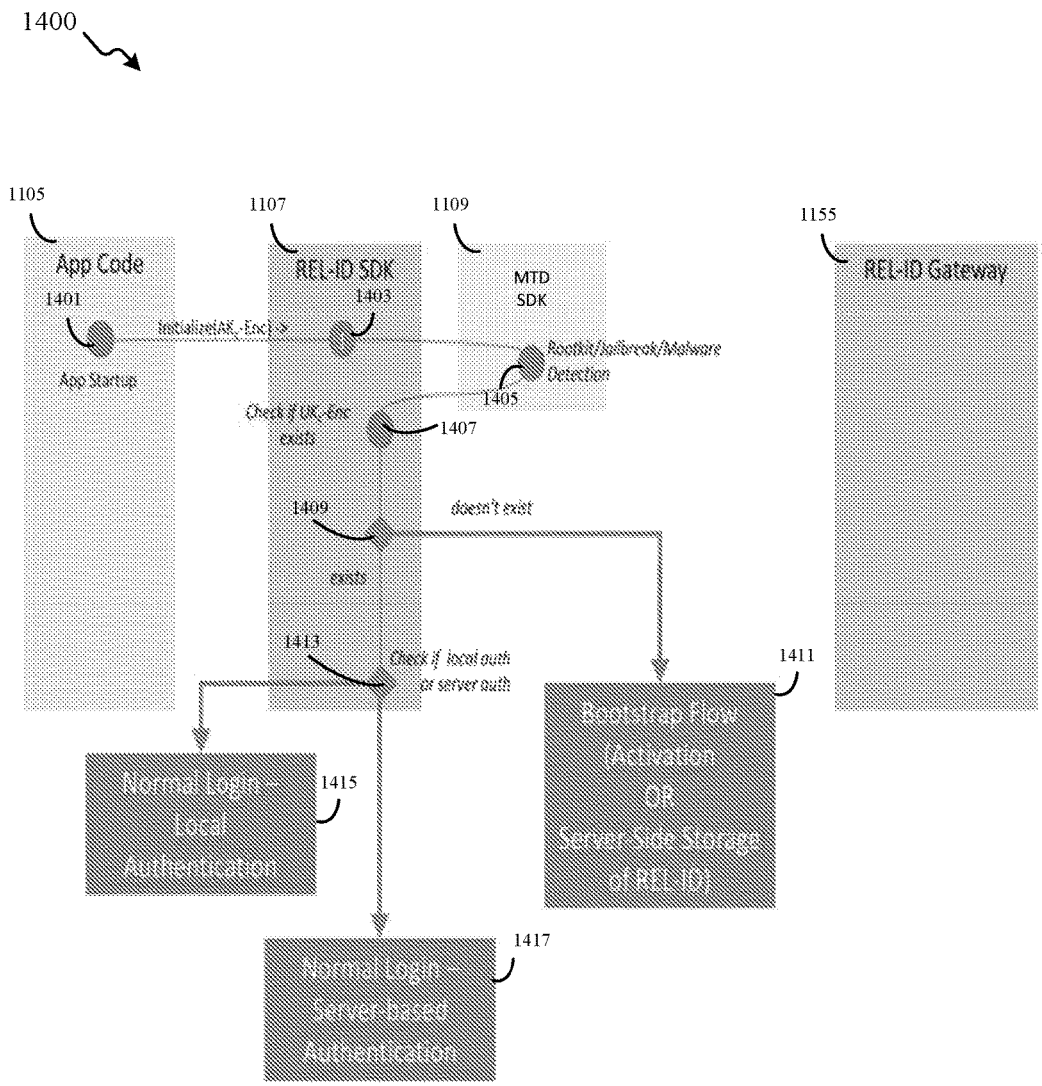

FIG. 14 illustrates another flow diagram of a method 1400 for network-based key distribution operations according to certain embodiments of the disclosure. FIG. 14 illustrates an example method implemented by one or more processors of an electronic device 910, performing one or more network-based key distribution operations, according to certain embodiments of this disclosure. Although certain details will be provided with reference to the method 1400 of FIG. 14, it should be understood that other embodiments may include more, less, or different method steps. For example, one or more steps of method 1400 may be incorporated into one or more steps of method 1300 illustrated in FIG. 13, one or more steps of method 1500 illustrated in FIG. 15, one or more steps of method 1600 illustrated in FIG. 16, one or more steps of method 1700 illustrated in FIG. 17, one or more steps of method 1800 illustrated in FIG. 18, one or more steps of method 1900 illustrated in FIG. 19, or one or more steps of method 2000 illustrated in FIG. 20.

As described herein, an application 1105 to be installed in an electronic device memory of an electronic device 910 may be generated for storage and subsequent installation in the electronic device memory of the electronic device 910. One or more management servers 920 may generate a unique application key for the generated application 1105 and a universally unique identifier (UUID). The one or more management servers 920 may divide the unique application key into a server key ($AK_s$) and an encrypted client key ($Enc-AK_c$). The one or more management servers 920 may generate a client file (e.g., a REL-ID software development kit (SDK) 1107) and include the client encrypted key ($Enc-AK_c$) and the associated UUID in the client file. The management server 920 may embed the client file in the application 1105 that is to be stored in the electronic device memory of the electronic device 910.

The one or more management servers 920 may also generate a corresponding server file containing the server key ($AK_s$) and the same UUID contained in the client file and transmit the server file to a credential store 1159 of the one or more credential stores 1159 for subsequent authentication described herein. After the client file is embedded in the application 1105 and the server file is stored in the credential store 1159, the electronic device 910 may download, receive, or install the application 1105 with the embedded client file and REL-ID SDK 1107 and store the client file and the REL-ID SDK 1107 on the electronic device memory.

At step 1401, one or more processors of the electronic device 910 may initially be in an idle state at least with respect to performing one or more network-based key distribution operations and subsequently transition to a startup state at least with respect to performing one or more network-based key distribution operations using the application 1105. The one or more processors may transition to the startup state using the application 1105 at least with respect to performing one or more network-based key distribution functions after the application 1105 with the embedded client file is received by the electronic device 910 and stored on the electronic device memory of the electronic device 910. Step 1401 is at least similar to step 1301 of method 1300 illustrated in FIG. 13. At step 1403, the one or more processors of the electronic device 910 may retrieve the encrypted client key and the UUID contained in the client file using the REL-ID SKD 1107, for example, after the one or more processors of the electronic device 910 transition to the startup state using the application 1105. Step 1403 is at least similar to step 1303 of method 1300 illustrated in FIG. 13. At step 1405, the one or more processors of the electronic device 910 may determine whether the electronic device 910 has been corrupted using the MTD SDK 1109. Step 1405 is at least similar to step 1305 of method 1300 illustrated in FIG. 13.

At step 1407, the one or more processors of the electronic device 910, performing one or more network-based key distribution operations, may initiate a check application and device keys protocol using the REL-ID SDK 1107 to determine whether application and device keys from the one or more credential stores 1159 or a memory of the electronic device 910 exists. The one or more processors of the electronic device 910, performing one or more network-based key distribution operations, may search for a key associated with the username and the application for the electronic device 910 (e.g., a device fingerprint). At step 1409, the one or more processors of the electronic device 910 may search for and determine whether a key associated with the username and the application for the electronic device 910 exists using the REL-ID SKD 1107. If the one or more processors of the electronic device 910 do not find a key associated with the username and the application for the electronic device 910, then, at step 1411, the one or more processors of the electronic device 910 may activate a bootstrap flow protocol (e.g., an activation flow protocol, a server-side storage REL-ID flow protocol). If the one or more processors of the electronic device 910 do find a key associated with the username and the application for the electronic device 910, then, at step 1413, the one or more processors of the electronic device 910 may determine whether the key is locally authorized (e.g., authorized by the electronic device 910) or server authorized (e.g., authorized by the computing system 935 of the gateway 1155 or the management server 920) using the REL-ID SDK 1107. At step 1415, if the one or more processors of the electronic device 910 determine that the key is locally authorized (e.g., authorized by the electronic device 910), the one or more processors of the electronic device 910 may initiate a normal login—local authorization protocol. At step 1417, if the one or more processors of the electronic device 910 determine that the key is server authorized (e.g., authorized by the computing system 935 of the gateway 1155 or the management server 920), the one or more processors of the electronic device 910 may initiate a normal login—server-based authorization protocol.

Figure 15:
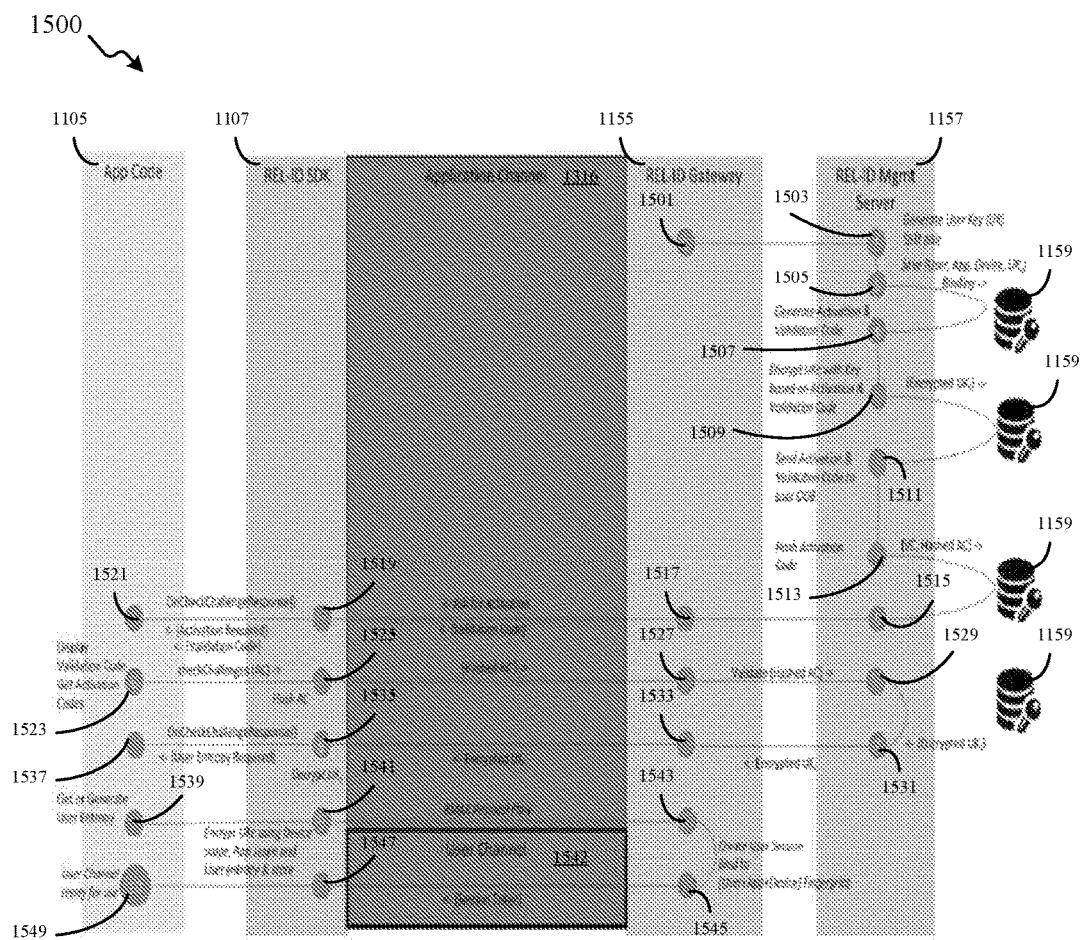

FIG. 15 illustrates another flow diagram of a method 1500 for network-based key distribution operations according to certain embodiments of the disclosure. FIG. 15 illustrates an example method implemented by the computing system 935 of the gateway 1155 and the one or more processors of the electronic device 910, performing one or more network-based key distribution operations, according to certain embodiments of this disclosure. In certain embodiments, the method 1500 is directed to an activation flow protocol described herein. Although certain details will be provided with reference to the method 1500 of FIG. 15, it should be understood that other embodiments may include more, less, or different method steps. For example, one or more steps of method 1500 may be incorporated into one or more steps of method 1300 illustrated in FIG. 13, one or more steps of method 1400 illustrated in FIG. 14, one or more steps of method 1600 illustrated in FIG. 16, one or more steps of method 1700 illustrated in FIG. 17, one or more steps of method 1800 illustrated in FIG. 18, one or more steps of method 1900 illustrated in FIG. 19, or one or more steps of method 2000 illustrated in FIG. 20.

At step 1501, the computing system 935 of the gateway 1155, performing one or more network-based key distribution operations, may transmit a message to the management server 1157 instructing the management server 1157 to generate credentials. At step 1503, the management server 1157 may receive the message from the gateway 1155 and generate a split key (e.g., a REL-ID split key, or user key (UK)). The management server 1157 may split the split key into two halves, a server key ($UK_s$) and a client key ($UK_c$). At step 1505, the management server 1157 may bind or associate the server key to the received username, the application 1105 stored in the electronic device memory of the electronic device 910, and the electronic device 910. The management server 1157 may bind or associate the server key to the application 1105 stored in the electronic device memory of the electronic device 910 based on the received UUID that is unique to the application 1105. The management server 1157 may bind or associate the server key to the electronic device 910 based on the device fingerprint.

At step 1507, the management server 1157 may generate an activation code and a validation code. The management server 1157 may use the activation code as entropy to generate a key that is subsequently to be used to encrypt the client key. At step 1509, the management server 1157 may encrypt the client key using the key generated using the activation code. At step 1511, the management server 1157 may transmit the activation code and the validation code out of band (e.g., via email, via text message) to the user of the electronic device 910. At step 1513, the management server 1157, after transmitting the activation code and the validation code out of band, may hash the activation code. The management server 1157 may store the hashed activation code and the validation code in a memory (e.g., a credential store 1159). At step 1515, the management server 1157 may transmit a request message to the electronic device 910 that requests the activation code and that includes the validation code. At step 1517, the computing system 935 of the gateway 1155 may receive the request message and transmit the request message using the one or more secure channels 1316. At step 1519, the one or more processors of the electronic device 910 may receive the request message using the REL-ID SDK 1107. At step 1521, the one or more processors of the electronic device 910 may receive the request for the activation code and the included validation code through the application 1105.

In certain embodiments, instead of generating an activation code, the management server 1157 may receive an activation code. The management server 1157 may use the provided activation code as entropy to generate a key that is subsequently to be used to encrypt the client key as described herein. This may be based on an enterprise application calling the "EnrollUser" API to generate REL-ID with a provided activation code. A usage scenario may include a customer wanting to use a knowledge based mechanism to unlock REL-ID such as using the last six digits of a user's credit card.

At step 1523, the one or more processors of the electronic device 910 may generate for display on a display screen the validation code for viewing and validation by the user through the application 1105. The one or more processors of the electronic device 910 may receive the activation code from the user (e.g., through a user interface). At step 1525, the one or more processors of the electronic device 910 may utilize the REL-ID SDK 1107 to hash the validation code with the received activation code. The one or more processors of the electronic device 910 may transmit the hashed validation code and activation code through the one or more secure channels 1316 to the gateway 1155. At step 1527, the computing system 935 of the gateway 1155 may receive the hashed validation code and activation code and validate the hashed validation code and activation code. For example, the computing system 935 of the gateway 1155 may instruct the management server 1157 to use the one or more credential stores 1159 to validate the hashed validation code and activation code.

At step 1531, when the hashed validation code and activation code are validated, the management server 1157 may transmit the encrypted client key to gateway 1155. At step 1533, the computing system 935 of the gateway 1155 may receive the encrypted client key from the management server 1157 and transmit the encrypted client key to the electronic device 910 using the one or more secure channels 1316. At step 1535, the one or more processors of the electronic device 910 may receive the encrypted client key and the activation code and decrypt the encrypted client key using the REL-ID SDK 1107. At step 1537, the one or more processors of the electronic device 910 may transmit a request through the application 1105 for user entropy (e.g., a password or a token) using the application 1105. At step 1539, the one or more processors of the electronic device 910 may receive or generate the user entropy using the application 1105.

In certain embodiments, the user entropy includes a biometric authenticator from the user, a password from the user, a passcode from the user, or a pin from the user. This process may also generate user entropy that may be recreated at each instance that the user authenticates using the authenticator. For example, when the user entropy includes a user password, passcode, or pin, the user entropy may be a hash value that is used as entropy. As another example, when the user entropy includes a touch ID or a face ID, the user entropy may be correlated with a random string that is generated and stored in at least one of the gateway 935, the management server 1155, or the credential store 1159. As another example, when the user entropy includes a server-based biometric, at least one of the management server 1157 or the gateway 1155 may transmit a value to be used as the user entropy to the electronic device 910. This value may be returned each instance that the user authenticates using the server-based biometric.

In certain embodiments, the one or more processors of the electronic device 910 may receive or generate the user entropy by registering the biometric or password. For example, the one or more processors of the electronic device 910 utilizing the REL-ID SDK 1107 may generate a random string and transmit the random string to a Fast Identity Online (FIDO) authenticator. The FIDO authenticator may register a user biometric and generate an asymmetric key pair (e.g., a private key and a public key). The FIDO authenticator may sign the random string using the private key and transmit the signed asymmetric key pair and the public key to the one or more processors of the electronic device 910 utilizing the REL-ID SDK 1107. The one or more processors of the electronic device 910 utilizing the REL-ID SDK 1107 may validate the signed random string and save or store the signed random string and the public key. The one or more processors of the electronic device 910 utilizing the REL-ID SDK 1107 may use the signed random string as user entropy.

At step 1541, the one or more processors of the electronic device 910 may re-encrypt the client key using the REL-ID SDK 1107 for storage (e.g., in an electronic device memory, a credential store 1159) using the entropy based on the user credential (e.g., password, token), the device scope key, and the application scope key. At this step, the one or more processors of the electronic device 910 may store the client key using the application 1105 in an electronic device memory and the computing system 935 of the gateway 1155 stores the server key (e.g., in a credential store 1159, in a memory of the gateway 1155). Thus, the one or more processors of the electronic device 910 may perform, using the REL-ID SDK 1107, an RMAK protocol and generate or establish one or more secure channels 1542 that are specific and dedicated to the user, the application 1105, and the electronic device 910.

At step 1543, the computing system 935 of the gateway 1155 may perform an RMAK protocol and generate or establish one or more secure channels 1542 that are specific and dedicated to the user, the application 1105, and the electronic device 910. In certain embodiments, the one or more secure channels 1542 may be user channels or secondary channels. At step 1545, the computing system 935 of the gateway 1155 may create a user session and bind the user session to a fingerprint associated with the user, the application 1105, and the electronic device 910. The computing system 935 of the gateway 1155 may transmit the user session to the electronic device 910. At step 1547, the one or more processors of the electronic device 910 may receive the user session from the gateway 1155 using the REL-ID SDK 1107. At step 1549, the one or more processors of the electronic device 910 utilizing the application 1105 may transmit and receive electronic data using the one or more secure channels 1542 to communicate with the computing system 935 of the gateway 1155 or the one or more management servers 1157 and the one or more credential store 1159 through the gateway 1155.

Figure 16:
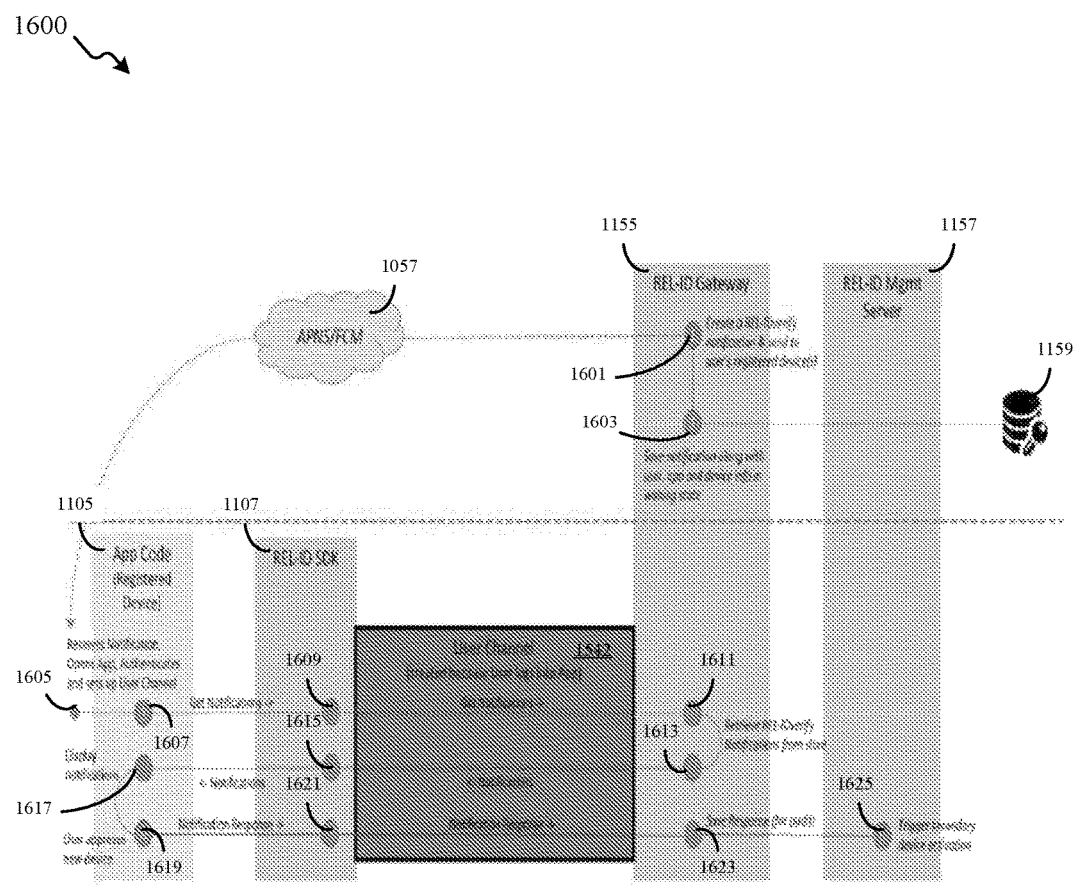

FIG. 16 illustrates another flow diagram of a method 1600 for network-based key distribution operations according to certain embodiments of the disclosure. In certain embodiments, the method 1600 is directed to a secondary device activation flow protocol described herein. Although certain details will be provided with reference to the method 1600 of FIG. 16, it should be understood that other embodiments may include more, less, or different method steps. For example, one or more steps of method 1600 may be incorporated into one or more steps of method 1300 illustrated in FIG. 13, one or more steps of method 1400 illustrated in FIG. 14, one or more steps of method 1500 illustrated in FIG. 15, one or more steps of method 1700 illustrated in FIG. 17, one or more steps of method 1800 illustrated in FIG. 18, one or more steps of method 1900 illustrated in FIG. 19, or one or more steps of method 2000 illustrated in FIG. 20.

In certain embodiments, the computing system 935 of the gateway 1155 may determine that a secondary device activation flow protocol is required. In certain embodiments, an activation flow protocol may have previously taken place on a new device being activated. At step 1601, the computing system 935 of the gateway 1155, performing one or more network-based key distribution operations, may generate and transmit a verify notification message (e.g., a REL-ID verify notification message) to another electronic device 910 that has been previously registered and bound. For example, the computing system 935 of the gateway 1155, performing one or more network-based key distribution operations, may generate and transmit a verify notification message (e.g., a REL-ID verify notification message) through an APPLE™ push notification service (APNS) or through Firebase Cloud Messaging (FCM) to another device 910 that has been previously registered and bound. At step 1603, the computing system 935 of the gateway 1155, performing one or more network-based key distribution operations, may save or store the verification notification message including the related electronic device 910 (e.g., the new electronic device) information and the information specific to the application 1105 on the electronic device 910. The computing system 935 of the gateway 1155 more store the verification notification message including the related electronic device 910 (e.g., the new electronic device) information and the information specific to the application 1105 on the electronic device 910 in one or more credential stores 1159.

At step 1605, the other electronic device 910 that was previously registered and bound using the application 1105 of the other electronic device 910 may receive the verification notification message. At step 1607, the one or more processors of the other electronic device 910 may use the verification notification message to display instructions using the REL-ID SDK 1107 to the user of the other electronic device 910 (e.g., the same user as the user of the electronic device 910) to perform a secure REL-ID authentication-then-connect flow protocol. For example, at step 1609, the one or more processors of the other electronic device 910 may transmit a request through the one or more secure channels 1542 that are specific and dedicated to the user, the application 1105, and the electronic device 910. At step 1611, the computing system 935 of the gateway 1155 may receive the request from the other electronic device 910 and at step 1613, the computing system 935 of the gateway 115 may transmit the verify notification message through the one or more secure channels 1542 that are specific and dedicated to the user, the application 1105, and the electronic device 910 to the one or more processors of the other electronic device 910 utilizing the REL-ID SDK 1107. At step 1615, the one or more processors of the other electronic device 910 may receive the verify notification message.

At step 1617, the one or more processors of the other electronic device 910 may display the verify notification message on a display screen, utilizing the application 1105. For example, the one or more processors of the other electronic device 910 utilizing the application 1105 may use the verify notification message to ask the user via a display screen if the user is attempting to login on the electronic device 910 (e.g., a new electronic device 910). The one or more processors of the other electronic device 910 may utilize the verify notification message to ask the user via a display screen if the user is attempting to login on the electronic device 910 (e.g., a new electronic device 910). The one or more processors of the other electronic device 910 may utilize the verify notification message to ask the user via a display screen to provide relevant device information regarding the electronic device 910 (e.g., the new electronic device 910) that is captured from the device fingerprint (e.g., device type, device IP address, device location) and asks the user via a display screen to approve or reject the attempted login. At step 1619, the one or more processors of the other electronic device 910 may receive a reject response from the user and terminate the procedure. The one or more processors of the other electronic device 910 may receive an approve response from the user and transmit the approve response to the gateway 1155 through the one or more secure channels 1542 that are specific and dedicated to the user, the application 1105, and the electronic device 910.

At step 1621, the one or more processors of the other electronic device 910 may receive the approve response and transmit the received approve response through the one or more secure channels 1542 that are specific and dedicated to the user, the application 1105, and the electronic device 910 to the gateway 1155. At step 1623, the computing system 935 of the gateway 1155 may receive and store the received approved response in a memory of the gateway 1155 or in the one or more credential stores 1159. The computing system 935 of the gateway 1155 may transmit the received approve response to the one or more management servers 1157. At step 1625, the one or more management servers 1157 may receive the approve response and initiate the activation of the electronic device 910 (e.g., the new electronic device 910).

Figure 17:
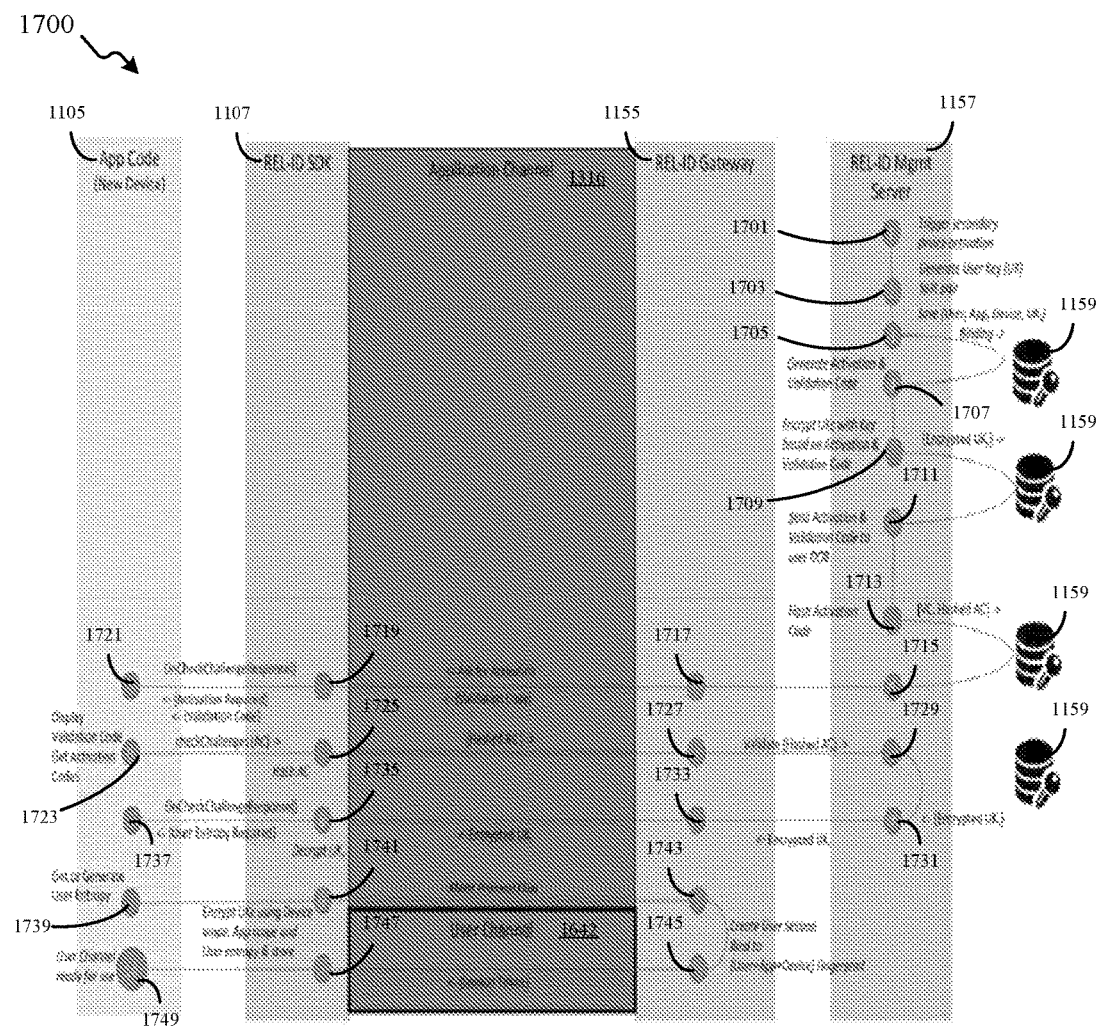

FIG. 17 illustrates another flow diagram of a method 1700 for network-based key distribution operations according to certain embodiments of the disclosure. FIG. 17 illustrates an example method implemented by the computing system 935 of the gateway 1155, the one or more processors of the electronic device 910, and the one or more management servers 1157, performing one or more network-based key distribution operations, according to certain embodiments of this disclosure. In certain embodiments, the method 1700 is directed to an activation flow protocol described herein. Although certain details will be provided with reference to the method 1700 of FIG. 17, it should be understood that other embodiments may include more, less, or different method steps. For example, one or more steps of method 1700 may be incorporated into one or more steps of method 1300 illustrated in FIG. 13, one or more steps of method 1400 illustrated in FIG. 14, one or more steps of method 1500 illustrated in FIG. 15, one or more steps of method 1600 illustrated in FIG. 16, one or more steps of method 1800 illustrated in FIG. 18, one or more steps of method 1900 illustrated in FIG. 19, or one or more steps of method 2000 illustrated in FIG. 20.

At step 1701, the management server 1157 may receive a message to activate an electronic device 910 (e.g., a new electronic device 910). At step 1703, the management server 1157 may generate a split key (e.g., a REL-ID split key, or user key (UK)). Step 1703 is at least similar to step 1503 of method 1500 illustrated in FIG. 15. At step 1705, the management server 1157 may bind or associate the server key to the received username, the application 1105 stored in the electronic device memory of the electronic device 910, and the electronic device 910. Step 1705 is at least similar to step 1505 of method 1500 illustrated in FIG. 15.

At step 1707, the management server 1157 may generate an activation code and a validation code. The management server 1157 may use the activation code as entropy to generate a key that is subsequently to be used to encrypt the client key. Step 1707 is at least similar to step 1507 of method 1500 illustrated in FIG. 15. At step 1709, the management server 1157 may encrypt the client key using the key generated using the activation code. Step 1709 is at least similar to step 1509 of method 1500 illustrated in FIG. 15. At step 1711, the management server 1157 may transmit the activation code and the validation code out of band (e.g., via email, via text message) to the user of the electronic device 910. Step 1711 is at least similar to step 1511 of method 1500 illustrated in FIG. 15. At step 1713, the management server 1157, after transmitting the activation code and the validation code out of band, may hash the activation code. The management server 1157 may store the hashed activation code and the validation code in a memory (e.g., a credential store 1159). Step 1713 is at least similar to step 1513 of method 1500 illustrated in FIG. 15.

At step 1715, the management server 1157 may transmit a request message to the electronic device 910 that requests the activation code and that includes the validation code. Step 1715 is at least similar to step 1515 of method 1500 illustrated in FIG. 15. At step 1717, the computing system 935 of the gateway 1155 may receive the request message and transmit the request message using the one or more secure channels 1316. Step 1717 is at least similar to step 1517 of method 1500 illustrated in FIG. 15. At step 1719, the one or more processors of the electronic device 910 may receive the request message using the REL-ID SDK 1107. Step 1719 is at least similar to step 1519 of method 1500 illustrated in FIG. 15. At step 1721, the one or more processors of the electronic device 910 may receive the request for the activation code and the included validation code through the application 1105. Step 1721 is at least similar to step 1521 of method 1500 illustrated in FIG. 15.

In certain embodiments, instead of generating an activation code, the management server 1157 may receive an activation code. The management server 1157 may use the provided activation code as entropy to generate a key that is subsequently to be used to encrypt the client key as described herein. This may be based on an enterprise application calling the "EnrollUser" API to generate REL-ID with a provided activation code. A usage scenario may include a customer wanting to use a knowledge based mechanism to unlock REL-ID such as using the last six digits of a user's credit card.

At step 1723, the one or more processors of the electronic device 910 may generate for display on a display screen the validation code for viewing and validation by the user through the application 1105. The one or more processors of the electronic device 910 may receive the activation code from the user (e.g., through a user interface). Step 1723 is at least similar to step 1523 of method 1500 illustrated in FIG. 15. At step 1725, the one or more processors of the electronic device 910 may utilize the REL-ID SDK 1107 to hash the validation code with the received activation code. The one or more processors of the electronic device 910 may transmit the hashed validation code and activation code through the one or more secure channels 1316 to the gateway 1155. Step 1725 is at least similar to step 1525 of method 1500 illustrated in FIG. 15. At step 1727, the computing system 935 of the gateway 1155 may receive the hashed validation code and activation code and validate the hashed validation code and activation code. For example, the computing system 935 of the gateway 1155 may instruct the management server 1157 to use the one or more credential stores 1159 to validate the hashed validation code and activation code. Step 1727 is at least similar to step 1527 of method 1500 illustrated in FIG. 15.

At step 1731, when the hashed validation code and activation code are validated, the management server 1157 may transmit the encrypted client key to gateway 1155. Step 1731 is at least similar to step 1531 of method 1500 illustrated in FIG. 15. At step 1733, the computing system 935 of the gateway 1155 may receive the encrypted client key from the management server 1157 and transmit the encrypted client key to the electronic device using the one or more secure channels 1316. Step 1733 is at least similar to step 1533 of method 1500 illustrated in FIG. 15. At step 1735, the one or more processors of the electronic device 910 may receive the encrypted client key and the activation code and decrypt the encrypted client key using the REL-ID SDK 1107. Step 1735 is at least similar to step 1535 of method 1500 illustrated in FIG. 15. At step 1537, the one or more processors of the electronic device 910 may transmit a request through the application 1105 for user entropy (e.g., a password or a token) using the application 1105. Step 1737 is at least similar to step 1537 of method 1500 illustrated in FIG. 15.

At step 1739, the one or more processors of the electronic device 910 may receive or generate the user entropy using the application 1105. Step 1739 is at least similar to step 1539 of method 1500 illustrated in FIG. 15. At step 1741, the one or more processors of the electronic device 910 may re-encrypt the client key using the REL-ID SDK 1107 for storage (e.g., in an electronic device memory, a credential store 1159) using the entropy based on the user credential (e.g., password, token), the device scope key, and the application scope key. At this step, the one or more processors of the electronic device 910 may store the client key using the application 1105 in an electronic device memory and the computing system 935 of the gateway 1155 may store the server key (e.g., in a credential store 1159, in a memory of the gateway 1155). Thus, the one or more processors of the electronic device 910 may perform using the REL-ID SDK 1107 an RMAK protocol and generate or establish one or more secure channels 1542 that are specific and dedicated to the user, the application 1105, and the electronic device 910. Step 1741 is at least similar to step 1541 of method 1500 illustrated in FIG. 15.

At step 1743, the computing system 935 of the gateway 1155 may perform an RMAK protocol and generate or establish one or more secure channels 1542 that are specific and dedicated to the user, the application 1105, and the electronic device 910. In certain embodiments, the one or more secure channels 1542 may be user channels or secondary channels. Step 1743 is at least similar to step 1543 of method 1500 illustrated in FIG. 15. At step 1545, the computing system 935 of the gateway 1155 may create a user session and bind the user session to a fingerprint associated with the user, the application 1105, and the electronic device 910. The computing system 935 of the gateway 1155 may transmit the user session to the electronic device 910. Step 1745 is at least similar to step 1545 of method 1500 illustrated in FIG. 15. At step 1747, the one or more processors of the electronic device 910 may receive the user session from the gateway 1155 using the REL-ID SDK 1107. Step 1747 is at least similar to step 1547 of method 1500 illustrated in FIG. 15. At step 1549, the one or more processors of the electronic device 910 utilizing the application 1105 may transmit and receive electronic data using the one or more secure channels 1542 to communicate with the computing system 935 of the gateway 1155 or the one or more management servers 1157 and the one or more credential store 1159 through the gateway 1155. Step 1749 is at least similar to step 1549 of method 1500 illustrated in FIG. 15.

Figure 18:
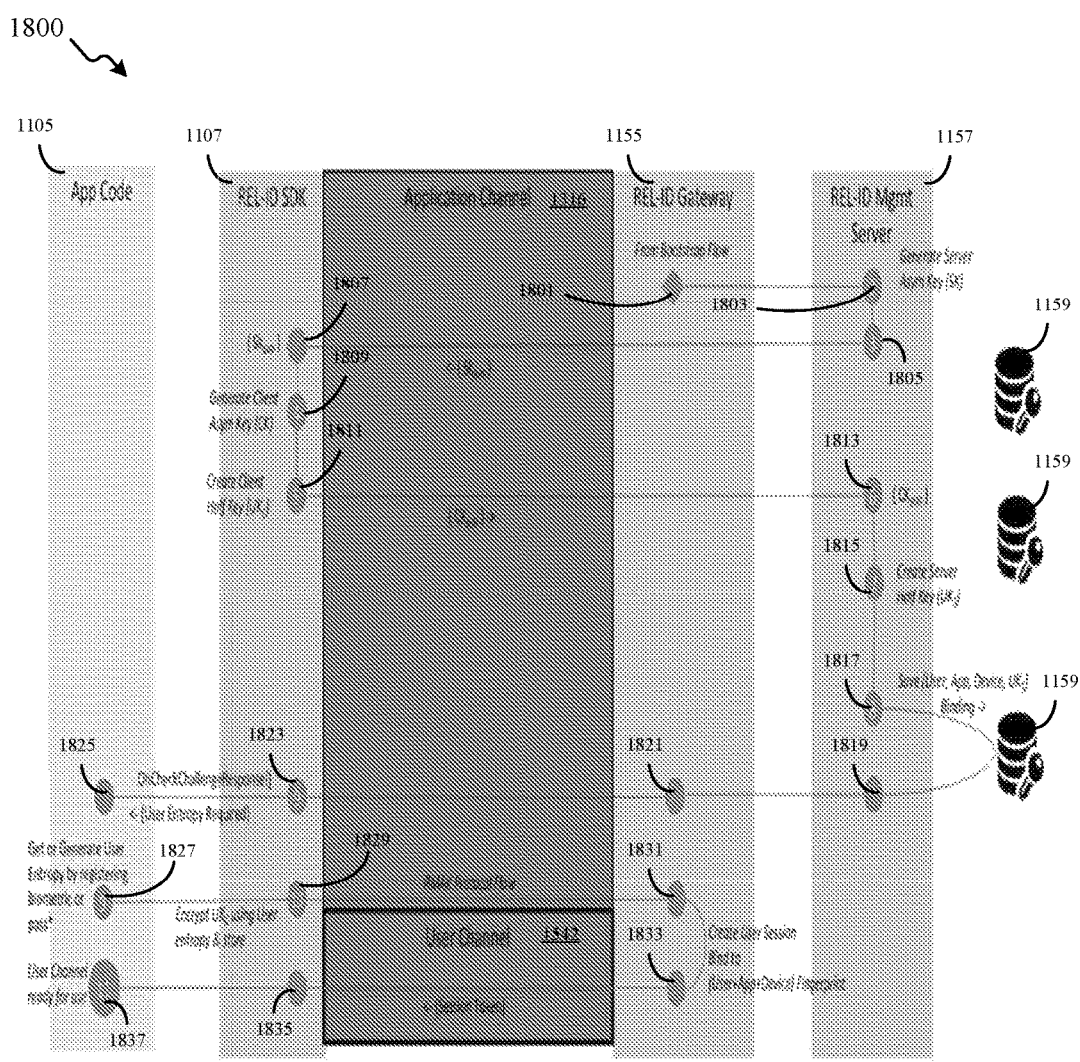

FIG. 18 illustrates another flow diagram of a method 1800 for network-based key distribution operations according to certain embodiments of the disclosure. FIG. 18 illustrates an example method implemented by the computing system 935 of the gateway 1155, the one or more processors of the electronic device 910, and the one or more management servers 1157, performing one or more network-based key distribution operations, according to certain embodiments of this disclosure. In certain embodiments, the method 1800 is directed to an activation flow protocol described herein. Although certain details will be provided with reference to the method 1800 of FIG. 18, it should be understood that other embodiments may include more, less, or different method steps. For example, one or more steps of method 1800 may be incorporated into one or more steps of method 1300 illustrated in FIG. 13, one or more steps of method 1400 illustrated in FIG. 14, one or more steps of method 1500 illustrated in FIG. 15, one or more steps of method 1600 illustrated in FIG. 16, one or more steps of method 1700 illustrated in FIG. 17, one or more steps of method 1900 illustrated in FIG. 19, or one or more steps of method 2000 illustrated in FIG. 20.

The concepts described with respect to method 1800 of FIG. 18 may include changing the REL-ID key generation process so that the entire key is not generated by either the one or more processors of the electronic device 910 or the computing system 935 of the gateway 1155. Instead, both the one or more processors of the electronic device 910 and the computing system 935 of the gateway 1155 may each generate its own asymmetric key pair (e.g., a private key and a public key) and subsequently transmit its own respective public key to the other. After receiving each of the other's public keys, each of the one or more processors of the electronic device 910 and the computing system 935 of the gateway 1155 may generate and save its own respective REL-ID half key. As such, a full key pair (e.g., a whole REL-ID key) never exists with either the one or more processors of the electronic device 910 or the computing system 935 of the gateway 1155 at any time. Additionally, with this method, a client key does not have to be transmitted by the management server 1157 via the gateway 1155 to the one or more processors of the electronic device 910 improving security.

At step 1801, the computing system 935 of the gateway 1155 may initiate a bootstrap flow protocol and transmit a message to the management server 1157 to generate a server asymmetric key pair (e.g., a server public key and a server private key). At step 1803, the management server 1157 may receive the message from the gateway 1155 and generate the server asymmetric key having the server public key and the server private key. At step 1805, the management server 1157 may transmit the server public key to the one or more processors of the electronic device 910 utilizing the REL-ID SDK 1107. In certain embodiments, the management server 1157 may transmit the server public key through the one or more secure channels 1316 (e.g., the application channels) to the one or more processors of the electronic device 910 utilizing the REL-ID SDK 1107. At step 1807, the management server 1157 may receive the server public key through the one or more secure channels 1316 (e.g., the application channels) from the management server 1157. At step 1809, the one or more processors of the electronic device 910 may generate a client asymmetric key pair (e.g., a client private key and a client public key). At step 1811, the one or more processors of the electronic device 910 may generate a client REL-ID half key using the received server public key and subsequently save the client REL-ID half key. The one or more processors of the electronic device 910 may also transmit the client public key to the management server 1157 through the one or more secure channels 1316 (e.g., the application channels). At step 1813, the management server 1157 may receive the client public key. At step 1815, the management server 1157 may generate a server REL-ID half key using the received client public key. At step 1817, the management server 1157 may bind the server REL-ID half key to the user information, application information (e.g., UUID), and electronic device information associated with the electronic device 910 and save the server REL-ID half key, the user information, the application information, and the electronic device information associated with the electronic device 910 in the one or more credential stores 1159.

At step 1819, the management server 1157 may retrieve or receive and subsequently transmit the user information, the application information (e.g., UUID), and the electronic device information associated with the electronic device 910 saved in the credential store 1159 to the gateway 1155. At step 1821, the computing system 935 of the gateway 1155 may receive and subsequently transmit the user information, the application information (e.g., UUID), and the electronic device information associated with the electronic device 910 to the one or more processors of the electronic device 910 through the application channel 1316. At step 1823, the one or more processors of the electronic device 910 may receive the user information, the application information (e.g., UUID), and the electronic device information associated with the electronic device 910 from the gateway 1155 through the application channel 1316. At step 1825, the one or more processors of the electronic device 910 utilizing the application 1105 may receive the user information, the application information (e.g., UUID), and the electronic device information associated with the electronic device 910.

At step 1827, the one or more processors of the electronic device 910 may receive or generate the user entropy using the application 1105. Step 1827 is at least similar to step 1539 of method 1500 illustrated in FIG. 15. At step 1829, the one or more processors of the electronic device 910 may re-encrypt the client key using the REL-ID SDK 1107 for storage (e.g., in an electronic device memory, a credential store 1159) using the entropy based on the user credential (e.g., password, token), the device scope key, and the application scope key. At this step, the one or more processors of the electronic device 910 may store the client key using the application 1105 in an electronic device memory and the computing system 935 of the gateway 1155 may store the server key (e.g., in a credential store 1159, in a memory of the gateway 1155). Thus, the one or more processors of the electronic device 910 may perform using the REL-ID SDK 1107 an RMAK protocol and generate or establish one or more secure channels 1542 that are specific and dedicated to the user, the application 1105, and the electronic device 910. Step 1829 is at least similar to step 1541 of method 1500 illustrated in FIG. 15.

At step 1831, the computing system 935 of the gateway 1155 may perform an RMAK protocol and generate or establish one or more secure channels 1542 that are specific and dedicated to the user, the application 1105, and the electronic device 910. In certain embodiments, the one or more secure channels 1542 may be user channels or secondary channels. Step 1831 is at least similar to step 1543 of method 1500 illustrated in FIG. 15. At step 1833, the computing system 935 of the gateway 1155 may create a user session and bind the user session to a fingerprint associated with the user, the application 1105, and the electronic device 910. The computing system 935 of the gateway 1155 may transmit the user session to the electronic device 910 for example using a user session token. Step 1833 is at least similar to step 1545 of method 1500 illustrated in FIG. 15. At step 1835, the one or more processors of the electronic device 910 may receive the user session from the gateway 1155 using the REL-ID SDK 1107. Step 1835 is at least similar to step 1547 of method 1500 illustrated in FIG. 15. At step 1837, the one or more processors of the electronic device 910 utilizing the application may transmit and receive electronic data using the one or more secure channels 1542 to communicate with the gateway 1155 or the one or more management servers 1157 and the one or more credential store 1159 through the gateway 1155. Step 1837 is at least similar to step 1549 of method 1500 illustrated in FIG. 15.

Figure 19:
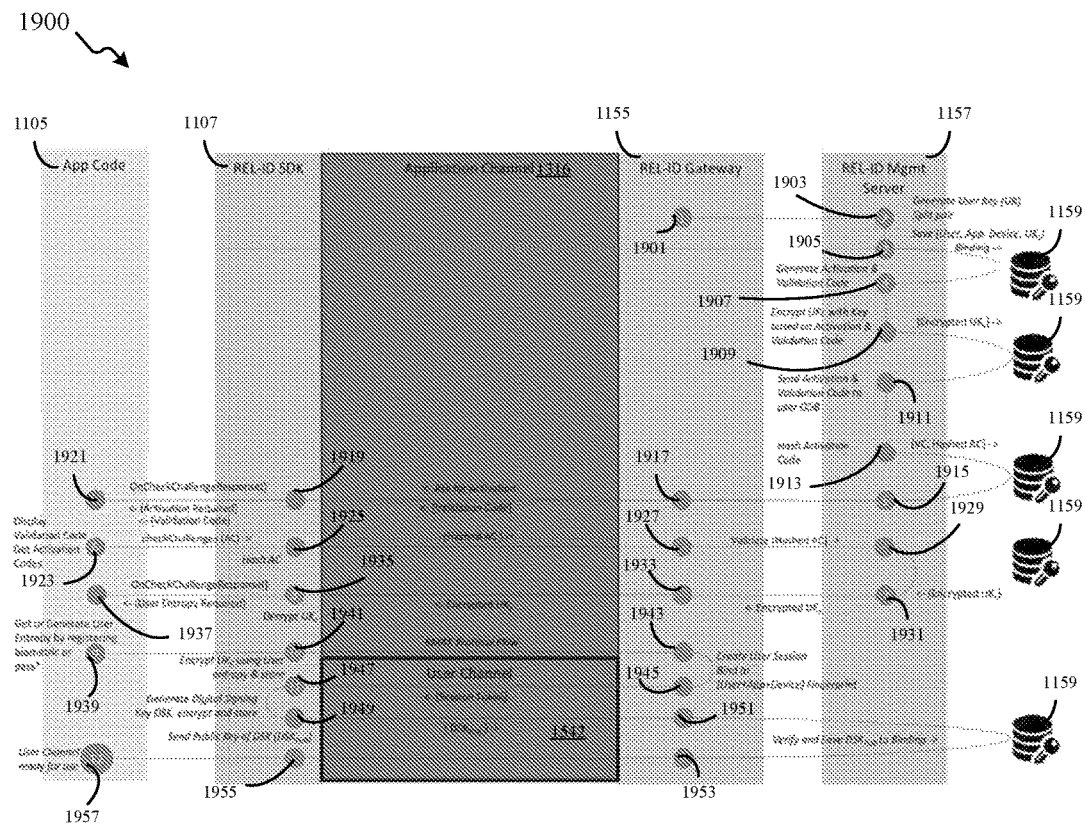

FIG. 19 illustrates another flow diagram of a method 1900 for network-based key distribution operations according to certain embodiments of the disclosure. FIG. 19 illustrates an example method implemented by the computing system 935 of the gateway 1155 and the one or more processors of the electronic device 910, performing one or more network-based key distribution operations, according to certain embodiments of this disclosure. In certain embodiments, the method 1900 is directed to an activation flow protocol described herein. Although certain details will be provided with reference to the method 1900 of FIG. 19, it should be understood that other embodiments may include more, less, or different method steps. For example, one or more steps of method 1900 may be incorporated into one or more steps of method 1300 illustrated in FIG. 13, one or more steps of method 1400 illustrated in FIG. 14, one or more steps of method 1500 illustrated in FIG. 15, one or more steps of method 1600 illustrated in FIG. 16, one or more steps of method 1700 illustrated in FIG. 17, one or more steps of method 1800 illustrated in FIG. 18, or one or more steps of method 2000 illustrated in FIG. 20.

At step 1901, the computing system 935 of the gateway 1155, performing one or more network-based key distribution operations, may transmit a message to the management server 1157 instructing the management server 1157 to generate credentials. Step 1901 is at least similar to step 1501 illustrated in FIG. 15. At step 1903, the management server 1157 may receive the message from the gateway 1155 and generate a split key (e.g., a REL-ID split key, or user key (UK)). The management server 1157 may split the split key into two halves, a server key ($UK_s$) and a client key ($UK_c$). Step 1903 is at least similar to step 1503 illustrated in FIG. 15. At step 1905, the management server 1157 may bind or associate the server key to the received username, the application 1105 stored in the electronic device memory of the electronic device 910, and the electronic device 910. The management server 1157 may bind or associate the server key to the application 1105 stored in the electronic device memory of the electronic device 910 based on the received UUID that is unique to the application 1105. The management server 1157 may bind or associate the server key to the electronic device 910 based on the device fingerprint. Step 1905 is at least similar to step 1505 illustrated in FIG. 15.

At step 1907, the management server 1157 may generate an activation code and a validation code. The management server 1157 may use the activation code as entropy to generate a key that is subsequently to be used to encrypt the client key. Step 1907 is at least similar to step 1507 illustrated in FIG. 15. At step 1909, the management server 1157 may encrypt the client key using the key generated using the activation code. Step 1909 is at least similar to step 1509 illustrated in FIG. 15. At step 1911, the management server 1157 may transmit the activation code and the validation code out of band (e.g., via email, via text message) to the user of the electronic device 910. Step 1911 is at least similar to step 1511 illustrated in FIG. 15. At step 1913, the management server 1157, after transmitting the activation code and the validation code out of band, may hash the activation code. The management server 1157 may store the hashed activation code and the validation code in a memory (e.g., a credential store 1159). Step 1913 is at least similar to step 1513 illustrated in FIG. 15.

At step 1915, the management server 1157 may transmit a request message to the electronic device 910 that requests the activation code and that includes the validation code. Step 1915 is at least similar to step 1515 illustrated in FIG. 15. At step 1917, the computing system 935 of the gateway 1155 may receive the request message and transmit the request message using the one or more secure channels 1316. Step 1917 is at least similar to step 1517 illustrated in FIG. 15. At step 1919, the one or more processors of the electronic device 910 may receive the request message using the REL-ID SDK 1107. Step 1919 is at least similar to step 1519 illustrated in FIG. 15. At step 1921, the one or more processors of the electronic device 910 may receive the request for the activation code and the included validation code through the application 1105. Step 1921 is at least similar to step 1521 illustrated in FIG. 15.

In certain embodiments, instead of generating an activation code, the management server 1157 may receive an activation code. The management server 1157 may use the provided activation code as entropy to generate a key that is subsequently to be used to encrypt the client key as described herein. This may be based on an enterprise application calling the "EnrollUser" API to generate REL-ID with a provided activation code. A usage scenario may include a customer wanting to use a knowledge based mechanism to unlock REL-ID such as using the last six digits of a user's credit card.

At step 1923, the one or more processors of the electronic device 910 may generate for display on a display screen the validation code for viewing and validation by the user through the application 1105. The one or more processors of the electronic device 910 may receive the activation code from the user (e.g., through a user interface). Step 1923 is at least similar to step 1523 illustrated in FIG. 15. At step 1925, the one or more processors of the electronic device 910 may utilize the REL-ID SDK 1107 to hash the validation code with the received activation code. The one or more processors of the electronic device 910 may transmit the hashed validation code and activation code through the one or more secure channels 1316 to the gateway 1155. Step 1925 is at least similar to step 1525 illustrated in FIG. 15. At step 1927, the computing system 935 of the gateway 1155 may receive the hashed validation code and activation code and validate the hashed validation code and activation code. For example, the computing system 935 of the gateway 1155 may instruct the management server 1157 to use the one or more credential stores 1159 to validate the hashed validation code and activation code. Step 1927 is at least similar to step 1527 illustrated in FIG. 15.

At step 1931, when the hashed validation code and activation code are validated, the management server 1157 may transmit the encrypted client key to gateway 1155. Step 1931 is at least similar to step 1531 illustrated in FIG. 15. At step 1933, the computing system 935 of the gateway 1155 may receive the encrypted client key from the management server 1157 and transmit the encrypted client key to the electronic device using the one or more secure channels 1316. Step 1933 is at least similar to step 1533 illustrated in FIG. 15. At step 1935, the one or more processors of the electronic device 910 may receive the encrypted client key and the activation code and decrypt the encrypted client key using the REL-ID SDK 1107. Step 1935 is at least similar to step 1535 illustrated in FIG. 15. At step 1937, the one or more processors of the electronic device 910 may transmit a request through the application 1105 for user entropy (e.g., a password or a token) using the application 1105. Step 1937 is at least similar to step 1537 illustrated in FIG. 15. At step 1939, the one or more processors of the electronic device 910 may receive or generate the user entropy using the application 1105. Step 1939 is at least similar to step 1539 illustrated in FIG. 15.

In certain embodiments, the user entropy includes a biometric authenticator from the user, a password from the user, a passcode from the user, or a pin from the user. This process may also generate user entropy that may be recreated each instance that the user authenticates using the authenticator. For example, when the user entropy includes a user password, passcode, or pin, the user entropy may be a hash value that is used as entropy. As another example, when the user entropy includes a touch ID or a face ID, the user entropy may be correlated with a random string that is generated and stored in at least one of the gateway 935, the management server 1155, or the credential store 1159. As another example, when the user entropy includes a server-based biometric, at least one of the management server 1157 or the gateway 1155 may transmit a value to be used as the user entropy to the electronic device 910. This value may be returned each instance that the user authenticates using the server-based biometric.

In certain embodiments, the one or more processors of the electronic device 910 may receive or generate the user entropy by registering the biometric or password. For example, the one or more processors of the electronic device 910 utilizing the REL-ID SDK 1107 may generate a random string and transmit the random string to a Fast Identity Online (FIDO) authenticator. The FIDO authenticator may register a user biometric and generate an asymmetric key pair (e.g., a private key and a public key). The FIDO authenticator may sign the random string using the private key and transmit the signed asymmetric key pair and the public key to the one or more processors of the electronic device 910 utilizing the REL-ID SDK 1107. The one or more processors of the electronic device 910 utilizing the REL-ID SDK 1107 may validate the signed random string and save or store the signed random string and the public key. The one or more processors of the electronic device 910 utilizing the REL-ID SDK 1107 may use the signed random string as user entropy.

At step 1941, the one or more processors of the electronic device 910 may re-encrypt the client key using the REL-ID SDK 1107 for storage (e.g., in an electronic device memory, a credential store 1159) using the entropy based on the user credential (e.g., password, token), the device scope key, and the application scope key. At this step, the one or more processors of the electronic device 910 may store the client key using the application 1105 in an electronic device memory and the computing system 935 of the gateway 1155 may store the server key (e.g., in a credential store 1159, in a memory of the gateway 1155). Thus, the one or more processors of the electronic device 910 may perform using the REL-ID SDK 1107 an RMAK protocol and generate or establish one or more secure channels 1542 that are specific and dedicated to the user, the application 1105, and the electronic device 910. Step 1941 is at least similar to step 1541 illustrated in FIG. 15. At step 1943, the computing system 935 of the gateway 1155 may perform an RMAK protocol and generate or establish one or more secure channels 1542 that are specific and dedicated to at least one of the user, the application 1105, or the electronic device 910. In certain embodiments, the one or more secure channels 1542 may be user channels or secondary channels.

At step 1945, the computing system 935 of the gateway 1155 may create a user session and bind the user session to a fingerprint associated with the user, the application 1105, and the electronic device 910. The computing system 935 of the gateway 1155 may transmit the user session to the electronic device 910. Step 1945 is at least similar to step 1545 illustrated in FIG. 15. At step 1947, the one or more processors of the electronic device 910 may receive the user session from the gateway 1155 using the REL-ID SDK 1107. Step 1947 is at least similar to step 1547 illustrated in FIG. 15. At step 1949, the one or more processors of the electronic device 910 may generate a digital signing key (DSK), encrypt the DSK, and store the encrypted DSK in an electronic device memory of the electronic device 910. The one or more processors of the electronic device 910 may generate, encrypt, or store the DSK using the REL-ID SDK 1107. In certain embodiments, the one or more processors of the electronic device 910 may generate a public DSK when generating the DSK. For example, the generated DSK may be a DSK pair including a public DSK and a private DSK. The one or more processors of the electronic device 910 may encrypt the public DSK and store the private DSK in an electronic device memory of the electronic device 910. In some embodiments, the one or more processors of the electronic device 910 may encrypt the private DSK and store the encrypted private DSK in an electronic device memory of the electronic device 910. The one or more processors of the electronic device 910 may transmit (e.g., direct a transmission of) the generated public encrypted DSK over the user channel 1542 to the gateway 1155.

At step 1951, the computing system 935 of the gateway 1155 may receive the public encrypted DSK transmitted over the user channel 1542 from the electronic device 910. After receiving the public encrypted DSK, the computing system 935 of the gateway 1155 may verify or authenticate that the gateway 1155 has received a correct public encrypted DSK. When the computing system 935 of the gateway 1155 verifies or authenticates that the received public encrypted DSK is a correct public encrypted DSK, the computing system 935 of the gateway 1155 may transmit (e.g., permit the transmission of) the public encrypted DSK to the management server 1157 for storage in the one or more credential stores 1159. The management server 1157 may receive the public encrypted DSK from the gateway 1155 and store the received public encrypted DSK in the one or more credential stores 1159. In certain embodiments, when management server 1157 receives the public encrypted DSK from the gateway 1155, the management server 1157 may bind the public encrypted DSK to the fingerprint associated with the user, the application 1105, and the electronic device 910 and store the bound public encrypted DSK in the one or more credential stores 1159. After verifying or authenticating and subsequently storing the public encrypted DSK, the computing system 935 of the gateway 1155 may generate an authentication message indicating that the public encrypted DSK has been verified or authenticated (e.g., positively verified or positively authenticated) and stored or bound and stored in the one or more credential stores 1159.

At step 1953, the computing system 935 of the gateway 1155 may transmit (e.g., permit the transmission of) the authentication message indicating that the public encrypted DSK has been verified or authenticated to the electronic device 910 over the user channel 1542. At step 1955, the electronic device 910 may receive, through the REL-ID SDK 1107, the authentication message indicating that the public encrypted DSK has been authenticated or verified by the computing system 935 of the gateway 1155. At step 1957, the one or more processors of the electronic device 910 utilizing the application 1105 may transmit and receive electronic data using the one or more secure channels 1542 to communicate with the computing system 935 of the gateway 1155 or the one or more management servers 1157 and the one or more credential store 1159 through the gateway 1155. Step 1957 is at least similar to step 1549 illustrated in FIG. 15.

Figure 20:
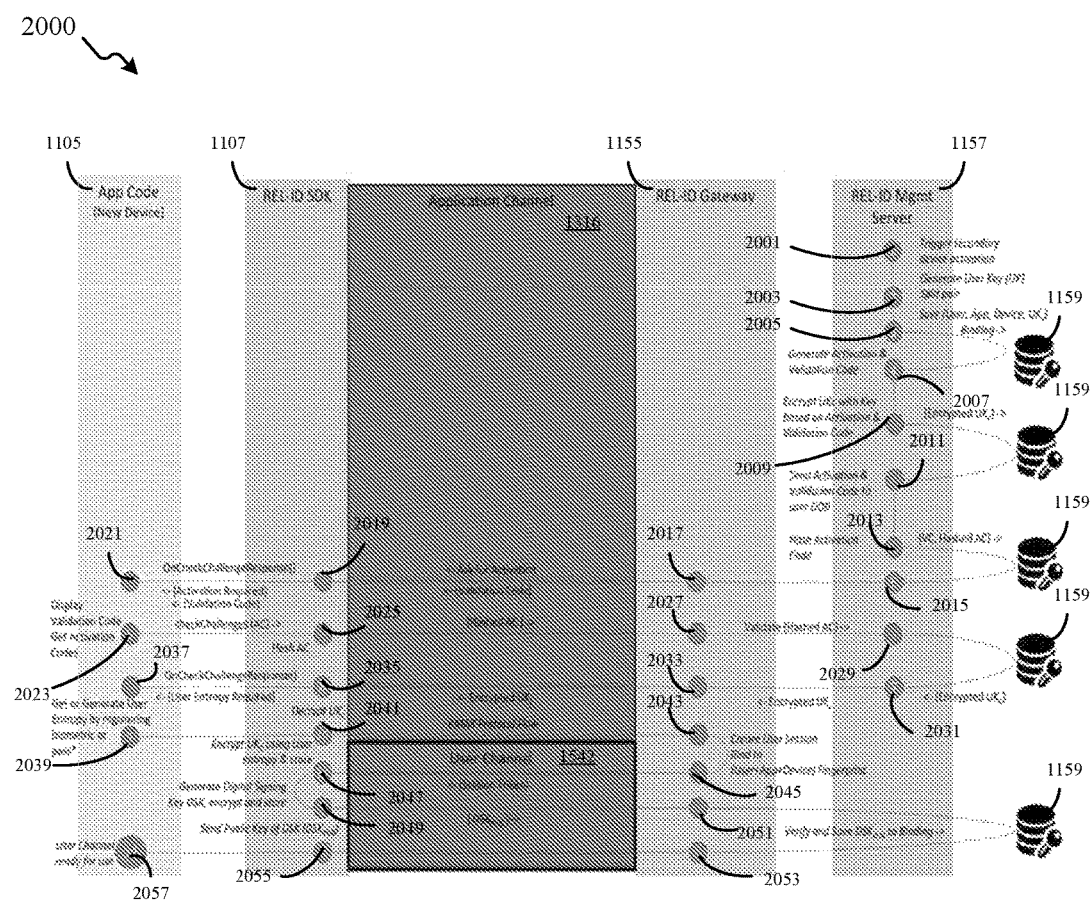

FIG. 20 illustrates another flow diagram of a method 2000 for network-based key distribution operations according to certain embodiments of the disclosure. FIG. 20 illustrates an example method implemented by the computing system 935 of the gateway 1155, the one or more processors of the electronic device 910, and the one or more management servers 1157, performing one or more network-based key distribution operations, according to certain embodiments of this disclosure. In certain embodiments, the method 2000 is directed to an activation flow protocol described herein. Although certain details will be provided with reference to the method 2000 of FIG. 20, it should be understood that other embodiments may include more, less, or different method steps. For example, one or more steps of method 2000 may be incorporated into one or more steps of method 1300 illustrated in FIG. 13, one or more steps of method 1400 illustrated in FIG. 14, one or more steps of method 1500 illustrated in FIG. 15, one or more steps of method 1600 illustrated in FIG. 16, one or more steps of method 1700 illustrated in FIG. 17, one or more steps of method 1800 illustrated in FIG. 18, or one or more steps of method 1900 illustrated in FIG. 19.

At step 2001, the management server 1157 receives a message to active an electronic device 910 (e.g., a new electronic device 910). Step 2011 is at least similar to step 1701 illustrated in FIG. 17. At step 2003, the management server 1157 may generate a split key (e.g., a REL-ID split key, or user key (UK)). Step 2003 is at least similar to step 1503 of method 1500 illustrated in FIG. 15. At step 2005, the management server 1157 may bind or associate the server key to the received username, the application 1105 stored in the electronic device memory of the electronic device 910, and the electronic device 910. Step 2005 is at least similar to step 1505 of method 1500 illustrated in FIG. 15.

At step 2007, the management server 1157 may generate an activation code and a validation code. The management server 1157 may use the activation code as entropy to generate a key that is subsequently to be used to encrypt the client key. Step 2007 is at least similar to step 1507 of method 1500 illustrated in FIG. 15. At step 2009, the management server 1157 may encrypt the client key using the key generated using the activation code. Step 2009 is at least similar to step 1509 of method 1500 illustrated in FIG. 15. At step 2011, the management server 1157 may transmit the activation code and the validation code out of band (e.g., via email, via text message) to the user of the electronic device 910. Step 2011 is at least similar to step 1511 of method 1500 illustrated in FIG. 15. At step 2013, the management server 1157, after transmitting the activation code and the validation code out of band, may hash the activation code. The management server 1157 may store the hashed activation code and the validation code in a memory (e.g., a credential store 1159). Step 2013 is at least similar to step 1513 of method 1500 illustrated in FIG. 15.

At step 2015, the management server 1157 may transmit a request message to the electronic device 910 that requests the activation code and that includes the validation code. Step 2015 is at least similar to step 1515 of method 1500 illustrated in FIG. 15. At step 2017, the computing system 935 of the gateway 1155 may receive the request message and transmit the request message using the one or more secure channels 1316. Step 2017 is at least similar to step 1517 of method 1500 illustrated in FIG. 15. At step 2019, the one or more processors of the electronic device 910 may receive the request message using the REL-ID SDK 1107. Step 2019 is at least similar to step 1519 of method 1500 illustrated in FIG. 15. At step 2021, the one or more processors of the electronic device 910 may receive the request for the activation code and the included validation code through the application 1105. Step 2021 is at least similar to step 1521 of method 1500 illustrated in FIG. 15.

In certain embodiments, instead of generating an activation code, the management server 1157 may receive an activation code. The management server 1157 may use the provided activation code as entropy to generate a key that is subsequently to be used to encrypt the client key as described herein. This may be based on an enterprise application calling the "EnrollUser" API to generate REL-ID with a provided activation code. A usage scenario may include a customer wanting to use a knowledge based mechanism to unlock REL-ID such as using the last six digits of a user's credit card.

At step 2023, the one or more processors of the electronic device 910 may generate for display on a display screen the validation code for viewing and validation by the user through the application 1105. The one or more processors of the electronic device 910 may receive the activation code from the user (e.g., through a user interface). Step 2023 is at least similar to step 1523 of method 1500 illustrated in FIG. 15. At step 2025, the one or more processors of the electronic device 910 may utilize the REL-ID SDK 1107 to hash the validation code with the received activation code. The one or more processors of the electronic device 910 may transmit the hashed validation code and activation code through the one or more secure channels 1316 to the gateway 1155. Step 2025 is at least similar to step 1525 of method 1500 illustrated in FIG. 15. At step 2027, the computing system 935 of the gateway 1155 may receive the hashed validation code and activation code and validate the hashed validation code and activation code. For example, the computing system 935 of the gateway 1155 may instruct the management server 1157 to use the one or more credential stores 1159 to validate the hashed validation code and activation code. Step 2027 is at least similar to step 1527 of method 1500 illustrated in FIG. 15.

At step 2031, when the hashed validation code and activation code is validated, the management server 1157 may transmit the encrypted client key to gateway 1155. Step 2031 is at least similar to step 1531 of method 1500 illustrated in FIG. 15. At step 2033, the computing system 935 of the gateway 1155 may receive the encrypted client key from the management server 1157 and transmit the encrypted client key to the electronic device 910 using the one or more secure channels 1316. Step 2033 is at least similar to step 1533 of method 1500 illustrated in FIG. 15. At step 2035, the one or more processors of the electronic device 910 may receive the encrypted client key and the activation code and decrypt the encrypted client key using the REL-ID SDK 1107. Step 2035 is at least similar to step 1535 of method 1500 illustrated in FIG. 15. At step 2037, the one or more processors of the electronic device 910 may transmit a request through the application 1105 for user entropy (e.g., a password or a token) using the application 1105. Step 2037 is at least similar to step 1537 of method 1500 illustrated in FIG. 15.

At step 2039, the one or more processors of the electronic device 910 may receive or generate the user entropy using the application 1105. Step 2039 is at least similar to step 1539 of method 1500 illustrated in FIG. 15. At step 2041, the one or more processors of the electronic device 910 may re-encrypt the client key using the REL-ID SDK 1107 for storage (e.g., in an electronic device memory, a credential store 1159) using the entropy based on the user credential (e.g., password, token), the device scope key, and the application scope key. At this step, the one or more processors of the electronic device 910 may store the client key using the application 1105 in an electronic device memory and the computing system 935 of the gateway 1155 stores the server key (e.g., in a credential store 1159, in a memory of the gateway 1155). Thus, the one or more processors of the electronic device 910 may perform, using the REL-ID SDK 1107, an RMAK protocol and generate or establish one or more secure channels 1542 that are specific and dedicated to the user, the application 1105, and the electronic device 910. Step 2041 is at least similar to step 1541 of method 1500 illustrated in FIG. 15.

At step 2043, the computing system 935 of the gateway 1155 may perform an RMAK protocol and generate or establish one or more secure channels 1542 that are specific and dedicated to the user, the application 1105, and the electronic device 910. In certain embodiments, the one or more secure channels 1542 may be user channels or secondary channels. Step 2043 is at least similar to step 1543 of method 1500 illustrated in FIG. 15. At step 1545, the computing system 935 of the gateway 1155 may create a user session and bind the user session to a fingerprint associated with the user, the application 1105, and the electronic device 910. The computing system 935 of the gateway 1155 may transmit the user session to the electronic device 910. Step 2045 is at least similar to step 1545 of method 1500 illustrated in FIG. 15. At step 2047, the one or more processors of the electronic device 910 may receive the user session from the gateway 1155 using the REL-ID SDK 1107. Step 2047 is at least similar to step 1547 of method 1500 illustrated in FIG. 15.

At step 2049, the one or more processors of the electronic device 910 may generate a digital signing key (DSK), encrypt the DSK, and store the encrypted DSK in an electronic device memory of the electronic device 910. The one or more processors of the electronic device 910 may generate, encrypt, or store the DSK using the REL-ID SDK 1107. In certain embodiments, the one or more processors of the electronic device 910 may generate a public DSK when generating the DSK. For example, the generated DSK may be a DSK pair including a public DSK and a private DSK. The one or more processors of the electronic device 910 may encrypt the public DSK and store the private DSK in an electronic device memory of the electronic device 910. In some embodiments, the one or more processors of the electronic device 910 may encrypt the private DSK and store the encrypted private DSK in an electronic device memory of the electronic device 910. The one or more processors of the electronic device 910 may transmit (e.g., direct a transmission of) the generated public encrypted DSK over the user channel 1542 to the gateway 1155. Step 2049 is at least similar to step 1949 illustrated in FIG. 19.

At step 2051, the computing system 935 of the gateway 1155 may receive the public encrypted DSK transmitted over the user channel 1542 from the electronic device 910. After receiving the public encrypted DSK, the computing system 935 of the gateway 1155 may verify or authenticate that the computing system 935 of the gateway 1155 has received a correct public encrypted DSK. When the computing system 935 of the gateway 1155 verifies or authenticates that the received public encrypted DSK is a correct public encrypted DSK, the computing system 935 of the gateway 1155 may transmit (e.g., permit the transmission of) the public encrypted DSK to the management server 1157 for storage in the one or more credential stores 1159. The management server 1157 may receive the public encrypted DSK from the gateway 1155 and store the received public encrypted DSK in the one or more credential stores 1159. In certain embodiments, when management server 1157 receives the public encrypted DSK from the gateway 1155, the management server 1157 may bind the public encrypted DSK to the fingerprint associated with the user, the application 1105, and the electronic device 910 and store the bound public encrypted DSK in the one or more credential stores 1159. After verifying or authenticating and subsequently storing the public encrypted DSK, the computing system 935 of the gateway 1155 may generate an authentication message indicating that the public encrypted DSK has been verified or authenticated (e.g., positively verified or positively authenticated) and stored or bound and stored in the one or more credential stores 1159. Step 2051 is at least similar to step 1951 illustrated in FIG. 19.

At step 2053, the computing system 935 of the gateway 1155 may transmit (e.g., permit the transmission of) the authentication message indicating that the public encrypted DSK has been verified or authenticated to the electronic device 910 over the user channel 1542. Step 2053 is at least similar to step 1953 illustrated in FIG. 19. At step 2055, the electronic device 910 may receive, through the REL-ID SDK 1107, the authentication message indicating that the public encrypted DSK has been authenticated or verified by the computing system 935 of the gateway 1155. Step 2055 is at least similar to step 1955 illustrated in FIG. 19. At step 2057, the one or more processors of the electronic device 910 utilizing the application may transmit and receive electronic data using the one or more secure channels 1542 to communicate with the computing system 935 of the gateway 1155 or the one or more management servers 1157 and the one or more credential store 1159 through the gateway 1155. Step 2057 is at least similar to step 1549 of method 1500 illustrated in FIG. 15.

Figure 21:
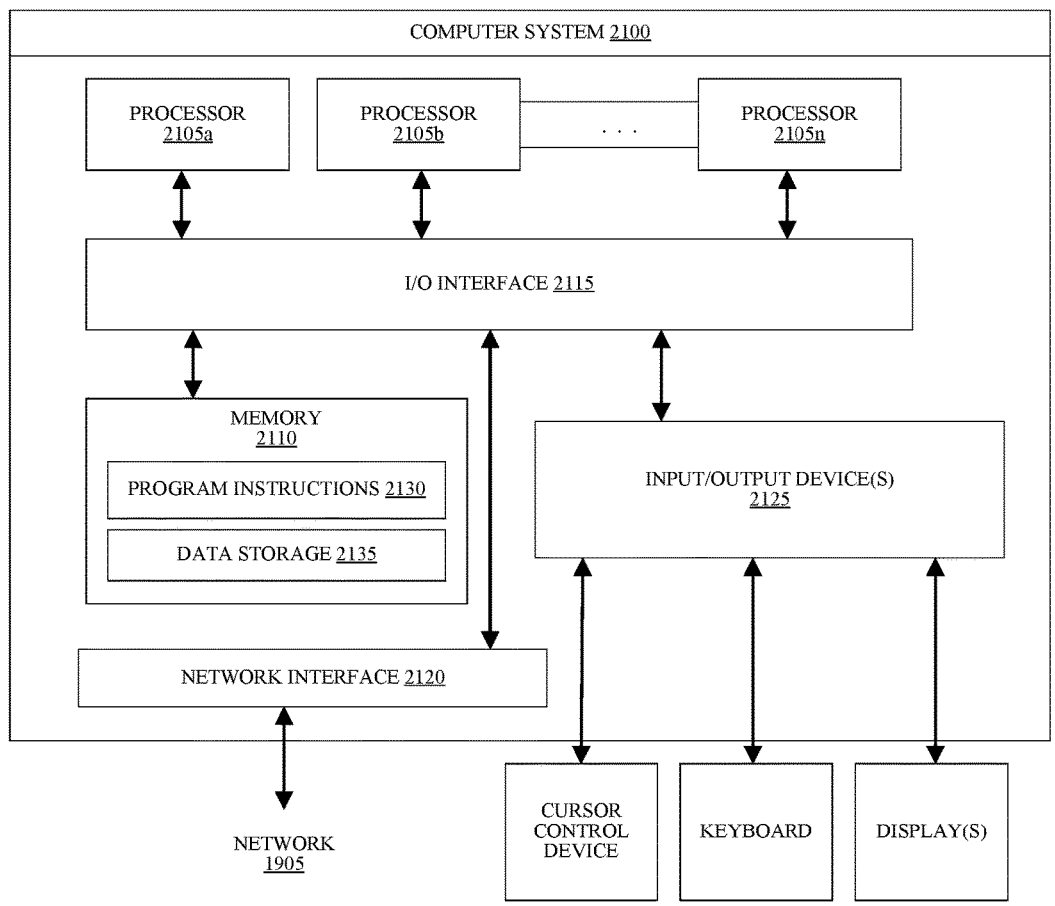
FIG. 21 illustrates a non-limiting, example computer system configured to implement aspects of apparatuses, systems, and methods according to certain embodiments of this disclosure.

FIG. 21 illustrates a non-limiting, example computer system 2100 configured to implement systems and methods for performing one or more interactive gaming operations according to certain embodiments of this disclosure. FIG. 21 illustrates a computer system 2100 that is configured to execute any and all of the embodiments described herein. In certain embodiments, the computer system 2100 describes at least some of the components of an electronic gateway 930 or the computing system 935, the one or more electronic devices 910, the one or more management servers 920, the one or more credential stores 925, the one or more gateway 1055, the one or more management servers 1063, the one or more management servers 1067, the one or more electronic devices 1014, the one or more web servers 1071, the one or more applications servers 1073, the one or more authentication servers 1077, the one or more authentication store 1081, the one or more user stores 1079, the one or more gateways 1155, the one or more management servers 1157, and the one or more credential stores 1159 illustrated in FIGS. 9, 10, 11, and 12. In different embodiments, the computer system 2100 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 301 of a handset), an application server, a storage device, a television, a peripheral device such as a switch, modem, router, or in general any type of computing or electronic device.

Various embodiments of a system and method for distributing network-based keys, as described herein, may be executed on one or more computer systems 2100, which may interact with various other devices. In the illustrated embodiment, the computer system 2100 includes one or more processors 2105 coupled to a system memory 2110 via an input/output (I/O) interface 2115. The computer system 2100 further includes a network interface 2120 coupled to I/O interface 2115, and one or more input/output devices 2125, such as cursor control device, keyboard, and display(s). In some cases, it is contemplated that embodiments may be implemented using a single instance of computer system 2100, while in other embodiments multiple such systems, or multiple nodes making up computer system 2100, may be configured to host different portions or instances of embodiments. For example, in one embodiment some elements may be implemented via one or more nodes of computer system 2100 that are distinct from those nodes implementing other elements.

In various embodiments, computer system 2100 may be a uniprocessor system including one processor 2105$a$, or a multiprocessor system including several processors 2105$a$-2105$n$ (e.g., two, four, eight, or another suitable number). The processors 2105 may be any suitable processor capable of executing instructions. For example, in various embodiments the processors 2105 may be general-purpose or embedded processors implementing any of a variety of instruction set architectures (ISAs), such as the x86, PowerPC, SPARC, or MIPS ISAs, or any other suitable ISA. In multiprocessor systems, each of processors 2105 may commonly, but not necessarily, implement the same ISA.

The system memory 2110 may be configured to store the program instructions 2130 and/or existing state information and ownership transition condition data in the data storage 2135 accessible by the processor 2105. In various embodiments, the system memory 2110 may be implemented using any suitable memory technology, such as static random access memory (SRAM), synchronous dynamic RAM (SDRAM), nonvolatile/Flash-type memory, or any other type of memory. In the illustrated embodiment, the program instructions 2130 may be configured to implement a system for performing one or more network-based key distribution operations incorporating any of the functionality, as described herein. In some embodiments, program instructions and/or data may be received, sent, or stored upon different types of computer-accessible media or on similar media separate from the system memory 2110 or the computer system 2100. The computer system 2100 is described as implementing at least some of the functionality of functional blocks of previous Figures.

In one embodiment, the I/O interface 2115 may be configured to coordinate I/O traffic between the processor 2105, the system memory 2110, and any peripheral devices in the device, including the network interface 2120 or other peripheral interfaces, such as the input/output devices 2125. In some embodiments, the I/O interface 2115 may perform any necessary protocol, timing or other data transformations to convert data signals from one component (e.g., the system memory 2110) into a format suitable for use by another component (e.g., the processor 2105). In some embodiments, the I/O interface 2115 may include support for devices attached through various types of peripheral buses, such as a variant of the Peripheral Component Interconnect (PCI) bus standard or the Universal Serial Bus (USB) standard, for example. In some embodiments, the function of the I/O interface 2115 may be split into two or more separate components, such as a north bridge and a south bridge, for example. Also, in some embodiments some or all of the functionality of the I/O interface 2115, such as an interface to the system memory 2110, may be incorporated directly into the processor 2105.

The network interface 2120 may be configured to allow data to be exchanged between the computer system 2100 and other devices attached to the network 105 or between nodes of the computer system 2100. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 2120 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 2125 may, in some embodiments, include one or more display terminals, keyboards, keypads, touchpads, scanning devices, voice, or optical recognition devices, or any other devices suitable for entering or accessing data by one or more the computer systems 2100. Further, various other sensors may be included in the I/O devices 2125, such as imaging sensors, barometers, altimeters, LIDAR, or any suitable environmental sensor. Multiple input/output devices 2125 may be present in the computer system 2100 or may be distributed on various nodes of the computer system 2100. In some embodiments, similar input/output devices may be separate from the computer system 2100 and may interact with one or more nodes of the computer system 2100 through a wired or wireless connection, such as over the network interface 2120.

As shown in FIG. 21, the memory 2110 may include program instructions 2130, which may be processor-executable to implement any element or action, as described herein. In one embodiment, the program instructions may implement at least a portion of methods described herein, such as the methods illustrated by FIGS. 13-20. In other embodiments, different elements and data may be included. Note that the data storage 2135 may include any data or information, as described herein.

Those skilled in the art will appreciate that the computer system 2100 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 2100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 2100 may be transmitted to the computer system 2100 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Thus, the disclosure provides, among other things, a system for performing one or more network-based key distribution operations, including a computing system. None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus comprising:
   a first electronic data port configured to transmit electronic data to one or more electronic devices and receive electronic data from the one or more electronic devices;
   a second electronic data port configured to transmit electronic data to one or more management servers and receive electronic data from the one or more management servers; and
   at least one processor that, when executing one or more network-based key distribution operations, is configured to:
   receive, from an electronic device of the one or more electronic devices, a verification message indicating that the electronic device is not corrupt before receiving a unique universal identifier (UUID) from the electronic device,
   receive, from the electronic device, the UUID, wherein the UUID is associated with an application stored in a memory of the electronic device,
   receive, from a management server of the one or more management servers, a server key stored in a credential store and that is associated with the UUID received from the electronic device, and
   establish one or more secure channels for electronic data communication with the electronic device based on the received UUID and the server key.

2. The apparatus of claim 1, wherein the application is previously stored in the memory of the electronic device and contained an encrypted client key and the UUID, and wherein after receiving the application, the electronic device decrypts the encrypted client key forming a decrypted client key.

3. The apparatus of claim 1, wherein the at least one processor is further configured to transmit electronic data to the electronic device using the one or more secure channels.

4. The apparatus of claim 3, wherein the electronic data comprises a request for one or more parameters of the electronic device, and wherein after receiving one or more parameters of the electronic device from the electronic device, the at least one processor is further configured to generate an application session with the electronic device using the one or more secure channels.

5. The apparatus of claim 1, wherein the at least one processor is further configured to receive electronic data from the electronic device after the electronic device has performed a self-registration protocol.

6. The apparatus of claim 1, wherein the at least one processor is further configured to generate an application session with the electronic device when a username received from the electronic device is unique to the application and the electronic device.

7. A method implemented by at least one processor of an electronic gateway, the method comprising:
receiving, by the at least one processor, a verification message from an electronic device before receiving a unique universal identifier (UUID) from the electronic device, wherein the verification message indicates that the electronic device is not corrupt;
receiving, by the at least one processor, the UUID from the electronic device, wherein the UUID is associated with an application stored in a memory of the electronic device;
receiving, by the at least one processor, a server key from a management server, wherein the server key is stored in a credential store and is associated with the UUID received from the electronic device; and
establishing, by the at least one processor, one or more secure channels for electronic data communication with the electronic device based on the received UUID and the server key.

8. The method of claim 7, wherein the electronic gateway comprises:
a first electronic data port for transmitting electronic data to one or more electronic devices including the electronic device and for receiving electronic data from one or more electronic devices including the electronic device; and
a second electronic data port for transmitting electronic data to one or more management servers and for receiving electronic data from the one or more management servers.

9. The method of claim 7, wherein the application is previously stored in the memory of the electronic device and contained an encrypted client key and the UUID, and wherein after receiving the application, the electronic device decrypts the encrypted client key forming a decrypted client key.

10. The method of claim 7, further comprising transmitting, by the at least one processor, electronic data to the electronic device using the one or more secure channels.

11. The method of claim 10, wherein the electronic data comprises a request for one or more parameters of the electronic device, and wherein after receiving one or more parameters of the electronic device from the electronic device, the method further comprises generating, by the at least one processor, an application session with the electronic device using the one or more secure channels.

12. The method of claim 7, wherein the method further comprises receiving, by the at least one processor, electronic data from the electronic device after the electronic device has performed a self-registration protocol.

13. The method of claim 7, wherein the method further comprises generating, by the at least one processor, an application session with the electronic device when a username received from the electronic device is unique to the application and the electronic device.

14. A non-transitory, computer-readable storage medium of an electronic gateway storing one or more executable instructions that, when executed by one or more processors, cause the one or more processors to:
receive a verification message from an electronic device, wherein the verification message indicates that the electronic device is not corrupt before receiving a unique universal identifier (UUID) from the electronic device;
receive the UUID from the electronic device, wherein the UUID is associated with an application stored in a memory of the electronic device;
receive a server key from a management server, wherein the server key is stored in a credential store and is associated with the UUID received from the electronic device; and
establish one or more secure channels for electronic data communication with the electronic device based on the received UUID and the server key.

15. The non-transitory, computer-readable storage medium of claim 14, wherein the electronic gateway comprises:
a first electronic data port for transmitting electronic data to one or more electronic devices including the electronic device and for receiving electronic data from one or more electronic devices including the electronic device; and
a second electronic data port for transmitting electronic data to one or more management servers and for receiving electronic data from the one or more management servers.

16. The non-transitory, computer-readable storage medium of claim 14, wherein the application is previously stored in the memory of the electronic device and contained an encrypted client key and the UUID, and wherein after receiving the application, the electronic device decrypts the encrypted client key forming a decrypted client key.

17. The non-transitory, computer-readable storage medium of claim 14, wherein the one or more executable instructions, when executed by the one or more processors, further cause the one or more processors to transmit electronic data to the electronic device using the one or more secure channels.

18. The non-transitory, computer-readable storage medium of claim 17, wherein the electronic data comprises a request for one or more parameters of the electronic device, and wherein after receiving one or more parameters of the electronic device from the electronic device, the one or more executable instructions, when executed by the one or more processors, further cause the one or more processors to generate an application session with the electronic device using the one or more secure channels.

19. The non-transitory, computer-readable storage medium of claim 14, wherein the one or more executable instructions, when executed by the one or more processors, further cause the one or more processors to receive electronic data from the electronic device after the electronic device has performed a self-registration protocol.

20. The non-transitory, computer-readable storage medium of claim 14, wherein the one or more executable instructions, when executed by the one or more processors, further cause the one or more processors to generate an application session with the electronic device when a username received from the electronic device is unique to the application and the electronic device.

* * * * *